United States Patent
Bennett et al.

(10) Patent No.: US 9,654,767 B2
(45) Date of Patent: May 16, 2017

(54) PROGRAMMING ARCHITECTURE SUPPORTING MIXED TWO AND THREE DIMENSIONAL DISPLAYS

(75) Inventors: James D. Bennett, Hroznetin (CZ); Jeyhan Karaoguz, Irvine, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1775 days.

(21) Appl. No.: 12/982,156

(22) Filed: Dec. 30, 2010

(65) Prior Publication Data
US 2011/0157170 A1 Jun. 30, 2011

Related U.S. Application Data

(60) Provisional application No. 61/291,818, filed on Dec. 31, 2009, provisional application No. 61/303,119, filed on Feb. 10, 2010.

(51) Int. Cl.
*G06T 15/00* (2011.01)
*H04N 13/04* (2006.01)
(Continued)

(52) U.S. Cl.
CPC .......... *H04N 13/0456* (2013.01); *G03B 35/24* (2013.01); *G06F 3/14* (2013.01);
(Continued)

(58) Field of Classification Search
CPC .......... H04N 13/0404; H04N 13/0409; H04N 13/049; H04N 13/0029; G06F 3/14;
(Continued)

(56) References Cited

U.S. PATENT DOCUMENTS

| 4,423,737 A | 1/1984 | Yano et al. |
| 4,829,365 A | 5/1989 | Eichenlaub |

(Continued)

FOREIGN PATENT DOCUMENTS

| EP | 0833183 A1 | 4/1998 |
| EP | 1662808 A1 | 5/2006 |

(Continued)

OTHER PUBLICATIONS

"How browsers work", retrieved from <http://taligarsiel.com/Projects/howbrowserswork1.htm> on Oct. 21, 2010, 54 pages.
(Continued)

*Primary Examiner* — Phu K Nguyen
(74) *Attorney, Agent, or Firm* — Sterne, Kessler, Goldstein & Fox P.L.L.C.

(57) ABSTRACT

Applications are provided that contain code of a programming language enabling simultaneous display on a screen of both two-dimensional and three-dimensional content. Furthermore, development systems and program libraries supporting the same are provided. A first command is generated by first program code of an application. The first command directs a first configuration of a first region of the screen to support the three-dimensional content. A second command is generated by second program code of the application. The second command directs a second configuration of a second region of the screen to support the two-dimensional content. The display of the three-dimensional content is caused within the first region of the screen, and the display of the two-dimensional content is caused within the second region of the screen.

20 Claims, 24 Drawing Sheets

(51) Int. Cl.

| | |
|---|---|
| H04N 13/00 | (2006.01) |
| G06F 3/14 | (2006.01) |
| G09G 3/00 | (2006.01) |
| G09G 3/20 | (2006.01) |
| H04N 21/235 | (2011.01) |
| H04N 21/41 | (2011.01) |
| H04N 21/435 | (2011.01) |
| G03B 35/24 | (2006.01) |
| H04S 7/00 | (2006.01) |
| G06F 3/0346 | (2013.01) |
| G02B 6/00 | (2006.01) |
| G09G 5/00 | (2006.01) |
| G09G 5/14 | (2006.01) |

(52) U.S. Cl.
CPC .............. *G09G 3/003* (2013.01); *G09G 3/20* (2013.01); *H04N 13/00* (2013.01); *H04N 13/0029* (2013.01); *H04N 13/0048* (2013.01); *H04N 13/0055* (2013.01); *H04N 13/0059* (2013.01); *H04N 13/0404* (2013.01); *H04N 13/0409* (2013.01); *H04N 13/0411* (2013.01); *H04N 13/0413* (2013.01); *H04N 13/0429* (2013.01); *H04N 13/0447* (2013.01); *H04N 13/0454* (2013.01); *H04N 13/0468* (2013.01); *H04N 13/0484* (2013.01); *H04N 13/0497* (2013.01); *H04N 21/235* (2013.01); *H04N 21/4122* (2013.01); *H04N 21/435* (2013.01); *H04S 7/303* (2013.01); *G02B 6/00* (2013.01); *G06F 3/0346* (2013.01); *G09G 5/003* (2013.01); *G09G 5/14* (2013.01); *G09G 2300/023* (2013.01); *G09G 2320/028* (2013.01); *G09G 2370/04* (2013.01); *H04N 2013/0463* (2013.01); *H04N 2013/0465* (2013.01)

(58) Field of Classification Search
CPC . G02B 6/00; G09G 3/20; G09G 5/003; G09G 5/14; G09G 2300/023; G09G 2320/028; G09G 2370/04
USPC .............. 345/102, 419; 348/51, 55, 59, 564; 349/15
See application file for complete search history.

(56) References Cited

U.S. PATENT DOCUMENTS

| | | | |
|---|---|---|---|
| 5,493,427 A | 2/1996 | Nomura et al. | |
| 5,615,046 A | 3/1997 | Gilchrist | |
| 5,855,425 A | 1/1999 | Hamagishi | |
| 5,945,965 A | 8/1999 | Inoguchi et al. | |
| 5,959,597 A | 9/1999 | Yamada et al. | |
| 5,969,850 A | 10/1999 | Harrold et al. | |
| 5,990,975 A | 11/1999 | Nan et al. | |
| 6,023,277 A | 2/2000 | Osaka et al. | |
| 6,049,424 A | 4/2000 | Himagishi | |
| 6,094,216 A | 7/2000 | Taniguchi et al. | |
| 6,144,375 A | 11/2000 | Jain et al. | |
| 6,188,442 B1 | 2/2001 | Narayanaswami | |
| 6,285,368 B1 | 9/2001 | Sudo | |
| 6,533,420 B1 | 3/2003 | Eichenlaub | |
| 6,590,605 B1 | 7/2003 | Eichenlaub | |
| 6,697,687 B1 | 2/2004 | Kasahara et al. | |
| 6,710,920 B1 | 3/2004 | Mashitani et al. | |
| 6,909,555 B2 | 6/2005 | Wohlstadter | |
| 7,030,903 B2 | 4/2006 | Sudo | |
| 7,038,698 B1 | 5/2006 | Palm et al. | |
| 7,091,471 B2 | 8/2006 | Wenstrand et al. | |
| 7,123,213 B2 | 10/2006 | Yamazaki et al. | |
| 7,190,518 B1 | 3/2007 | Kleinberger et al. | |
| 7,359,105 B2 | 4/2008 | Jacobs et al. | |
| 7,389,214 B1 | 6/2008 | Yelich et al. | |
| 7,440,193 B2 | 10/2008 | Gunasekaran et al. | |
| 7,511,774 B2 | 3/2009 | Lee et al. | |
| 7,557,876 B2 | 7/2009 | Lazarev et al. | |
| 7,626,644 B2 | 12/2009 | Shestak et al. | |
| 7,646,451 B2 | 1/2010 | Vogel et al. | |
| 7,671,935 B2 | 3/2010 | Mather et al. | |
| 7,692,859 B2 | 4/2010 | Redert et al. | |
| 7,769,668 B2 | 8/2010 | Balabon | |
| 7,885,079 B2 | 2/2011 | Chen et al. | |
| 7,911,442 B2 | 3/2011 | Wang et al. | |
| 7,924,456 B1 | 4/2011 | Kahn et al. | |
| 7,954,967 B2 | 6/2011 | Kashiwagi et al. | |
| 7,997,783 B2 | 8/2011 | Song et al. | |
| 8,040,952 B2 | 10/2011 | Park et al. | |
| 8,044,983 B2 | 10/2011 | Nonaka et al. | |
| 8,049,710 B2 * | 11/2011 | Shestak et al. | 345/102 |
| 8,072,411 B2 | 12/2011 | Chen et al. | |
| 8,139,024 B2 * | 3/2012 | Daiku | 345/102 |
| 8,154,686 B2 | 4/2012 | Mather et al. | |
| 8,154,799 B2 | 4/2012 | Kim et al. | |
| 8,174,564 B2 | 5/2012 | Kim et al. | |
| 8,183,788 B2 | 5/2012 | Ma | |
| 8,209,396 B1 | 6/2012 | Raman et al. | |
| 8,233,034 B2 | 7/2012 | Sharp et al. | |
| 8,269,822 B2 | 9/2012 | Zalewski | |
| 8,284,119 B2 | 10/2012 | Kim et al. | |
| 8,310,527 B2 | 11/2012 | Ko et al. | |
| 8,334,933 B2 | 12/2012 | Tsukada et al. | |
| 8,363,928 B1 | 1/2013 | Sharp | |
| 8,368,745 B2 | 2/2013 | Nam et al. | |
| 8,368,749 B2 | 2/2013 | Lambdin et al. | |
| 8,384,774 B2 | 2/2013 | Gallagher | |
| 8,400,392 B2 | 3/2013 | Kimura et al. | |
| 8,411,746 B2 | 4/2013 | Chen et al. | |
| 8,416,247 B2 | 4/2013 | Zalewski | |
| 8,438,601 B2 | 5/2013 | Putterman et al. | |
| 8,441,430 B2 | 5/2013 | Lee | |
| 8,466,869 B2 | 6/2013 | Kobayashi et al. | |
| 8,482,512 B2 | 7/2013 | Adachi et al. | |
| 8,487,863 B2 | 7/2013 | Park et al. | |
| 8,525,942 B2 | 9/2013 | Robinson et al. | |
| 8,587,642 B2 | 11/2013 | Shestak et al. | |
| 8,587,736 B2 | 11/2013 | Kang | |
| 8,605,136 B2 | 12/2013 | Yu et al. | |
| 8,687,042 B2 | 4/2014 | Karaoguz et al. | |
| 8,736,659 B2 | 5/2014 | Liu | |
| 8,766,905 B2 | 7/2014 | Adachi | |
| 8,788,676 B2 | 7/2014 | Alameh et al. | |
| 8,823,782 B2 | 9/2014 | Karaoguz et al. | |
| 8,854,531 B2 | 10/2014 | Karaoguz et al. | |
| 8,885,026 B2 | 11/2014 | Endo | |
| 8,922,545 B2 | 12/2014 | Bennett et al. | |
| 8,964,013 B2 | 2/2015 | Bennett et al. | |
| 8,988,506 B2 | 3/2015 | Bennett et al. | |
| 9,019,263 B2 | 4/2015 | Bennett et al. | |
| 9,049,440 B2 | 6/2015 | Seshadri et al. | |
| 9,124,885 B2 | 9/2015 | Bennett et al. | |
| 9,143,770 B2 | 9/2015 | Bennett et al. | |
| 2002/0010798 A1 | 1/2002 | Ben-Shaul et al. | |
| 2002/0037037 A1 | 3/2002 | Van Der Schaar | |
| 2002/0167862 A1 | 11/2002 | Tomasi et al. | |
| 2002/0171666 A1 | 11/2002 | Endo et al. | |
| 2002/0194604 A1 | 12/2002 | Sanchez et al. | |
| 2003/0012425 A1 | 1/2003 | Suzuki et al. | |
| 2003/0103165 A1 | 6/2003 | Bullinger et al. | |
| 2003/0137506 A1 | 7/2003 | Efran et al. | |
| 2003/0154261 A1 | 8/2003 | Doyle et al. | |
| 2003/0223499 A1 | 12/2003 | Routhier et al. | |
| 2004/0027452 A1 | 2/2004 | Yun et al. | |
| 2004/0036763 A1 | 2/2004 | Swift et al. | |
| 2004/0041747 A1 | 3/2004 | Uehara et al. | |
| 2004/0064351 A1 | 4/2004 | Mikurak | |
| 2004/0081302 A1 | 4/2004 | Kim et al. | |
| 2004/0109093 A1 | 6/2004 | Small-Stryker | |
| 2004/0117429 A1 | 6/2004 | Karaoguz et al. | |
| 2004/0141237 A1 | 7/2004 | Wohlstadter | |
| 2004/0164292 A1 | 8/2004 | Tung et al. | |
| 2004/0239231 A1 | 12/2004 | Miyagawa et al. | |

(56) References Cited

U.S. PATENT DOCUMENTS

| | | |
|---|---|---|
| 2004/0252187 A1 | 12/2004 | Alden |
| 2004/0255337 A1 | 12/2004 | Doyle et al. |
| 2005/0044489 A1 | 2/2005 | Yamagami et al. |
| 2005/0073472 A1 | 4/2005 | Kim et al. |
| 2005/0078108 A1 | 4/2005 | Swift et al. |
| 2005/0128353 A1 | 6/2005 | Young et al. |
| 2005/0185281 A1 | 8/2005 | Perlin et al. |
| 2005/0185515 A1 | 8/2005 | Berstis et al. |
| 2005/0237487 A1 | 10/2005 | Chang |
| 2005/0248561 A1 | 11/2005 | Ito et al. |
| 2005/0259147 A1 | 11/2005 | Nam et al. |
| 2006/0026090 A1 | 2/2006 | Balabon |
| 2006/0050785 A1 | 3/2006 | Watanabe et al. |
| 2006/0087556 A1 | 4/2006 | Era |
| 2006/0109242 A1 | 5/2006 | Simpkins |
| 2006/0118514 A1 | 6/2006 | Little et al. |
| 2006/0139448 A1 | 6/2006 | Ha et al. |
| 2006/0139490 A1 | 6/2006 | Fekkes et al. |
| 2006/0244918 A1 | 11/2006 | Cossairt et al. |
| 2006/0256136 A1 | 11/2006 | O'Donnell et al. |
| 2006/0256260 A1 | 11/2006 | Gon et al. |
| 2006/0256302 A1 | 11/2006 | Hsu |
| 2006/0262376 A1 | 11/2006 | Mather et al. |
| 2006/0271791 A1 | 11/2006 | Novack et al. |
| 2007/0002041 A1 | 1/2007 | Kim et al. |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0072674 A1 | 3/2007 | Ohta et al. |
| 2007/0085814 A1 | 4/2007 | Ijzerman et al. |
| 2007/0096125 A1 | 5/2007 | Vogel et al. |
| 2007/0097103 A1 | 5/2007 | Yoshioka et al. |
| 2007/0097208 A1 | 5/2007 | Takemoto et al. |
| 2007/0110035 A1 | 5/2007 | Bennett |
| 2007/0139371 A1 | 6/2007 | Harsham et al. |
| 2007/0146267 A1 | 6/2007 | Jang et al. |
| 2007/0147827 A1 | 6/2007 | Sheynman et al. |
| 2007/0153122 A1 | 7/2007 | Ayite et al. |
| 2007/0153916 A1 | 7/2007 | Demircin et al. |
| 2007/0162392 A1 | 7/2007 | McEnroe et al. |
| 2007/0225994 A1 | 9/2007 | Moore |
| 2007/0226258 A1 | 9/2007 | Lambdin et al. |
| 2007/0242068 A1 | 10/2007 | Han et al. |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0008202 A1 | 1/2008 | Terrell et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1 | 2/2008 | Barkley et al. |
| 2008/0068329 A1 | 3/2008 | Shestak et al. |
| 2008/0086321 A1 | 4/2008 | Walton |
| 2008/0086391 A1 | 4/2008 | Maynard et al. |
| 2008/0086685 A1 | 4/2008 | Janky et al. |
| 2008/0123182 A1 | 5/2008 | Cernasov |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0204550 A1 | 8/2008 | De Zwart et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0276162 A1 | 11/2008 | Birdwell et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0002564 A1 | 1/2009 | Barnhoefer et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0089177 A1 | 4/2009 | Dayton et al. |
| 2009/0091579 A1 | 4/2009 | Teranishi et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138280 A1 | 5/2009 | Morita et al. |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0192938 A1 | 7/2009 | Amos |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0244266 A1 | 10/2009 | Brigham |
| 2009/0268816 A1 | 10/2009 | Pandit et al. |
| 2009/0295791 A1 | 12/2009 | Aguera y Arcas et al. |
| 2009/0319625 A1 | 12/2009 | Kouhi |
| 2010/0007582 A1 | 1/2010 | Zalewski |
| 2010/0045782 A1 | 2/2010 | Morita |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0122286 A1 | 5/2010 | Begeja et al. |
| 2010/0128112 A1 | 5/2010 | Marti et al. |
| 2010/0131248 A1 | 5/2010 | Green et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0218231 A1 | 8/2010 | Frink et al. |
| 2010/0225735 A1 | 9/2010 | Shaffer et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0274564 A1 | 10/2010 | Bakalos et al. |
| 2010/0280959 A1 | 11/2010 | Stone et al. |
| 2010/0299390 A1 | 11/2010 | Alameh et al. |
| 2010/0302461 A1 | 12/2010 | Lim et al. |
| 2010/0306800 A1 | 12/2010 | Jung et al. |
| 2010/0309290 A1 | 12/2010 | Myers |
| 2010/0321465 A1 | 12/2010 | Behrens |
| 2011/0003665 A1 | 1/2011 | Burton et al. |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0064146 A1 | 3/2011 | Chen et al. |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0137894 A1 | 6/2011 | Narayanan et al. |
| 2011/0149026 A1 | 6/2011 | Luthra |
| 2011/0153362 A1 | 6/2011 | Valin et al. |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |

(56) References Cited

U.S. PATENT DOCUMENTS

| | | |
|---|---|---|
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0159929 A1 | 6/2011 | Karaoguz et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1 | 11/2011 | Tian et al. |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |
| 2013/0322641 A1 | 12/2013 | Carreras et al. |
| 2015/0015668 A1 | 1/2015 | Bennett et al. |
| 2015/0156473 A1 | 6/2015 | Bennett et al. |

FOREIGN PATENT DOCUMENTS

| | | |
|---|---|---|
| EP | 1816510 A1 | 8/2007 |
| EP | 1993294 A2 | 11/2008 |
| GB | 2454771 A | 5/2009 |
| TW | 200938878 A | 9/2009 |
| WO | 2005/045488 A1 | 5/2005 |
| WO | 2007/024118 A1 | 3/2007 |
| WO | 2008/038068 A1 | 4/2008 |
| WO | 2008/126557 A1 | 10/2008 |
| WO | 2009/031872 A2 | 3/2009 |
| WO | 2009/098622 A2 | 8/2009 |

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", available online at <http://en.wikipedia.org/wiki/Scripting_language>, retrieved on Aug. 16, 2012, 4 pages.

Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Peterka, Thomas, "Dynallax: Dynamic Parallax Barrier Autostereoscopic Display", Ph.D. Dissertation, University of Illinois at Chicago, 2007, 134 pages.

Yanagisawa et al., "A Focus Distance Controlled 3D TV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

European search Report received for European Patent application No. 10016055.5, mailed on Apr. 12, 2011, 3 pages.

European Search Report received for European Patent application No. 10015984.7, mailed on May 3, 2011, 3 pages.

Yanaka, Kazuhisa "Stereoscopic Display Technique for Web3D Images", SIGGRAPH 2009, New Orleans, Louisiana, Aug. 3-7, 2009, 1 page.

Office Action Received for Chinese Patent Application No. 201010619646.X, mailed on Mar. 5, 2014, 4 pages (Official Copy only).

Office Action Received for Chinese Patent Application No. 201010619649.3, mailed on Mar. 31, 2014, 7 pages (Official Copy only).

Office Action Received for Taiwan Patent Application No. 099147124, mailed on Mar. 31, 2014, 8 pages (Official Copy only).

Office Action received for Chinese Patent Application No. 201010619649.3, mailed on Oct. 11, 2014, 5 pages (Official Copy only).

Fono et al., "EyeWindows: Evaluation of Eye-Controlled Zooming Windows for Focus Selection", CHI 2005, Papers: Eyes on Interaction, Portland, Oregon, Apr. 2-7, 2005, pp. 151-160.

Intel, "Displaying Stereoscopic 3D (S3D) with Intel HD Graphics Processors for Software Developers", Aug. 2011, pp. 1-10.

Ko et al., "Facial Feature Tracking and Head Orientation-based Gaze Tracking", Electronics and Telecommunications Research Institute (ETRI), 2009, 4 pages.

Kumar et al., "EyePoint: Practical Pointing and Selection Using Gaze and Keyboard", CHI 2007, Apr. 28-May 3, 2007, 10 pages.

Liao et al., "The Design and Application of High-Resolution 3D Stereoscopic graphics Display on PC", Jan. 2000, 7 Pages.

Ruddarraju et al., "Perceptual User Interfaces using Vision-based Eye Tracking", In Proceedings of the 5th International Conference on Multimodal Interfaces (ICMI'03), Nov. 5-7, 2003, 7 pages.

\* cited by examiner

500

502
generate a first command directing a two-dimensional display of two-dimensional content within a first region of a screen 504
generate a second command directing a three-dimensional display of three-dimensional content within a second region of the screen

602
generate a first command directing at least in part a first configuration of a first region of the screen to support the first content, the first configuration being a first three-dimensional configuration 604
generate a second command directing at least in part a second configuration of a second region of the screen to support the second content 606
cause the display of the first content within the first region of the screen 608
cause the display of the second content within the second region of the screen

2902
receive light from an array of pixels that includes a plurality of pairs of sets of pixels 2904
manipulate the light from the array of pixels with a first light manipulator 2906
manipulate the light manipulated by the first light manipulator with a second light manipulator to form a plurality of pairs of images corresponding to the plurality of pairs of sets of pixels in a viewing space

FIG. 29

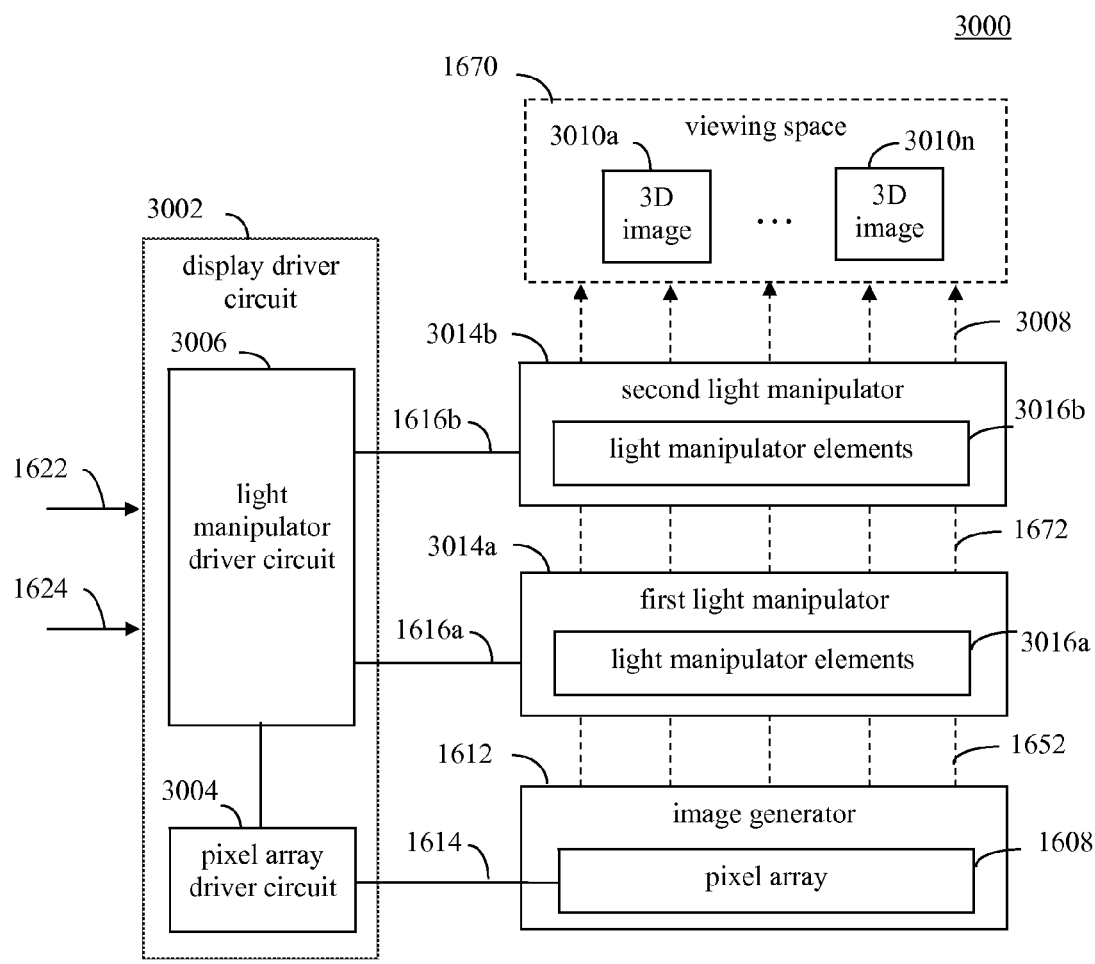

FIG. 30

PROGRAMMING ARCHITECTURE SUPPORTING MIXED TWO AND THREE DIMENSIONAL DISPLAYS

CROSS REFERENCE TO RELATED APPLICATIONS

This application claims the benefit of U.S. Provisional Application No. 61/291,818, filed on Dec. 31, 2009, which is incorporated by reference herein in its entirety; and This application claims the benefit of U.S. Provisional Application No. 61/303,119, filed on Feb. 10, 2010, which is incorporated by reference herein in its entirety.

This application is also related to the following U.S. patent applications, each of which also claims the benefit of U.S. Provisional Patent Application Nos. 61/291,818 and 61/303,119 and each of which is incorporated by reference herein:

U.S. patent application Ser. No. 12/845,409, titled "Display With Adaptable Parallax Barrier," filed Jul. 28, 2010;

U.S. patent application Ser. No. 12/845,440, titled "Adaptable Parallax Barrier Supporting Mixed 2D And Stereoscopic 3D Display Regions," filed Jul. 28, 2010;

U.S. patent application Ser. No. 12/845,461, titled "Display Supporting Multiple Simultaneous 3D Views," filed Jul. 28, 2010;

U.S. patent application Ser. No. 12/774,307, titled "Display with Elastic Light Manipulator," filed May 5, 2010;

U.S. patent application Ser. No. 12/982,020 titled "Backlighting Array Supporting Adaptable Parallax Barrier," filed on same date herewith;

U.S. patent application Ser. No. 12/982,124, titled "Operating System Supporting Mixed 2D, Stereoscopic 3D And Multi-View 3D Displays," filed on same date herewith;

U.S. patent application Ser. No. 12/982,140, titled "Internet Browser And Associated Content Definition Supporting Mixed Two And Three Dimensional Displays," filed on same date herewith;

U.S. patent application Ser. No. 12/982,173, titled "Application Programming Interface Supporting Mixed Two And Three Dimensional Displays," filed on same date herewith; and U.S. patent application Ser. No. 12/982,031, titled "Integrated Backlighting, Sub-Pixel and Display Driver Circuitry Supporting Adaptive 2D, Stereoscopic 3D and Multi-View 3D Displays," filed on same date herewith.

BACKGROUND OF THE INVENTION

Field of the Invention

The present invention relates to programming languages, applications, and software development kits associated with three-dimensional image displays.

Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Some displays are configured for viewing three-dimensional images without the user having to wear special glasses, such as by using techniques of autostereoscopy. For example, a display may include a parallax barrier that has a layer of material with a series of precision slits. The parallax barrier is placed proximal to a display so that a user's eyes each see a different set of pixels to create a sense of depth through parallax. Another type of display for viewing three-dimensional images is one that includes a lenticular lens. A lenticular lens includes an array of magnifying lenses configured so that when viewed from slightly different angles, different images are magnified. Displays are being developed that use lenticular lenses to enable autostereoscopic images to be generated.

As such, many types of display devices exist that are capable of displaying three-dimensional images, and further types are being developed. Different types of displays that enable three-dimensional image viewing may have different capabilities and attributes, including having different depth resolutions, being configured for three-dimensional image viewing only, being switchable between two-dimensional image viewing-only and three-dimensional image viewing-only, and further capabilities and attributes. Furthermore, different types of applications exist that can provide either two-dimensional or three-dimensional image content to the displays for display.

BRIEF SUMMARY OF THE INVENTION

Methods, systems, and apparatuses are described for programming languages, applications, software development kits, and programming libraries that enable the display of mixed two-dimensional and three-dimensional content by displays, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 5 and 6 show flowcharts providing processes for applications to configure display screens for display of mixed 2D and 3D content, according to exemplary embodiments.

FIG. 29 shows a flowchart for generating multiple three-dimensional images using multiple light manipulator layers, according to an exemplary embodiment.

FIG. 30 shows a block diagram of a display system, according to an exemplary embodiment.

Figure 1:
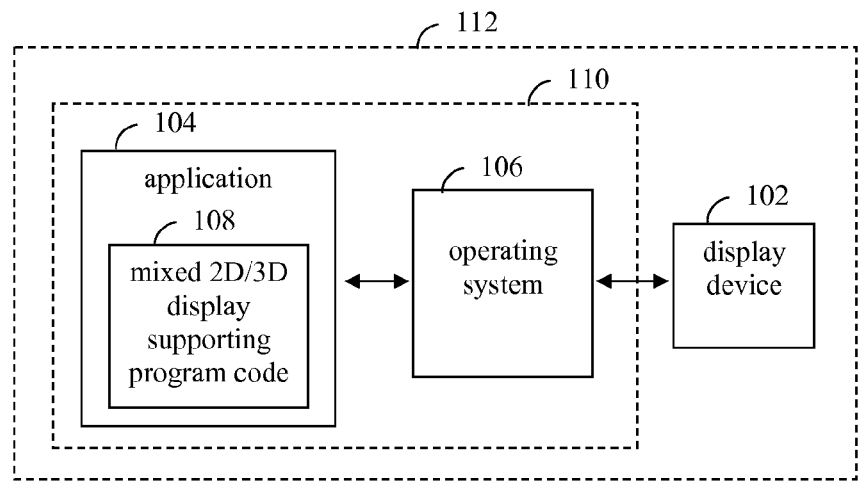
FIG. 1 shows a block diagram of an electronic device that executes an application program capable configuring a display for display of 2D (two-dimensional) and 3D (three-dimensional) content, according to an exemplary embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify various aspects of the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Exemplary Embodiments

Embodiments of the present invention relate to applications that are capable of configuring display devices to display mixed two-dimensional and three-dimensional content. For instance, display devices may be enabled to display images, video, and further types of content in two-dimensions and three-dimensions that are provided by applications. Such content may be received and processed by applications, or may be internally generated by applications.

An application may include code configured to define display screen regions in which to display the images and/or video content. The code may include commands that specify one or more parameters to be associated with the displayed regions and content. The application, when executed, may generate configuration commands based on the parameters that cause the display screen to be configured to display the 2D and/or 3D content. The application may then supply the 2D and/or 3D content for display in the configured regions of the display screen.

Numerous types of display devices may display 2D and 3D content provided by such applications. For example, the display devices may include one or more light manipulators, such as parallax barriers and/or lenticular lenses, to deliver 3D media content in the form of images or views to the eyes of the viewers. Other types may include display devices with 3D display pixel constructs that may or may not employ such light manipulators. When used, light manipulators may be fixed or dynamically modified to change the manner in which the views are delivered. For instance, embodiments enable light manipulators that are adaptable to accommodate a changing viewer sweet spot, switching between two-dimensional (2D), stereoscopic three-dimensional (3D), and multi-view 3D views, as well as the simultaneous display of 2D, stereoscopic 3D, and multi-view 3D content. With regard to parallax barriers, example features that may be dynamically modified include one or more of a number of slits in the parallax barriers, the dimensions of each slit, the spacing between the slits, and the orientation of the slits. Slits of the parallax barriers may also be turned on or off in relation to certain regions of the screen such that simultaneous mixed 2D, stereoscopic 3D, and multi-view 3D presentations can be accommodated. Similarly, a lenticular lens may be dynamically modified, such as by modifying a width of the lenticular lens, to modify delivered images.

The following subsections describe numerous exemplary embodiments of the present invention. For instance, the next subsection describes embodiments for applications, followed by a subsection that describes embodiments for displaying content using an application, a subsection that describes software development kit embodiments for generating applications based on a programming language, code written the programming language, and linked program libraries, a subsection that describes example displays, a subsection that describes example display environments, and a subsection that describes example electronic devices. It noted that the section/subsection headings provided herein are not intended to be limiting. Embodiments are described throughout this document, and any type of embodiment may be included under any section/subsection.

It will be apparent to persons skilled in the relevant art that various changes in form and detail can be made to the embodiments described herein without departing from the spirit and scope of the invention. Thus, the breadth and scope of the present invention should not be limited by any of exemplary embodiments described herein.

A. Example Application Program Embodiments

In embodiments, applications (also known as "application programs") that are configured for the display of mixed content are provided. An application may generate and/or configure a display screen region (e.g., a window or frame) in which image or video content, such as that produced by the application or received from another source, can be displayed. Code of the application may associate one or more parameters with the screen region. The parameters can specify, for example, one or more of: a type of video content to be displayed within the screen region (e.g., 2D, stereoscopic 3D, or a particular type of multi-view 3D), a desired display orientation of the video content within the screen region, a brightness/contrast to be associated with the screen region, a video resolution to be associated with the screen region (e.g., 720p, 1080p, etc.), and/or further parameters described herein. The parameters to be associated with a screen region may be specified programmatically or determined dynamically at run-time. The parameters may also be modified at run-time by a user through a user control interface provided by the screen region. The application may be further configured to cause one or more function calls to be placed to a graphics API (application programming interface) or device driver so that a region is opened on the display and the video content is presented therein in a manner that is consistent with the associated parameters.

For instance, FIG. 1 shows a block diagram of a display system 100, according to an exemplary embodiment. As shown in FIG. 1, system 100 includes a display device 102, an application 104, and an operating system (OS) 106. System 100 is a system where application 104 configures display device 102 for display of content, and provides the content to display device 102 for display. System 100 is described as follows.

System 100 may be implemented in one or more devices. For example, in one embodiment, application 104, OS 106, and display device 102 may be implemented in a common electronic device 112 that may be accessed by a user, such as a mobile computing device (e.g., a handheld computer, a laptop computer, a notebook computer, a tablet computer (e.g., an Apple iPad™), a netbook, etc.), a mobile phone (e.g., a cell phone, a smart phone), a mobile email device, some types of televisions, etc. In another embodiment, as shown in FIG. 1, application 104 and OS 106 may be implemented in an electronic device 110 that is separate from display device 102. For instance, device 110 may be a home theater system receiver, a set-top box, a computer, a game console, or other such device, and display device 102 may be a display device that is coupled to device 110 in a wired or wireless fashion.

Application 104 may be any type of application that is capable of generating and/or processing content for display. For instance, application 104 may be implemented in software (e.g., computer programs and/or data) that runs on a device. Application 104 may generate or receive an image file, a video file or stream, or other item of content. For instance, application 104 may be a media player that is configured to load and/or read a content file and/or stream, and to display the associated content. Application 104 may receive the content from a local storage device, over a network (e.g., a local area network (LAN), a wide area network (WAN), or a combination of communication networks, such as the Internet), or may receive the content from another source. Alternatively, application 104 may be a graphics application and/or any other form of application that generates its own content for display. Application 104 may display the content in one or more screen regions of a display screen of display device 102.

OS 106 provides a platform on which programs may be executed, such as application 104. OS 106 may be implemented in software (e.g., computer programs and/or data) that runs on a device. OS 106 manages hardware, provides common services, enables execution of applications, and enables applications to access hardware such as display device 102. Application 104 may call OS 106 and/or be interrupted by OS 106 for various reasons. OS 106 may include a user interface, such as a graphical user interface (GUI), which a user may interact with to access application 104 and/or display device 102. In some cases, application 104 may interact directly with display device 102. Further description of implementations of OS 106 and other operating system implementations described herein is provided in pending U.S. patent application Ser. No. 12/982,124, titled "Operating System Supporting Mixed 2D, Stereoscopic 3D And Multi-View 3D Display," filed on same date herewith, which is incorporated by reference herein in its entirety.

Application 104 may be generated based on program code of a programming language that enables display of mixed 2D and 3D content. As shown in FIG. 1, application 104 includes mixed 2D/3D supporting program code 108. Mixed 2D/3D supporting program code 108 may be coded in a programming language, compiled or un-compiled, that enables application 104 to support display of mixed 2D and 3D content, according to an exemplary embodiment. For example, program code 108 may enable application 104 to generate and/or provide two- and three-dimensional content for display by display devices that are capable of separately displaying two-dimensional and three-dimensional content, display devices that are capable of simultaneously displaying two-dimensional and three-dimensional content, display devices that are capable of simultaneously displaying different types of three-dimensional content, as well as display devices that can adaptively change the display of two-dimensional and three-dimensional contents (e.g., by modifying display screen regions, etc.).

For example, 2D/3D supporting program code 108 may capable of enabling application 104 to display 2D and 3D content at display device 102 in a manner based on the content itself and/or based on one or more commands and/or parameters provided by the programming language. For instance, the programming language may support commands for configuring display screen regions for display of 2D or 3D content, including one or more types of 3D content. Specific commands may be provided by the programming language to configure screen regions (e.g., a "configure_screen_for_3D4" command, etc.), and/or the programming language may support one or more parameters that are included with commands that indicate types and characteristics of 2D and 3D content and/or the screen regions in which the content is to be displayed. For example, a command and/or a parameter may indicate whether the content is to be displayed as 2D or 3D. Further commands and/or parameters may be defined to indicate various types of three-dimensional content, such as "3D-4" to indicate 3D multiview content with four camera views, "3D-8" to indicate 3D multiview content with eight camera views, "3D-HVGA" to indicate three-dimensional HVGA (half-size VGA), etc. Any number of commands and/or parameters may be available to indicate one or more 3D display characteristics, such as stereoscopic depth (e.g., a "depth" parameter), brightness (e.g., a "brightness" parameter), a size of a region of a screen in which the 3D content is to be displayed (e.g., a "regionsize" parameter having attributes such as row, column, width, and height parameters, a resolution parameter (e.g., a "resolution" parameter), a window orientation parameter indicating whether image content is to be displayed vertically or rotated by 90 degrees or by other amount (e.g., an "orientation" parameter), a window shape or freeform window parameter indicating a non-rectangular shape for the displayed content (e.g., a "freeform" parameter), a display region type parameter (e.g., a window, a frame, a tab, etc.). Programmers may be enabled to use such commands and/or parameters to define application 104 to display 2D and/or 3D content.

An example command for configuring a screen region is provided as follows:

configure_screen_region [3D4], [default], [0, 0, 100, 200], [80], [90]

The example command shown above is a command for configuring a region of a display screen. As shown above, the command, includes five parameters, including a display type parameter that is 3D-4 in this example, a freeform parameter having a value of "default" that indicates the region should be rectangular shaped, a region size parameter that defines a region location having an upper left region corner at coordinates (0, 0) and a region size of 100 by 200 pixels, a brightness parameter of 80% of full brightness, and an orientation parameter indicating the displayed content is to be rotated clockwise by 90 degrees. The parameters shown above for the configure_screen_region command are provided for purposes of illustration, and the command may have additional and/or alternative parameters that are described herein or otherwise known. Furthermore, additional and/or alternative commands for a programming language to support configuring and displaying mixed 2D and 3D content in further ways may be formed in a similar manner, as would be apparent to persons skilled in the relevant art(s) from the teachings herein.

Figure 2:
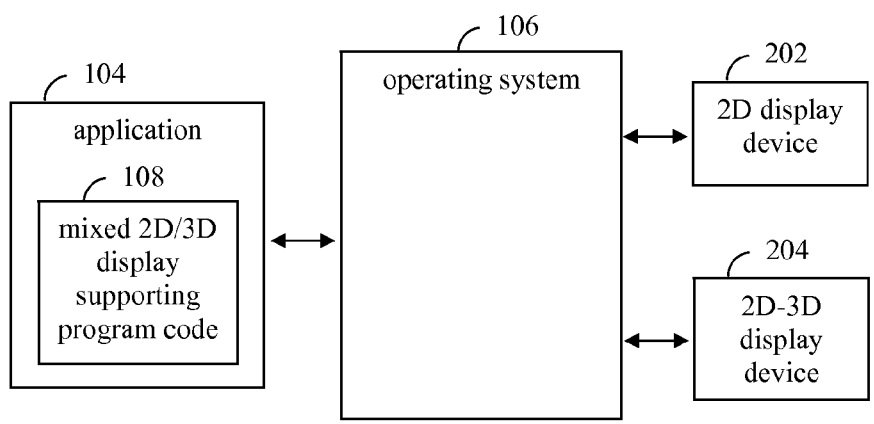
FIGS. 2 and 3 show block diagrams of systems that include applications that are capable of configuring displays for display of 2D and 3D content, according to exemplary embodiments.

In embodiments, display device 102 may be one of a variety of display devices capable of displaying two-dimensional and/or three-dimensional content. For instance, FIG. 2 shows a block diagram of a display system 200, which is an exemplary embodiment of system 100 of FIG. 1. As shown in FIG. 2, system 200 includes application 104, OS 106, a first display device 202, and a second display device 204. As shown in FIG. 2, application 104 includes mixed 2D/3D supporting program code 108. First display device 202 is a display device that is only capable of displaying two-dimensional content, and second display device 204 is a display device that is capable of display two-dimensional content and three-dimensional content. In the example of FIG. 2, via mixed 2D/3D supporting program code 108, application 104 is capable of displaying content at first and second display devices 202 and 204. In embodiments, application 104 may be capable of providing content for display by first and second display devices 202 and 204 one at a time. In another embodiment, application 104 may be capable of providing content for display by first and second display devices 202 and 204 and/or other combinations and numbers of display devices simultaneously.

Figure 3:
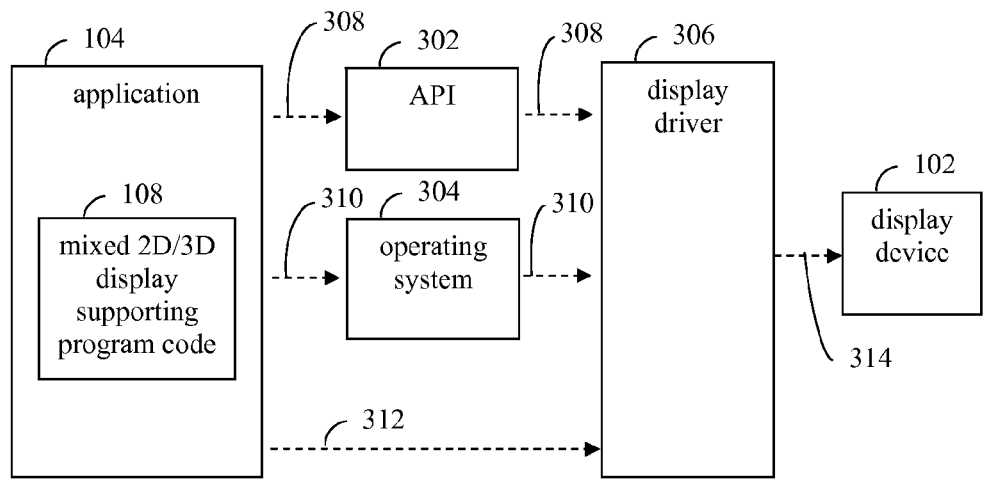

Note that application 104 may be interfaced with display devices in various ways, other than through an operating system as shown in FIGS. 1 and 2. For instance, FIG. 3 shows a block diagram of application 104 interfacing with display device 102 of FIG. 1 in alternative ways, according to embodiments. As shown in FIG. 3, application 104 can be interfaced with display device 102 through an API (application programming interface) 302 and a display driver 306, through an OS 304 (e.g., OS 106 of FIGS. 1 and 2) and display driver 306, and/or through display driver 306. FIG. 3 is described as follows.

API 302 is an interface implemented in software (e.g., computer program code or logic for applications such as application 104 that enables the applications to interact with other software and/or hardware. API 302 may be configured to perform graphics operations on graphics information received from the applications. API 302 may be implemented in a same device as application 104. API 302 may be a special purpose API, or may be a commercially available API, such as Microsoft DirectX® (e.g., Direct3D®), OpenGL®, or other 3D graphics API, which may be modified according to embodiments to receive commands and/or content from application 104. Further description of implementations of API 302 and other API implementations described herein is provided in pending U.S. patent application Ser. No. 12/982,173, titled "Application Programming Interface Supporting Mixed Two And Three Dimensional Displays," filed on same date herewith, which is incorporated by reference herein in its entirety.

OS 304 is configured to interface users and applications with hardware, such as display device 102. OS 304 may be a commercially available or proprietary operating system. For instance, OS 304 may be an operating system such as Microsoft Windows®, Apple Mac OS® X, Google Android™, or Linux®, which may be modified according to embodiments.

Display driver 306 may be implemented in software, and enables applications (e.g., higher-level application code) such as application 104 to interact with display device 102. Display driver 306 may be implemented in a same or different device as application 104. Multiple display drivers 306 may be present, and each display driver 306 is typically display device-specific, although some display drivers 306 may be capable of driving multiple types of display devices. Each type of display device typically is controlled by its own display device-specific commands. In contrast, most applications communicate with display devices according to high-level device-generic commands. Display driver 306 accepts the generic high-level commands (directly from application 104, or via API 302 and/or OS 304), and breaks them into a series of low-level display device-specific commands, as used by the particular display device.

As shown in FIG. 3, application 104 may generate a command 308 associated with the display of 2D and/or 3D content that is received by API 302. API 302 passes command 308 to display driver 306 (in a modified or unmodified form). Display driver 306 receives command 308, and generates one or more control signals 314 received by display device 102. Control signal(s) 314 place(s) a screen of display device 102 in a display mode corresponding to command 308. Furthermore, application 104 may stream content to display device 102 through API 302 and display driver 306 to be displayed in the screen configured according to command 308. Note the API 302 may be included in OS 304 (when present), or may be separate. Furthermore, API 302 may communicate directly with display driver 306 as shown in FIG. 3, or may communicate with display driver 306 through OS 304.

Alternatively, application 104 may generate a command 310 associated with the display of 2D and/or 3D content that is received by OS 304. OS 304 passes command 310 to display driver 306 (in a modified or unmodified form). Display driver 306 receives command 310, and generates control signal(s) 314 received by display device 102. Control signal(s) 314 place(s) a screen of display device 102 in a display mode corresponding to command 310. Furthermore, application 104 may stream content to display device 102 through OS 304 and display driver 306 to be displayed in the screen configured according to command 310.

In another example, application 104 may generate a command 312 associated with the display of 2D and/or 3D content that is directly received by display driver 306 (e.g., does not pass through API 302 or OS 304). Display driver 306 receives command 312, and generates control signal(s) 314 received by display device 102. Control signal(s) 314 place(s) a screen of display device 102 in a display mode corresponding to command 312. Furthermore, application 104 may stream content to display device 102 directly through display driver 306 to be displayed by the screen configured according to command 312.

As such, commands and content may be provided by application 104 to display device 102 through one or more different intermediate components, which may include one or more of API 302, OS 304, and display driver 306.

Figure 4A:
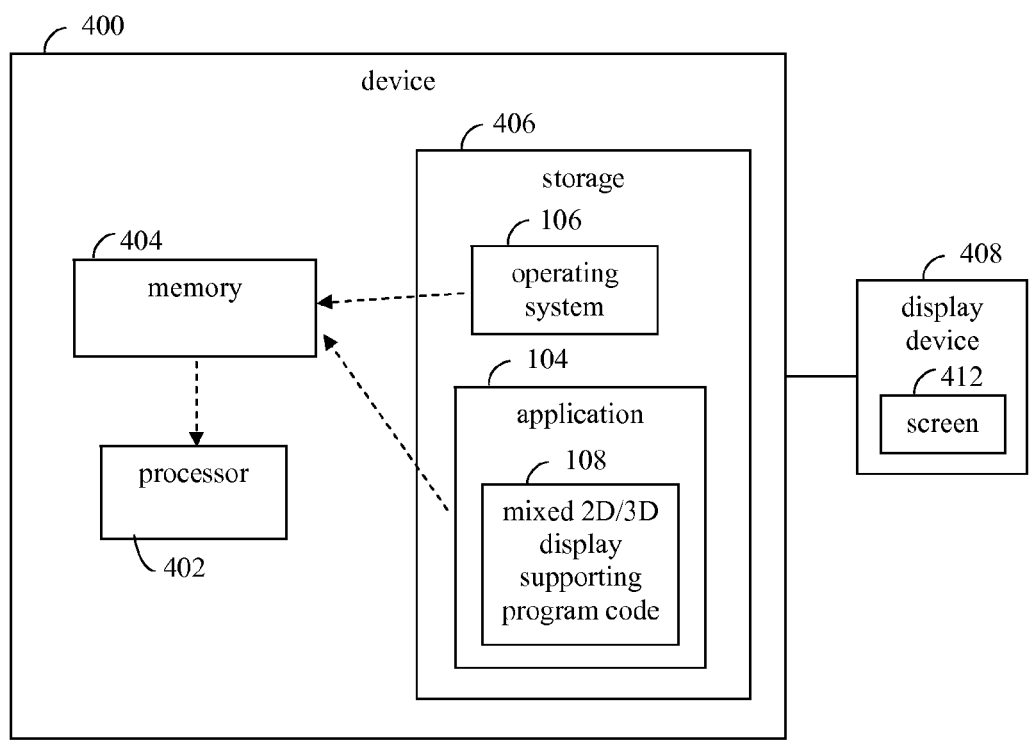
FIG. 4A shows a block diagram of an electronic device that executes an application program capable of configuring a display device for display of 2D and 3D content, according to an exemplary embodiment.

Application 104 may be executed in an electronic device. For instance, FIG. 4A shows a block diagram of an electronic device 400 coupled to display device 408, according to an exemplary embodiment. Device 400 is an example of either of devices 110 and 112 shown in FIG. 1. As shown in FIG. 4A, device 400 includes a processor 402, a memory 404, and storage 406. Device 400 may include additional features that are not shown in FIG. 4 for ease of illustration. Display device 408 may be included in or may be external to device 400. Device 400 may be any of the electronic devices mentioned herein, or may be an alternative device.

Memory 404 may include one or more random access memory (RAM) devices, one or more read only memory (ROM) devices, and/or other memory devices. Processor 402 may include one or more processors and/or further processing logic. Storage 406 may include one or more non-volatile storage devices, such as a hard disk drive, a CDROM (compact disc ROM), a DVD (digital video disc), a flash memory card (e.g., an SD (secure digital) card), a USB (universal serial bus) flash drive, etc. As shown in FIG. 4A, storage 406 stores operating system 106 and application 104. At power on of device 400, operating system 106 is caused to be loaded from storage 406 into memory 404 (e.g., by a boot loader executed by processor 402 at power up). Once loaded into memory 404, operating system 106 may be executed by processor 402. Subsequently, application 104 may be executed, such as by a user interacting with a user interface generated by operating system 106 to startup application 104. As shown in FIG. 4A, application 104 may be loaded into memory 404 from storage 406, and may be executed by processor 402. For instance, mixed 2D/3D display supporting program code 108 may be executed by processor 402 to support display of 2D and 3D content at a screen 412 of display device 408.

Figure 4B:
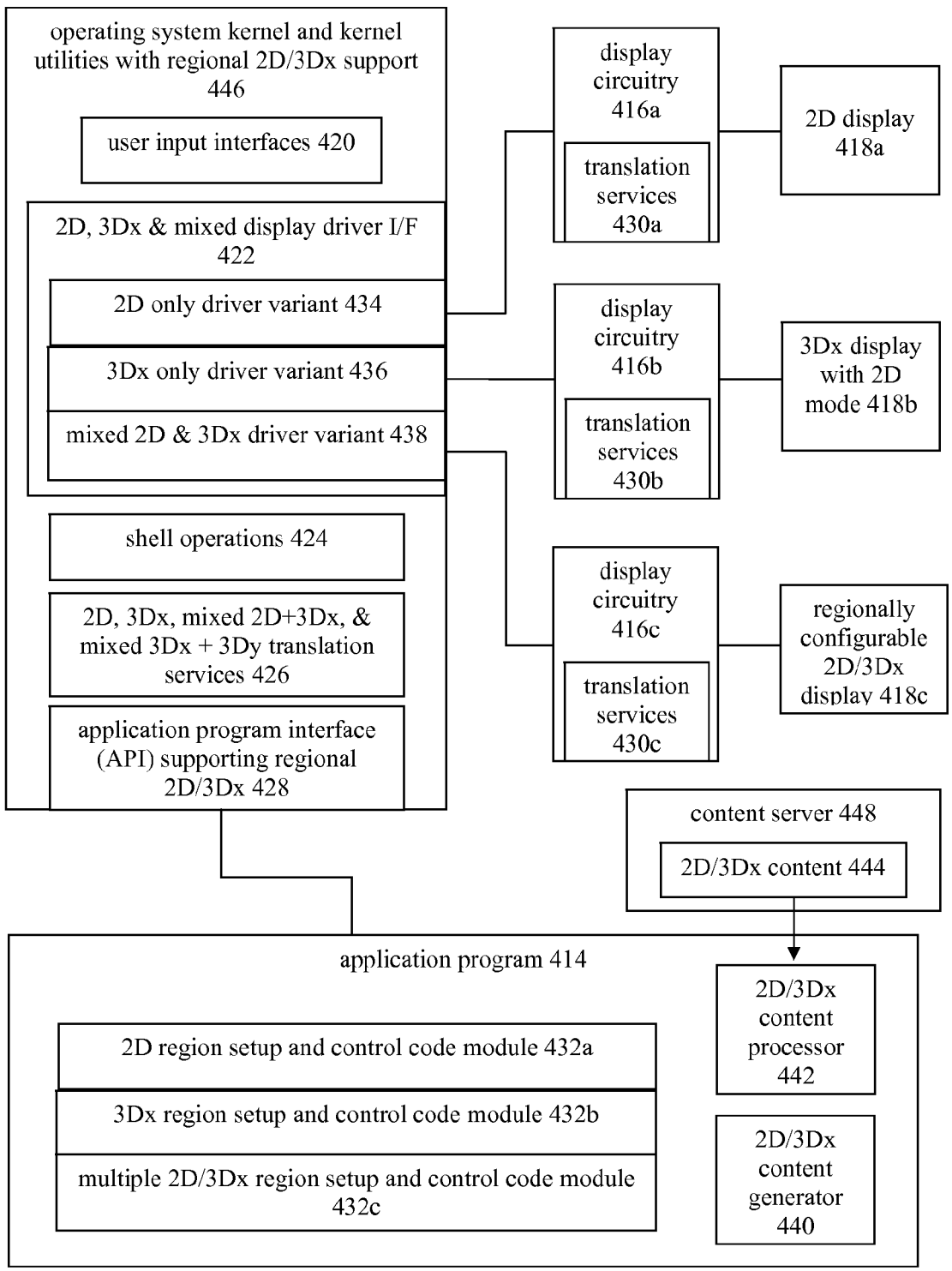
FIG. 4B shows a block diagram of a system that includes an application program capable of displaying content at mixed 2D, stereoscopic 3D and multi-view 3D displays, according to an exemplary embodiment.

Device 400 may be configured in various ways to perform its functions, and various embodiments for device 400 are described herein. For instance, FIG. 4B shows a block diagram of a display system 450 that includes a 2D and 3D display enabled-application, according to an embodiment. As shown in FIG. 4B, display system 450 includes an application program 414. Application program 414 is an embodiment of application 104 that is capable of configuring display devices for display of two-dimensional content and/or three-dimensional content, and to supply such content to the display devices. The embodiment of application program 414 shown in FIG. 4B is provided for purposes of illustration, and is not intended to be limiting. In further embodiments, application program 414 may include fewer, additional, and/or alternative features than shown in FIG. 4B.

Display system 450 is an example of a display system that is capable of displaying mixed 2D and 3D content (e.g., via mixed 2D/3D supporting logic 108). As shown in FIG. 4B, system 450 includes application program 414, operating system kernel and kernel utilities with regional/3Dx support 446 ("OS 446"), first-third display circuitry 416a-416c, a 2D display 418a, a 3D display with 2D mode 418b, a regionally configurable 2D/3Dx display 418c, and a content server 448. Application program 414 includes a 2D region setup and control code module 432a, a 3Dx region setup and control code module 432b, a multiple 2D/3Dx region setup and control code module 432c, a 2D/3Dx content generator 440, and a 2D/3Dx content processor 442. OS 446 includes user input interfaces 420, a 2D, 3Dx & mixed display driver interface 422, shell operations 424, 2D, 3Dx, mixed 2D and 3Dx, & mixed 3Dx and 3Dy translation services 426, and an API supporting regional 2D/3Dx 428 ("API 428"). 2D, 3Dx and mixed display driver interface 422 includes 2D only driver variant 434, 3Dx only driver variant 436, and mixed 2D and 3Ds driver variant 438. First-third display circuitry 416a-416c each includes a corresponding one of translation services 430a-430c. The features of system 450 are described as follows.

2D display 418a, 3D display with 2D mode 418b, and regionally configurable 2D/3Dx display 418c are example types of display devices that may display content provided by application program 414. One or more of displays 418a-418c may be present. 2D display 418a is an example of 2D display device 202 of FIG. 2, and is a display device that is only capable of displaying two-dimensional content. 3Dx display with 2D mode 418b is an example of 2D-3D display device 204 of FIG. 2, and is a display device that is capable of displaying two-dimensional and three-dimensional content. For instance, 3Dx display with 2D mode 418b may be set in a 2D mode where 3Dx display with 2D mode 418b can display 2D content in full screen, but not 3D content, and may be set in a 3D mode where 3Dx display with 2D mode 418b can display 3D content in full screen, but not 2D content. Furthermore, 3Dx display with 2D mode 418b may be capable of displaying 3D content having multiple camera views ("multiview")—a number of "x" views—such as 3D-4, having four camera views, 3D-16, having sixteen camera views, etc. The additional camera views enable viewers to "view behind" displayed 3D content by moving their heads left-right, as further described elsewhere herein. Regionally configurable 2D/3Dx display 418c is an example of 2D-3D display device 204 of FIG. 2, and is a display device that is capable of displaying two-dimensional and three-dimensional content simultaneously. For instance, regionally configurable 2D/3Dx display 418c may display 2D content in one or more regions of a display screen while simultaneously displaying 3D content in one or more other regions of the display screen. Furthermore, regionally configurable 2D/3Dx display 418c may be capable of displaying 3D content having multiple camera views.

OS 446 is an example of operating system 106 shown in FIG. 4A. OS 446 interfaces applications, such as application program 414, with displays 418a-418c. As indicated in FIG. 4B, OS 446 may provide various forms of 2D/3Dx display support. For instance, API supporting regional 2D/3Dx 428 is configured to interface one or more applications (e.g., application program 414) with OS 446, and thereby interface the applications with a display device (e.g., one or more of displays 418a-418c) coupled to OS 446. API supporting regional 2D/3Dx 428 is configured to enable applications to access various display functions, including enabling regional definition for 2D, 3D, and 3Dx content displayed by display screens and further display functions, when such applications do not provide such display functions themselves.

User input interfaces 420 are configured to receive user input to enable a person to interact with display system 450, application program 414, and content displayed by displays 418a-418c. Further example embodiments for user input interfaces 420 are described elsewhere herein.

2D, 3Dx & mixed display driver interface 422 enables applications, such as application program 414, that interface with OS 446 via API 428 to provide and control two- and/or three-dimensional content displayed at a displays 418a-418c. 2D only driver variant 434, 3Dx only driver variant 436, and mixed 2D and 3Dx driver variant 438 are examples of display driver 306 of FIG. 3. 2D, 3Dx & mixed display driver interface 422 may forward commands (e.g., from application program 414) to 2D only driver variant 434 when 2D display 418a is present, enabling only 2D-related commands to be processed. 2D, 3Dx & mixed display driver interface 422 may forward commands to 3Dx only driver variant 436 when 3Dx display with 2D mode 418b is present, enabling 2D or 3Dx related commands to be processed. 2D, 3Dx & mixed display driver interface 422 may forward commands to mixed 2D and 3Dx driver variant 438 when regionally configurable 2D/3Dx display 418c is present, enabling regional 2D or 3Dx related commands to be processed.

Shell operations 424 may be present in OS 446 to control and/or enable user configuration of environmental properties, such as the 2D and/or 3D display configuration of an environmental background, of desktop icons, of displayed windows, etc. In embodiments, shell operations 424 may be implemented in hardware, software, firmware, or any combination thereof, including as a shell operations module.

Mixed 2D and 3Dx, & mixed 3Dx and 3Dy translation services 426 may be present in OS 446 to provide for translation of received content (e.g., from an application such as application program 414) from a first dimensionality to a second dimensionality. For instance, translation services 426 may be configured to translate received 3D content to 2D content, such as when an application provides 3D content, and 2D display 418a is the target display (e.g., the target display is not capable of displaying 3D content). In another example, translation services 426 may be configured to translate a first type of 3D content to a second type of 3D content, such as when an application provides regional 2D and/or 3D content, and 3Dx display with 2D mode is the target display (e.g., the target display is not capable of displaying content regionally), and/or to translate 3D content having a first number "x" of cameras (e.g., 3D-8 content) to 3D content having a second number "y" of cameras (e.g., 3D-4 content), if the target display does not support "x" camera views. Still further, translation services 426 may be configured to translate 2D content to 3D content, and/or may be able to perform other forms of content translations.

In further embodiments, OS 446 may include fewer, additional, and/or alternative features than shown in FIG. 4B. Further description regarding an operating system configured to interface applications with displays supporting two-dimensional and three-dimensional views, such as OS 446, is provided in pending U.S. patent application Ser. No. 12/982,124, titled "Operating System Supporting Mixed 2D, Stereoscopic 3D And Multi-View 3D Displays," which is incorporated by reference herein in its entirety.

Display circuitry 416a-416c may have the form of hardware, software, firmware, or any combination thereof, such as having the form of a graphics card, circuitry etc. Display circuitry 416a-416c may be present to interface OS 446 with displays 418a-418c, respectively. Display circuitry 416a-416c may receive content signals and control signals from OS 446, and may be configured to generate drive signals to drive displays 418a-418c, respectively. Examples of display circuitry (e.g., drive circuits) are described elsewhere herein.

As shown in FIG. 4B, display circuitry 416a-416c may each optionally include a corresponding one of translation services 430a-430c. When present, translation services 430a-430c may perform translations of received content in a similar manner as mixed 2D and 3Dx, & mixed 3Dx and 3Dy translation services 426. For instance, translation services 430a may translate received 3D content to 2D content for display by 2D display 418a. Translation services 430b may translate received regionally configurable 2D and/or 3D content to non-regional 2D and/or 3D content for display by 3Dx display with 2D mode display 418b. Translation services 430b and 430c may each translate unsupported types of 3D content to supported types of 3D content for display by 3Dx display with 2D mode display 418b and regionally configurable 2D/3Dx display 418c, respectively. Translation services 430a-430c may also be configured to perform additional and/or alternative forms of content translations, in embodiments.

Application program 414 is an example of application 104 of FIG. 4A that may be interfaced with displays 418a-418c. One or more of applications 414 may separately or simultaneously execute and interact with OS 446 to provide content for display by displays 418a-418c. 2D region setup and control code module 432a of application program 414 includes code configured to setup and control a display screen region for the display of 2D content. For instance, code module 432a may include one or more commands and/or parameters that can set one or more 2D screen region characteristics, such as size, location, shape, type, brightness, resolution, contrast, orientation, and/or other region characteristic mentioned elsewhere herein or otherwise known. Code module 432a may setup up the initial characteristics of the 2D screen region, and may control modifications to the 2D screen region (e.g., changes in size, location, shape, type, brightness, resolution, contrast, orientation, and/or other region characteristic).

3Dx region setup and control code module 432b of application program 414 includes code configured to setup and control a display screen region for the display of 3D content. For instance, code module 432b may include one or more commands and/or parameters that can set one or more 3D screen region characteristics, such as 3D type (e.g., 3D-2, 3D-4, 3D-HVGA, etc.), size, location, shape, type, brightness, resolution, contrast, orientation, and/or other region characteristic mentioned elsewhere herein or otherwise known. Code module 432b may setup up the initial characteristics of the 3D screen region, and may control modifications to the 3D screen region (e.g., changes in 3D type, size, location, shape, type, brightness, resolution, contrast, orientation, and/or other region characteristic).

Multiple 2D/3Dx region setup and control code module 432c of application program 414 includes code configured to setup and control multiple display screen regions that display 2D and/or 3D content. For instance, code module 432c may setup and control one or more regions for the display of 2D content and one or more regions for the display of 3D content. Code module 432c may include one or more commands and/or parameters that can set one or more 2D and 3D screen region characteristics, such as those described above. Code module 432c may setup up the initial characteristics of the 2D and 3D screen regions, and may control modifications to the 2D and 3D screen region, such as the modification described above. In one variant, code module 432c is a separate code module from code modules 432a and 432b. In another variant, code module 432c may include portions or all of code modules 432a and 432b, which may be used by code module 432c to set up and control separate 2D and 3D screen regions, respectively.

2D/3Dx content generator 440 is configured to generate 2D and/or 3D content for display by one or more of displays 418a-418c. For instance, 2D/3Dx content generator 440 may be configured to generate one or more types of 2D and/or 3D content. 2D/3Dx content generator 440 may generate one or more images or streams of 2D and/or 3D content to be displayed in one or more corresponding screen regions setup and/or controlled by one or more of code modules 432a-432c. For instance, 2D/3Dx content generator 440 may generate 2D content to be displayed in a 2D screen region setup and controlled by code module 432a, or may generate 3D content to be displayed in a 3D screen region setup and controlled by code module 432b. In another variant, 2D/3Dx content generator 440 may generate multiple images or streams of 2D and/or 3D content to be simultaneously displayed in corresponding screen regions setup and controlled by code module 432c. 2D/3Dx content generator 440 may be any code configured to generate 2D and/or 3D content, such as a graphics code module and/or any other form of code that generates graphical content for display.

2D/3Dx content processor 442 is configured to receive 2D and 3D content from a source external to application program 414. For example, as shown in FIG. 4B, 2D/3Dx content processor 442 may receive 2D/3Dx content 444 from a content server 448 (e.g., from a server over a network, such as a LAN, WAN, or combination of networks, such as the Internet). 2D/3Dx content processor 442 may receive 2D/3Dx content 444 through a communication interface of an electronic device that executes application program 414. Alternatively, 2D/3Dx content processor 442 may receive 2D/3Dx content 444 from a storage device associated with (e.g., internal to or connected to) the electronic device that executes application program 414. 2D/3Dx content processor 442 processes the received 2D and/or 3D content, and provides the processed content for display by one or more of displays 418a-418c. For example, 2D/3Dx content processor 442 may buffer the received content, may resize or scale the received content, may translate the received content from a form that is unsupported by the target display to a form that is supported by the target display, and/or may process the received content in any other manner.

Application program 414 may include any combination of code modules 432a-432c, 2D/3Dx content generator 440, and 2D/3Dx content processor 442, depending on the particular implementation. Any one or more of code modules 432a-432c, 2D/3Dx content generator 440, and 2D/3Dx content processor 442 may be code that is programmed on an application-by-application basis, or may be library modules that are accessible in a program code library to be called by, included in, and/or otherwise linked with application program 414.

The embodiments of display system 450 and application program 414 shown in FIG. 4B are provided for purposes of illustration. In further embodiments, display system 450 and application program 414 may include fewer, further, and/or alternative components, as would be known to persons skilled in the relevant art(s). Further embodiments regarding the features of display system 450 and application program 414 are described in the following subsections.

B. Exemplary Embodiments for Displaying Content with an Application 2D and 3D content may be displayed by an application in various ways according to embodiments. For instance, FIG. 5 shows a flowchart 500 providing a process for an application to configure a display screen for display of mixed 2D and 3D content, according to an exemplary embodiment. Flowchart 500 may be performed by applications described elsewhere herein, such as application 104 of FIG. 1-3 and 4A or application program 414 of FIG. 4B. Further structural and operational embodiments will be apparent to persons skilled in the relevant art(s) based on the discussion regarding flowchart 500. Flowchart 500 is described as follows.

Flowchart 500 begins with step 502. In step 502, a first command is generated directing a two-dimensional display of two-dimensional content within a first region of a screen. For example, referring to FIG. 4A, application 104 may include first program code that generates a first command that is a configuration request for a first region of screen 412 of display device 408 to support display of 2D content. Possible examples of the first command are described elsewhere herein. Subsequently to the first region of screen 412 being configured according to the command, the 2D content may be transmitted by application 104 to display device 408 for display on screen 412.

In step 504, a second command is generated directing a three-dimensional display of three-dimensional content within a second region of the screen. For example, application 104 of FIG. 4A may include second program code that generates a second command that is a configuration request for a second region of screen 412 to support display of 3D content. Possible examples of the second command are described elsewhere herein. Subsequently to the second region of screen 412 being configured according to the second command, the 3D content may be transmitted by application 104 to display device 408 for display on screen 412.

Figure 7:
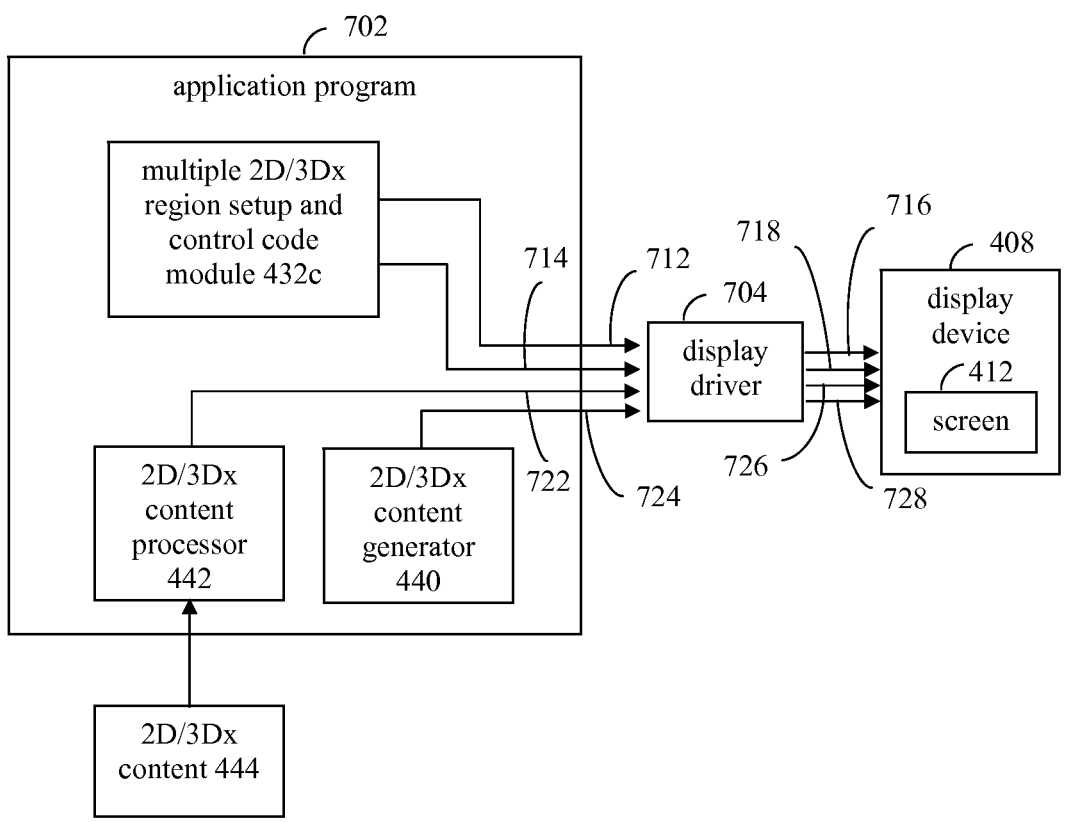
FIG. 7 shows a block diagram of an application interfaced with a display device to display mixed 2D and 3D content, according to an exemplary embodiment.

The steps of flowchart 500 may be performed in various ways. For instance, FIG. 6 shows a flowchart 600 that is an example variant of flowchart 500 of FIG. 5. Flowchart 600 may be performed by applications described elsewhere herein, such as application 104 of FIG. 1-3 and 4A or application program 414 of FIG. 4B. Flowchart 600 is described with respect to FIG. 7, which shows a block diagram of an electronic device 700 interfaced with a display device 408, according to an exemplary embodiment. Device 700 is an example of device 110 or device 112 of FIG. 1, and display device 408 may be included in or may be external to device 700. In the example of FIG. 7, device 700 includes an application program 702 and a display driver 704. Application program 702 is an example of application 104, and display driver 704 is an example of mixed 2D & 3Dx driver variant 438 of FIG. 4B. As shown in FIG. 7, application program 702 includes multiple 2D/3Dx region setup and control code module 432c, 2D/3Dx content generator 440, and 2D/3Dx content processor 442 (of FIG. 4B). Further structural and operational embodiments will be apparent to persons skilled in the relevant art(s) based on the discussion regarding flowchart 600. Flowchart 600 is described as follows.

Flowchart 600 begins with step 602. In step 602, a first command is generated directing at least in part a first configuration of a first region of the screen to support the first content, the first configuration being a first three-dimensional configuration. During execution of application program 702, program code may be encountered for display of three-dimensional content. For instance, multiple 2D/3Dx region setup and control code module 432c may include first program code (e.g., 2D region setup and control code module 432a) that is executed to generate a first command 712 directing a first region of screen 412 to be configured according to a first configuration that supports the display of three-dimensional content. First command 712 may include any number of parameters that define the first configuration. First command 712 and any included parameters may define screen region characteristics such as a 3D type, size, location, region shape, type, brightness, resolution, contrast, orientation, and/or other region characteristic mentioned elsewhere herein or otherwise known. Possible example commands for first command 712 are described elsewhere herein. First command 712 may be transmitted from application 702 directly, or through an API and/or OS, to display driver 704. Display driver 704 receives first command 712, and generates control signal(s) 716 that are received by display device 408. Control signal(s) 716 place(s) a first region of screen 412 in a 3D display mode for display of the 3D content.

In step 604, a second command is generated directing at least in part a second configuration of a second region of the screen to support the second content. During execution of application program 702, further program code may be encountered for display of second content, which may be two-dimensional or three-dimensional content (e.g., of any type of 3D content). For instance, multiple 2D/3Dx region setup and control code module 432c may include program code (e.g., 2D region setup and control code module 432a or 3Dx region setup and control code module 432b) that is executed to generate a second command 714 directing a second region of screen 412 to be configured according to a second configuration that supports the display of the second content. Second command 714 may include any number of parameters that define the second configuration. Second command 714 and any included parameters may define screen region characteristics such as a 3D type (if the second content is 3D), 3D depth, size, location, shape, region type, brightness, resolution, contrast, orientation, and/or other region characteristic mentioned elsewhere herein or otherwise known. Possible example commands for second command 714 are described elsewhere herein. Second command 714 may be transmitted from application 702 directly, or through an API and/or OS, to display driver 704. Display driver 704 receives second command 714, and generates control signal(s) 718 that are received by display device 408. Control signal(s) 718 place(s) a second region of screen 412 in a 2D or 3D display mode for display of the second content.

In step 606, the display of the first content is caused within the first region of the screen. For instance, the first content, which is three-dimensional content, may be internally generated by application 702 (e.g., by 2D/3Dx content generator 440) or received from an external source (as 2D/3Dx content 444) and processed by application 702 (e.g., by 2D/3Dx content processor 442). For instance, in the example of FIG. 7, 2D/3Dx content processor 442 is shown receiving 2D/3D content 444, which in the example of FIG. 7 is three-dimensional content. As described above for three-dimensional content, images of differing perspective are delivered to the right and left eyes of a viewer. The images are combined in the visual center of the brain of the viewer to be perceived as a three-dimensional image. Thus, 2D/3D content 444 includes left and right images or image streams to be displayed to the left and right eyes of a viewer, respectively. 2D/3Dx content processor 442 processes 2D/3D content 444, and outputs 3D graphical data 722 that defines the 3D content. Display driver 704 may receive 3D graphical data 722 and transmit corresponding processed 3D graphical data 726 that is received by display device 408. Display device 408 may display the 3D content of processed 3D graphical data 726 in the first region of screen 412, which is configured according to the first configuration request.

In step 608, the display of the second content is caused within the second region of the screen. For instance, the second content, which may be two-dimensional or three-dimensional content, may be internally generated by application 702 (e.g., by 2D/3Dx content generator 440) or received from an external source (as 2D/3Dx content 444) and processed by application 702 (e.g., by 2D/3Dx content processor 442). For instance, in the example of FIG. 7, 2D/3Dx content generator 440 generates the second content as two-dimensional content. As described above for two-dimensional content, same images are delivered to the right and left eyes of a viewer so that the content is perceived as two-dimensional. Thus, 2D/3Dx content generator 440 may generate a single image or image stream that is output as 2D graphical data 724. Display driver 704 may receive 2D graphical data 724 and transmit corresponding processed 2D graphical data 728 that is received by display device 408. Display device 408 may display the 2D content of processed 2D graphical data 728 in the second region of screen 412, which is configured according to the second configuration request.

As such, according to flowcharts 500 (FIG. 5) and 600 (FIG. 6), two-dimensional and three-dimensional content provided by an application may simultaneously be displayed within corresponding regions of a display screen. Furthermore, different types of three-dimensional content (e.g., different resolutions, different numbers of image pairs, different stereoscopic depths, etc.) are enabled to be individually or simultaneously displayed by an application. In embodiments, any number of different types of two-dimensional and three-dimensional content may be displayed in any number of regions of screen 412.

Figure 8A:
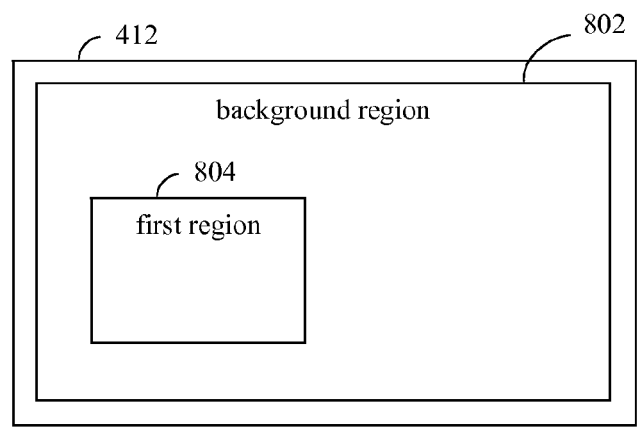
FIGS. 8A-8C show examples of a screen displaying 2D and 3D content in various screen regions, including tabs, frames, and objects, according to embodiments.
Figure 8B:
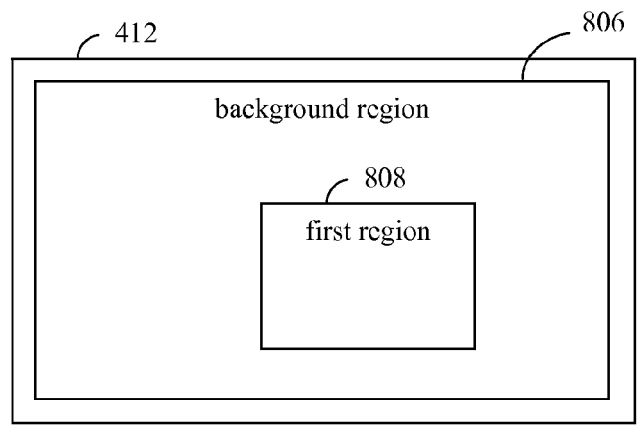
Figure 8C:
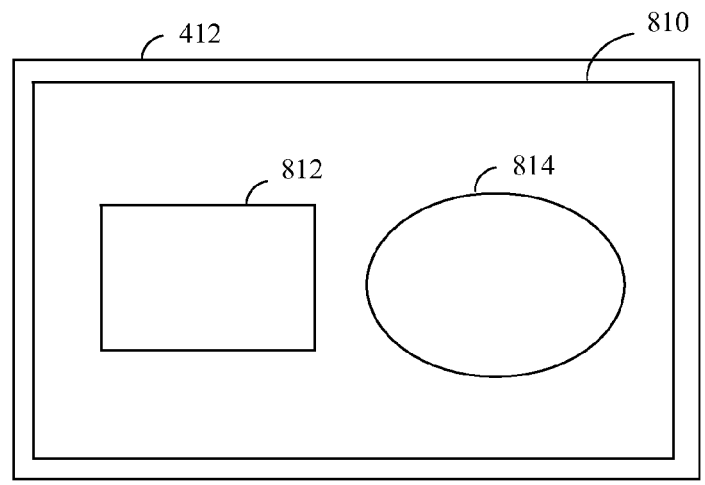

For instance, FIGS. 8A-8C show examples of screen 412 displaying content in various screen regions, according to embodiments. FIG. 8A shows screen 412 including a first region 804 and a background region 802. Background region 802 is optionally present or visible, depending on whether first region 804 covers screen 412 partially or entirely. When present, background region 802 may be a two-dimensional or three-dimensional background region generated by an operating system (e.g., OS 106 of FIG. 4A or OS 446 of FIG. 4B) or an application other than the application that provides content for display in first region 804. First region 804 is configured for the display of three-dimensional content by an application according to step 504 of flowchart 500 (or according to steps 602 and 606 of flowchart 600 of FIG. 6). As shown in FIG. 8A, background region 802 has a size that is approximately the full display area of screen 412, and first region 804 has a smaller size, filling a rectangular space imposed on background region 802. For instance, in one embodiment provided for purposes of illustration, background region 802 may be a two-dimensional desktop region displayed on a computer screen, and first region 804 may be a window generated by an application displaying three-dimensional content in the desktop region. In another embodiment, background region 802 may correspond to two-dimensional television content, while first region 804 is a picture-in-picture region generated by an application that displays three-dimensional television content overlaid on background region 802.

In another example, FIG. 8B shows screen 412 including a first region 808 and a background region 806. Background region 806 is optionally present, depending on whether first region 808 covers screen 412 partially or entirely. When present, background region 806 may be a two-dimensional or three-dimensional background region generated by an operating system (e.g., OS 106 of FIG. 4A or OS 446 of FIG. 4B) or an application other than the application that provides content for display in first region 808. First region 808 is configured for the display of two-dimensional content by an application according to step 502 of flowchart 500 (or according to steps 604 and 608 of flowchart 600 of FIG. 6). As shown in FIG. 8B, background region 806 has a size that is approximately the full display area of screen 412, and first region 808 has a smaller size, filling a rectangular space imposed on background region 806. For instance, in one embodiment provided for purposes of illustration, background region 806 may be a three-dimensional desktop region displayed on a computer screen, and first region 808 may be a window generated by an application displaying two-dimensional content in the desktop region. In another embodiment, background region 806 may correspond to three-dimensional television content, while first region 808 is a picture-in-picture region generated by an application that displays two-dimensional television content overlaid on background region 806.

In another example, FIG. 8C shows screen 412 including a first region 812, a second region 814, and a background region 810. First region 812 is configured for the display of two-dimensional content by an application according to step 502 of flowchart 500 of FIG. 5 (or according to steps 604 and 608 of flowchart 600 of FIG. 6), and second region 814 is configured for the display of three-dimensional content by the same application according to step 504 of flowchart 500 (or according to steps 602 and 606 of flowchart 600 of FIG. 6). As shown in FIG. 8C, background region 810 has a size that is approximately the full display area of screen 412, first region 812 has a smaller size, filling a rectangular space imposed on background region 810, and second region 814 also has a smaller size, filling an elliptical space imposed on background region 810, adjacent to first region 812. Similarly to FIGS. 8A and 8B, background region 810 may be a two-dimensional or three-dimensional desktop region of a computer screen, a two-dimensional or three-dimensional television screen region, etc. First and second regions 812 and 814 are both generated by a same application (e.g., application 104, application program 414, application program 702, etc.) that has mixed 2D and 3D display capability. First region 812 may be a window displaying two-dimensional content in the desktop region, in a picture-in-picture region, etc., and second region 814 may be a window displaying three-dimensional content in the desktop region, in a picture-in-picture region, etc. In the example of FIG. 8C, first and second regions 812 and 814 are not in contact with each other. In another embodiment, first and second regions 812 and 814 may be in contact with each other or overlapping. Furthermore, one or more additional screen regions may be present that display 2D or 3D content provided by the application.

It is noted that the examples of FIGS. 8A-8C are provided for purposes of illustration, and are not intended to be limiting.

C. Exemplary Embodiments for Developing an Application with Mixed 2D and 3D Display Capability In embodiments, applications, such as application 104, may be developed using a programming language that provides native support for the display of mixed 2D and 3D content. For example, the programming language may provide functions for both defining a region within which to display image or video content and for specifying one or more commands for defining the region and/or parameters to be associated with the region. The commands and/or parameters can specify, for example, one or more of: a type of video content that will be displayed within the region (e.g., 2D, stereoscopic 3D or a particular type of multi-view 3D), a desired orientation of the video content within the region, a brightness/contrast to be associated with the region, a video resolution to be associated with the region, and/or further display characteristics. Examples of such commands and parameters are described above. Applications may be developed as computer programs that use such a programming language and include such functions. When the computer programs are compiled and executed, they operate to cause one or more function calls to be placed to an operating system, graphics API, or device driver so that the defined region is opened on the display and the video content is presented therein in a manner that is consistent with the associated parameters.

Figure 9:
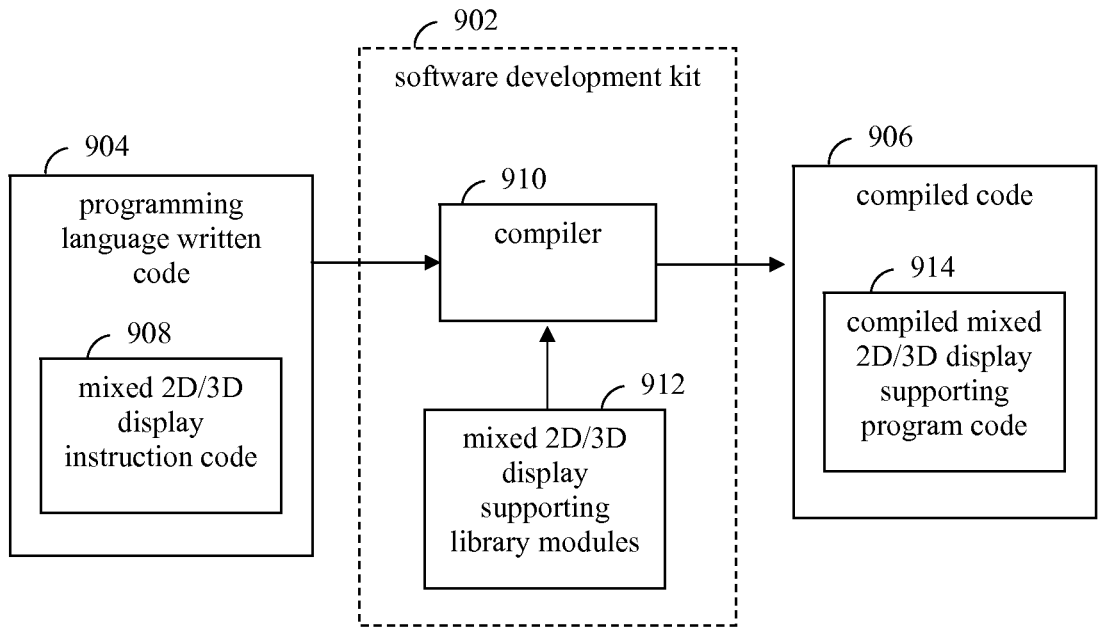
FIG. 9 shows a software development system for developing application programs that support mixed 2D and 3D content, according to an exemplary embodiment.

For instance, FIG. 9 shows a software development system 900 for developing application programs that support mixed 2D and 3D content, according to an exemplary embodiment. As shown in FIG. 9, system 900 includes a software development kit (SDK) 902. SDK 902 receives programming language written code 904 and generates compiled code 906. As shown in FIG. 9, programming language written code 904 includes mixed 2D/3D display instruction code 908, and compiled code 906 includes compiled mixed 2D/3D display supporting program code 914. These features of FIG. 9 are described as follows.

SDK 902 is a software development kit for a programming language that enables simultaneous display on a screen of both two-dimensional content and three-dimensional content. As shown in FIG. 9, SDK 902 includes a compiler 910 and one or more mixed 2D/3D display supporting library modules 912. Although not shown in FIG. 9, SDK 902 may include further components, such as source code editor (e.g., a text editor tool for a software developer to enter and edit source code, such as programming language written code 904), a build automation tool that automates tasks for software developers, a debugger, etc.

SDK 902 may provide an interface (e.g., a GUI, etc.) to receive programming language written code 904. Programming language written code 904 is written by one or more software developers in a programming language that supports the display of mixed 2D and 3D content. The programming language is an artificial language that is designed to express algorithms and/or computations that can be performed by a machine (e.g., by a device that includes processor 402 shown in FIG. 4A). The programming language is defined by a syntax and semantics. The programming language may be a form of an existing programming language, such as C, C++, C#, Fortran, Java, JavaScript, Pascal, Perl, PHP, Python, or Ruby, that is modified to support the display of mixed 2D and 3D content (e.g., to include and support the example commands and parameters described elsewhere herein), or may be a separately created programming language that provides such support.

Compiler 910 is configured to compile code written in the programming language into compiled code. For example, as shown in FIG. 9, compiler 910 may compile programming language written code 904 into compiled code 906. As shown in FIG. 9, compiler 910 may link compiled code to one or more of mixed 2D/3D display supporting library modules 912.

Figure 10:
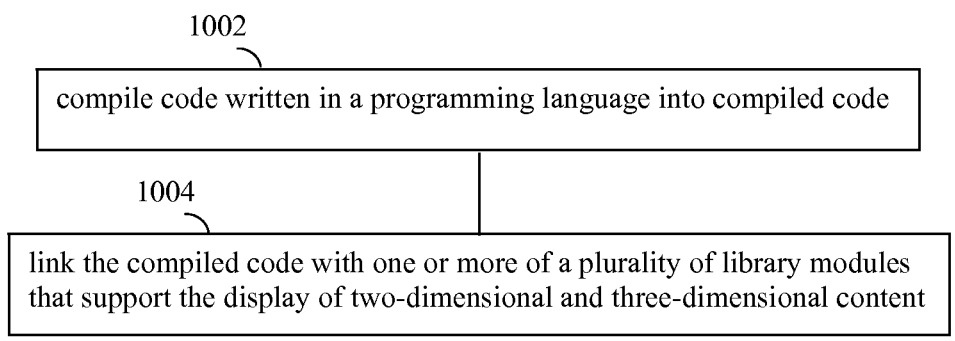
FIG. 10 shows a flowchart that provides a process for generating an application that includes support for the display of mixed 2D and 3D content, according to an exemplary embodiment.

For instance, in an embodiment, SDK 902 may perform a flowchart 1000 shown in FIG. 10. Flowchart 1000 provides a process for generating an application that includes support for the display of mixed 2D and 3D content, according to an exemplary embodiment. Further structural and operational embodiments will be apparent to persons skilled in the relevant art(s) based on the discussion regarding flowchart 1000. Flowchart 1000 is described as follows.

Flowchart 1000 begins with step 1002. In step 1002, code written in a programming language is compiled into compiled code. For example, as shown in FIG. 9, compiler 910 may receive and compile programming language written code 904 into compiled code 906. Techniques for compiler 910 to compile written code into compiled code are well known to persons skilled in the relevant art(s).

In step 1004, the compiled code is linked with one or more of a plurality of library modules that support the display of two-dimensional and three-dimensional content. Step 1004 is optional. The programming language used for programming language written code 904 may have an associated core library (also known as a "standard library" or "program library"). The core library may include definitions for commonly used algorithms, data structures, and mechanisms for input and output in the form of library modules. The core library may include one or more library modules, including one or more of mixed 2D/3D display supporting library modules 912. Compiler 910, when compiling written code 904 into compiled code 906, may link one or more of library modules 912 with compiled code 906 to enable compiled code 906 to support the display of two-dimensional and three-dimensional content according to the linked library modules. Compiled code 906 (with any linked library modules) may be released for use in an electronic device as an example of application 104 of FIG. 1-3 and 4A or application program 414.

Compiled code 906 may include compiled code that issues commands to one or more of library modules 912 to perform various functions. For instance, during execution of compiled code 906, first code of compiled code 906 (e.g., 2D region setup and control code module 432a, 3Dx region setup and control code module 432b, or multiple 2D/3Dx region setup and control code module 432c of FIG. 4B) may deliver one or more commands to library module(s) 912. The one or more commands may be indicative of a viewing dimension, such as 2D or 3D. Library module(s) 912 may respond to the one or more commands by at least in part placing a first screen region of a display (e.g., screen 412 of display device 408) in a selected one of a two-dimensional configuration or a three-dimensional configuration, the selection in conformance with the indicated viewing dimension. Compiled code 906 may include further code (e.g., 2D/3Dx content generator 440 or 2D/3Dx content processor 442) that at least assists in establishing display of content in the first screen region of the screen, the content being 2D or 3D content, depending on the configuration of the screen region.

Figure 11:
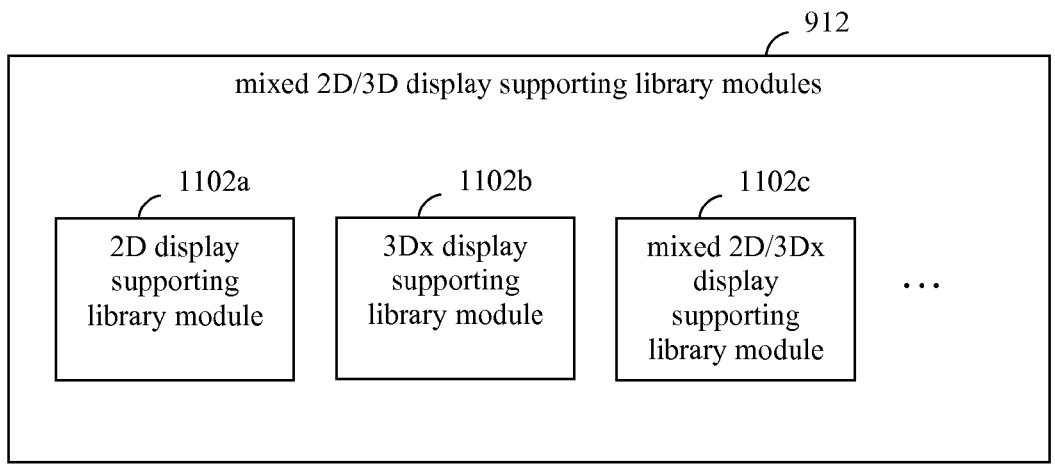
FIG. 11 shows a block diagram of an example of mixed 2D/3D display supporting library modules that may be linked to an application, according to an embodiment.

For instance, FIG. 11 shows a block diagram of an example of mixed 2D/3D display supporting library modules 912, according to an embodiment. As shown in the example of FIG. 11, library modules 912 include a 2D display supporting library module 1102a, a 3Dx display supporting library module 1102b, and a mixed 2D/3Dx display supporting library module 1102c. Furthermore, in embodiments, library modules 912 may include any number of further and/or alternative library modules 1102.

When linked to compiled code 906, 2D display supporting library module 1102a is configured to respond to calls from compiled code 906 by assisting in establishing a first region of a screen (e.g., screen 412) that involves placing the first region in a first configuration to support display of two-dimensional content. As such, the first configuration is a two-dimensional configuration. Any number of variants of 2D display supporting library module 1102a may be present in library modules 912 that provide corresponding configurations to support display of different types of 2D content in screen regions.

When linked to compiled code 906, 3Dx display supporting library module 1102b is configured to respond to calls from compiled code 906 by assisting in establishing a second region of the screen that involves placing the second region in a second configuration to support display of three-dimensional content. As such, the second configuration is a three-dimensional configuration. Any number of variants of 3D display supporting library module 1102b may be present in library modules 912 that provide corresponding configurations to support display of different types of 3D content in screen regions.

When linked to compiled code 906, mixed 2D/3Dx display supporting library module 1102c is configured to respond to calls from compiled code 906 by assisting in establishing multiple regions of the screen, placing the multiple regions in one or more corresponding configurations to support display of two-dimensional and three-dimensional content. Any number of variants of mixed 2D/3D display supporting library module 1102c may be present in library modules 912 that provide corresponding configurations to support display of different types of 2D and 3D content in screen regions.

Figure 12:
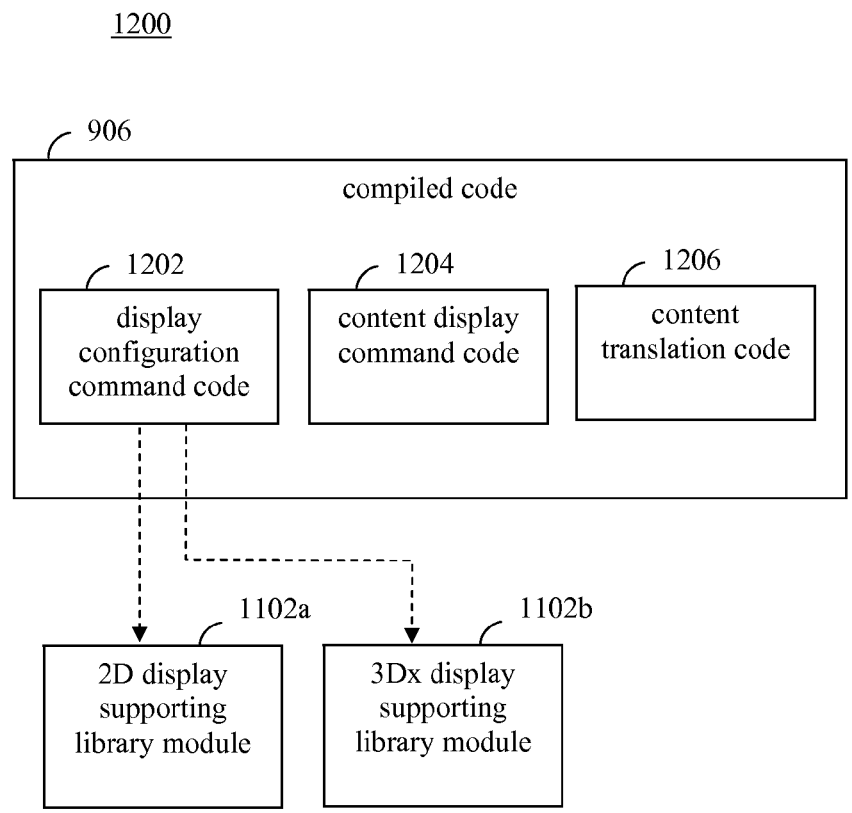
FIG. 12 shows a block diagram of compiled code linked to library modules that provide 2D and 3D display support, according to an exemplary embodiment.

As described above, compiler 902 may link compiled code 906 with one or more of library modules 912. For instance, FIG. 12 shows a block diagram of compiled code 906 linked to library modules that provide 2D and 3D display support, according to an exemplary embodiment. In the example of FIG. 12, compiled code 906 includes display configuration command code 1202, content display command code 1204, and content translation code 1206. Any one or more of display configuration command code 1202, content display command code 1204, and content translation code 1206, and/or one or more further and/or alternative compiled code modules may be present in compiled code 906, in embodiments, depending on the particular implementation.

Display configuration command code 1202 is compiled code that when executed, causes a screen region (e.g., a window) configured for the display of two- or three-dimensional content to be opened in a region of the display screen. As shown in the example of FIG. 12, display configuration command code 1202 is linked (as indicated by dotted lines) to 2D display supporting library module 1102a and 3Dx display supporting library module 1102b. As such, display configuration command code 1202 may make a call to 2D display supporting library module 1102a or 3Dx display supporting library module 1102b to configure the screen region for display of 2D content or 3D content, respectively. In embodiments, display configuration command code 1202 may include one or more of 2D region setup and control code module 432a, 3Dx region setup and control code module 432b, or multiple 2D/3Dx region setup and control code module 432c of FIG. 4B that are configured to issue the calls to library modules 1102a and 1102b (and/or library module 1102c, when present).

Content display command code 1204 is compiled code that when executed, delivers content to a screen region opened on the screen according to display configuration command code 1202. For instance, content display command code 1204 may cause 2D content or 3D content to be delivered to the display device for display by the screen region. In embodiments, content display command code 1204 may include one or more of 2D/3Dx content generator 440 and 2D/3Dx content processor 442 to process and deliver external content (e.g., 2D/3Dx content 444) and to generate and deliver internally generated content, respectively.

Content translation code 1206 is compiled code that when executed, converts a first type of content to a second type of content to be provided for display by the display screen in a screen region opened on the screen according to display configuration command code 1202. For instance, the translation may be performed if the display screen does not support a particular type of content display, if a user has selected or indicated a preference, etc. In the examples of FIGS. 8A-8C described above, it is assumed that display device 408 supports the display of both two-dimensional and three-dimensional content. However, it is noted that not all types of display device 408 may support both two-dimensional content and three-dimensional content. Furthermore, not all types of display device 408 that support three-dimensional content may support all types of three-dimensional content. As such, in embodiments, content translation code 1206 may be configured to translate unsupported types of content to supported types of content.

Figure 13:
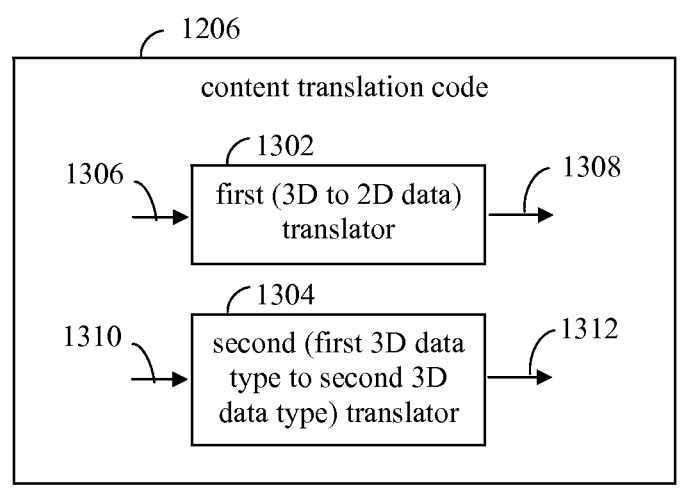
FIG. 13 shows a block diagram of content translation code, according to an exemplary embodiment.

For instance, FIG. 13 shows a block diagram of content translation code 1206, according to an exemplary embodiment. As shown in FIG. 13, content translation code 1206 includes a first translator 1302 and a second translator 1304. In embodiments, compiled code 906 may include one or both of first and second translators 1302 and 1304. First translator 1302 may be present in content translation code 1206 when display device 408 does not support the display of three-dimensional content. Second translator 1302 may be present in content translation code 1206 when display device 408 associated with content translation code 1206 does not support the display of one or more types of three-dimensional content.

First translator 1302 is configured to translate received 3D data to 2D data for display by a display device. For example, content translation code 1206 may receive an indication of a 2D configuration of a screen region from display configuration code 1202. As such, if received content for display in the screen region is 3D content, first translator 1302 may translate three-dimensional graphical data 1306 representative of the received content to two-dimensional graphical data 1308. The supported type of two-dimensional graphical data 1308 may be transmitted to the display device to enable the corresponding two-dimensional content to be displayed in the region of screen 412.

Furthermore, a display device that supports the display of three-dimensional data may not support all types of three-dimensional data (e.g., the display device does not support 3D graphics data having additional camera views other than initial first right and left views, does not support a number of camera views greater than 3D-4, etc.). Second translator 1304 is configured to translate received 3D data of a first 3D content type to 3D data of a second 3D content type for display by a display device. For example, content translation code 1206 may receive an indication of a 3D configuration of a screen region from display configuration code 1202. As such, if received content for display in the screen region is a type of 3D content that is unsupported by the screen region, second translator 1304 may translate the unsupported type of three-dimensional graphical data 1310 of the received content to a supported type of three-dimensional graphical data 1312. The supported type of three-dimensional graphical data 1312 may be transmitted to the display device to enable the corresponding three-dimensional content to be displayed in the region of screen 412.

First translator 1302 may be configured in various ways to translate received 3D data to 2D data. For instance, in an embodiment, three-dimensional graphical data 1306 may be received as a stream of right image data and left image data.

First translator 1302 may be configured to combine the right and left image data into two-dimensional image data that defines a stream of two-dimensional images that may be output as two-dimensional graphical data 1308. In another embodiment, first translator 1302 may be configured to select the right image data or the left image data to be output as two-dimensional graphical data 1308, while the other of the right image data or left image data is not used. In further embodiments, first translator 1302 may translate received 3D data to 2D data in other ways.

Second translator 1304 may be configured in various ways to translate 3D data of a first 3D content type to 3D data of a second 3D content type. For instance, second translator 1304 may translate a first 3D multiview type (e.g., 3D-16) to a second 3D multiview type (e.g., 3D-4) or to a single 3D view. In such an embodiment, second translator 1304 may not pass extra left-right image pairs from first-type three-dimensional graphical data 1310 to second-type three-dimensional graphical data 1312. In an embodiment, second translator 1304 (and/or first translator 1302) may use techniques of image scaling to modify an unsupported display resolution to a supported display resolution. For instance, second translator 1304 may use upsampling or interpolating to increase resolution, and may use subsampling or downsampling to decrease resolution. In further embodiments, second translator 1304 may translate 3D data in other ways. In still further embodiments, a translator may be present to translate 2D content to 3D content, such as when a user has a preference to view content as 3D content. Various techniques may be used to convert 2D graphical data to 3D graphical data, as would be known to person skilled in the relevant art(s).

Referring back to FIG. 12, compiled code 906 may include further and/or alternative code modules than shown in FIG. 12. Furthermore, content display command code 1204 and/or content translation code 1206 may access one or more library modules 1102 to perform their respective functions.

For instance, compiled code 906 may include program code that generates a request for an indication of at least one characteristic of a display screen. For instance, an application based on compiled code 906 (e.g., application 104) may generate a request for characteristics of screen 412 of display device 408 to determine the capabilities of screen 412. In this manner, the application may provide types of 2D and/or 3D content that are supported by screen 412 (e.g., may translate unsupported types of content, as described above). Furthermore, a library module 1102 may be present that is capable of requesting an indication of display screen characteristics for program code of compiled code 906.

In another example, compiled code 906 may include program code (or may access a library module) that receives an input signal from a user input interface, such as user input interface 420 of OS 446 in FIG. 4B. As described above, user input interface 402 receives user input to enable persons to interact with display devices associated with display system 450. For example, via user input interface 402, a user may be enabled to move displayed graphical objects (e.g., icons, windows, etc.), may be able to modify (e.g., rotate, resize, etc.) displayed graphical objects, to interact with displayed controls, etc. User input interface 402 may provide a command-line interface, a GUI, and/or other interface with which the user can interact. In embodiments, user input interface 402 may enable users to adjust three-dimensional characteristics of displayed three-dimensional content. For example, user input interface 402 may enable three-dimensionality of displayed content to be turned on or off (e.g., to toggle between two-dimensionality and three-dimensionality). User input interface 402 may enable a degree of three-dimensionality of displayed content to be modified (e.g., increased or decreased, such as by changing a depth of three-dimensionality, increasing or decreasing a number of supplied camera views, etc.), may enable three-dimensional objects to be rotated in three-dimensions, and/or may enable further types of adjustment to three-dimensional characteristics of displayed three-dimensional content. Furthermore, user input interface 402 may enable other characteristics of displayed content to be modified, such as modifying contrast, brightness, etc.

In embodiments, the user may interact with user input interface 402 in various ways, including using a mouse/pointing device to move a displayed pointer/cursor. The pointer may be used to "click and drag" objects to move them, to resize objects, to rotate objects, to select controls/settings, to open a pop-up menu, etc. In other embodiments, the user may interact with a keyboard, a thumb wheel or other wheel, a roller ball, a stick pointer, a touch sensitive display, any number of virtual interface elements (e.g., such as a keyboard or other user interface element displayed by screen 412), a voice recognition system, and/or other user interface elements described elsewhere herein or otherwise known to provide user input. For instance, user input interface 402 may support a touch screen that is reactive to user finger touches to the screen to cause three-dimensional characteristics of displayed objects to be modified. For instance, particular motions of one or more figures against the screen may cause object resizing, 3D rotation, movement in 3D, etc. (e.g., touching two fingers to the screen, and dragging them together may be interpreted as "grabbing" a window and moving the window in 3D).

As a result of the input signal received at the user input interface, the program code of compiled code 906 (and/or a corresponding library module) may generate a command that is configured to cause an adjustment of a three-dimensional characteristic of three-dimensional content displayed in the corresponding region of screen 412. The command may be received by a display driver, such as one of driver variants 434, 436, and 438 of FIG. 4B, or display driver 704 of FIG. 7, which may generate a control signal based on the command. The control signal may relate to selecting and/or modifying a three-dimensional characteristic indicated by a user interacting with user input interface 402. The control signal may be delivered by the display driver to the display device to cause an adjustment of the three-dimensional characteristic of three-dimensional content displayed in a region of screen 412 (e.g., by causing a device driver circuit to generate corresponding drive signals).

For example, a user may interact with one of regions 804, 808, 812, or 814 shown in FIGS. 8A-8C. The user may resize a region and/or object that is displayed as three-dimensional, may rotate a region and/or object that is displayed as three-dimensional, may move a region and/or object that is displayed as three-dimensional in any of the three degrees (e.g., left-right, up-down, or forward-backward) from a first screen region to a second screen region, may change a degree of three-dimensionality of a region and/or object that is displayed as three-dimensional (e.g., reducing or increasing a number of associated camera views), etc. A corresponding command (and thereby, a control signal) may be generated to adjust the three-dimensional characteristic of the three-dimensional content being displayed.

D. Example Display Device Screen Embodiments

Embodiments described herein for applications and programming languages that support the display of two-dimensional and three-dimensional content may be implemented with respect to various types of display devices. For example, as described above, some display screens are configured for displaying two-dimensional content, although they may display two-dimensional images that may be combined to form three-dimensional images by special glasses worn by users. Some other types of display screens are capable of display two-dimensional content and three-dimensional content without the users having to wear special glasses using techniques of autostereoscopy. As described above, application embodiments described herein may generate configuration requests/commands to configure regions of the display screen for display of content, and may provide the content for display in the configured regions. Display drivers (e.g., display driver 306 of FIG. 3, driver variants 434, 436, and 438 of FIG. 4B, display driver 704 of FIG. 7, etc.) may receive the configuration requests/commands, and may generate control signals to cause the screen to be configured as indicated. Furthermore, the display drivers may supply the content provided by the applications to the display devices to be displayed on the screen. Example display devices, screens, and display driver circuits are described as follows that receive the control signals, are configured accordingly, and that receive and display the provided content.

As described above, display devices, such as display device 408, may be implemented in various ways. For instance, display device 408 may be a television display (e.g., an LCD (liquid crystal display) television, a plasma television, etc.), a computer monitor, or any other type of display device. Display device 408 may include any suitable type or combination of light and image generating devices, including an LCD screen, a plasma screen, an LED (light emitting device) screen (e.g., an OLED (organic LED) screen), etc. Furthermore, display device 408 may include any suitable type of light filtering device, such as a parallax barrier (e.g., an LCD filter, a mechanical filter (e.g., that incorporates individually controllable shutters), etc.) and/or a lenticular lens, and may be configured in any manner, including as a thin-film device (e.g., formed of a stack of thin film layers), etc. Furthermore, display device 408 may include any suitable light emitting device as backlighting, including a panel of LEDs or other light emitting elements.

Figure 14:
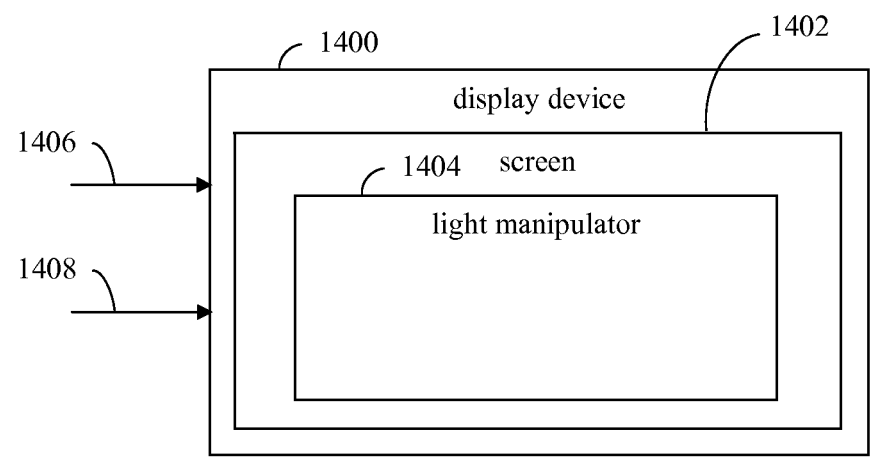
FIG. 14 shows a block diagram of a display device having a light manipulator that enables display of 3D content by a screen, according to an exemplary embodiment.

For instance, FIG. 14 shows a block diagram of a display device 1400, according to an exemplary embodiment. As shown in FIG. 14, display device 1400 includes a screen 1402. Display device 1400 is an example of display device 408 and screen 1402 is an example of screen 412 described above. Device 1400 receives one or more control signals 1406 (e.g., based on commands from application 104, application program 414, application program 702, compiled code 906, library modules, etc.) that are configured to place screen 412 in a desired display mode (e.g., either a two-dimensional display mode or a three-dimensional display mode). As shown in FIG. 14, screen 1404 includes a light manipulator 1404. Light manipulator 1404 is configured to manipulate light that passes through light manipulator 1404 to enable three-dimensional images to be delivered to users in a viewing space. For instance, control signal(s) 1406 may be configured to activate or deactivate light manipulator 1404 to place screen 412 in a three-dimensional display mode or a two-dimensional display mode, respectively.

Examples of light manipulator 1404 include a parallax barrier and a lenticular lens. For instance, light manipulator 1404 may be a parallax barrier that has a layer of material with a series of precision slits. The parallax barrier is placed proximal to a light emitting pixel array so that a user's eyes each see a different set of pixels to create a sense of depth through parallax. In another embodiment, light manipulator 1404 may be a lenticular lens that includes an array of magnifying lenses configured so that when viewed from slightly different angles, different images are magnified. Such a lenticular lens may be used to deliver light from a different set of pixels of a pixel array to each of the user's eyes to create a sense of depth. Embodiments are applicable display devices that include such light manipulators, include other types of light manipulators, and that may include multiple light manipulators.

As shown in FIG. 14, display device 1400 receives a content signal 1408 (e.g., from device 400 of FIG. 4A, or other electronic device). Content signal 1408 includes two-dimensional or three-dimensional content for display by screen 1402, depending on the particular display mode. In the embodiment of FIG. 14, light manipulator 1404 is physically fixed—is not adaptable. As such, when present, light manipulator 1404 (e.g., a fixed parallax barrier or a fixed lenticular lens) always delivers three-dimensional images of a particular type to a particular region in a viewing space. As such, light manipulator 1404 is not adaptable to deliver other types of three-dimensional images and/or to deliver two and/or three-dimensional images to multiple different regions of a viewing space.

Figure 15:
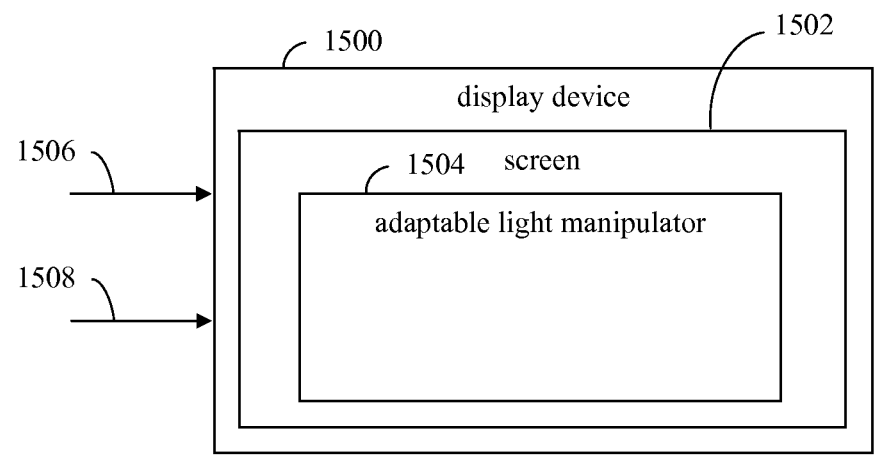
FIG. 15 shows a block diagram of a display device having an adaptable light manipulator that enables the adaptable display of 3D content by a screen, according to an exemplary embodiment.

In contrast, FIG. 15 shows a block diagram of a display device 1500 that is adaptable, according to an exemplary embodiment. As shown in FIG. 15, display device 1502 includes a screen 1502. Display device 1500 is an example of display device 408 and screen 1502 is an example of screen 412 described above (e.g., with respect to FIG. 6). Furthermore, as shown in FIG. 15, screen 1504 includes an adaptable light manipulator 1504. Adaptable light manipulator 1504 is configured to manipulate light that passes through adaptable light manipulator 1504 to enable three-dimensional images to be delivered to users in a viewing space. Furthermore, adaptable light manipulator 1504 is adaptable—is not physically fixed in configuration. As such, adaptable light manipulator 1504 is adaptable to deliver multiple different types of three-dimensional images and/or to deliver three-dimensional images to different/moving regions of a viewing space. Furthermore, in an embodiment, different regions of adaptable light manipulator 1504 may be adaptable such that multiple two-dimensional and/or three-dimensional images may be simultaneously delivered by screen 1502 to the viewing space.

Device 1500 receives one or more control signals 1506 (e.g., based on commands from application 104, application program 414, application program 702, compiled code 906, library modules, etc.) that are configured to place screen 1502 in a desired display mode (e.g., either a two-dimensional display mode or a three-dimensional display mode), and/or to configure three-dimensional characteristics of any number and type as described above, such as configuring adaptable light manipulator 1504 to deliver different types of three-dimensional images, to deliver three-dimensional images to different/moving regions of a viewing space, and to deliver two-dimensional and/or three-dimensional images from any number of regions of screen 1502 to the viewing space.

As shown in FIG. 15 display device 1500 receives a content signal 1508 (e.g., from device 400 of FIG. 4A, or other electronic device). Content signal 1508 includes two-dimensional and/or three-dimensional content for display by screen 1502, depending on the particular display mode and on the number of regions of screen 1502 that are delivering different two- or three-dimensional views to a viewing space.

Content signals 1408 and 1508 may include video content according to any suitable format. For example, content signals 1408 and 1508 may include video content delivered over an HDMI (High-Definition Multimedia Interface) interface, over a coaxial cable, as composite video, as S-Video, a VGA (video graphics array) interface, etc. Note that control signals 1406 and 1506 may be provided separately or in a same signal stream to display devices as their corresponding one of content signals 1408 and 1508.

Exemplary embodiments for display devices 1400 and 1500 of FIGS. 14 and 15 are described as follows for purposes of illustration.

1. Exemplary Embodiments Using Parallax Barriers

Figure 16:
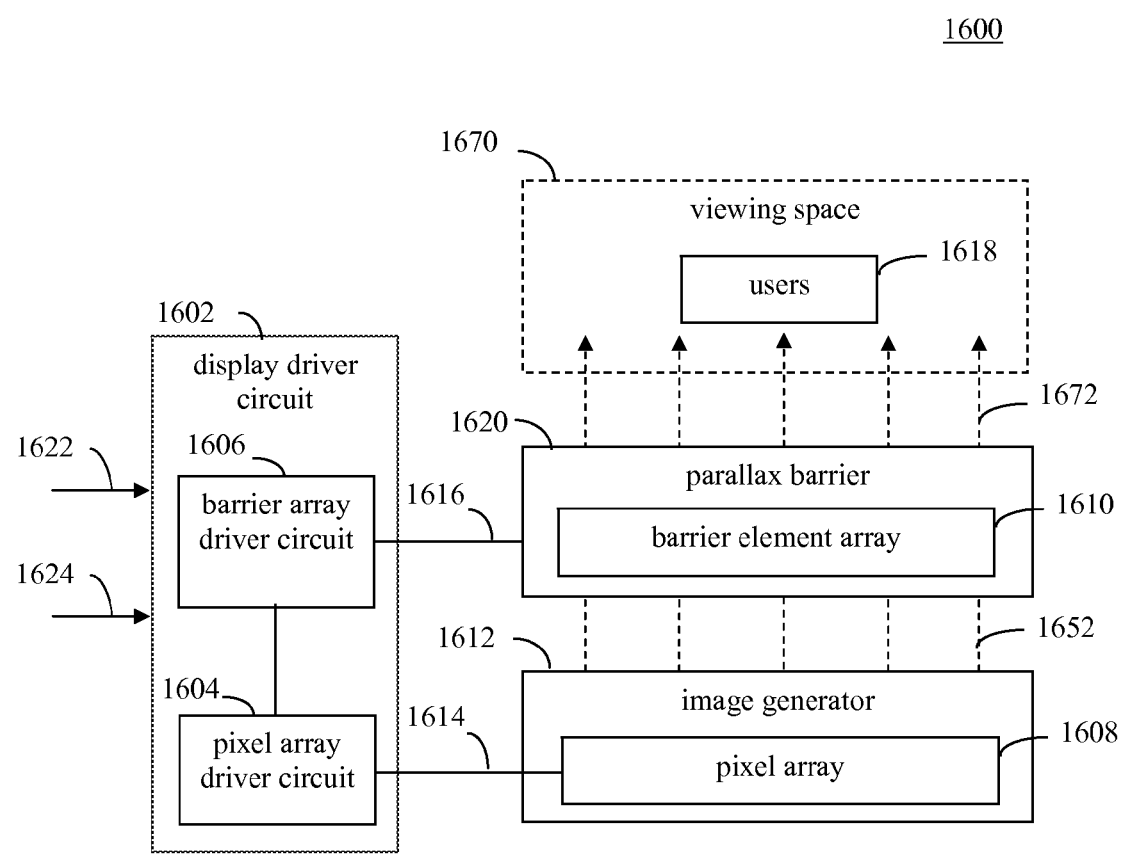
FIGS. 16 and 17 show block diagrams of examples of the display device of FIG. 15, according to embodiments.

Display devices 1400 and 1500 may include parallax barriers as light manipulators 1404 and 1504, respectively. For instance, FIG. 16 shows a block diagram of a display system 1600, which is an example of display device 408, according to an embodiment. As shown in FIG. 16, system 1600 includes a display device driver circuit 1602, an image generator 1612, and parallax barrier 1620. As shown in FIG. 16, image generator 1612 includes a pixel array 1608, and parallax barrier 1620 includes a barrier element array 1610. Furthermore, as shown in FIG. 16, display driver circuit 1602 includes a pixel array driver circuit 1604 and a barrier array driver circuit 1606. These features of system 1600 are described as follows.

Pixel array 1608 includes a two-dimensional array of pixels (e.g., arranged in a grid or other distribution). Pixel array 1608 is a self-illuminating or light-generating pixel array such that the pixels of pixel array 1608 each emit light included in light 1652 emitted from image generator 1612. Each pixel may be a separately addressable light source (e.g., a pixel of a plasma display, an LCD display, an LED display such as an OLED display, or of other type of display). Each pixel of pixel array 1608 may be individually controllable to vary color and intensity. In an embodiment, each pixel of pixel array 1608 may include a plurality of sub-pixels that correspond to separate color channels, such as a trio of red, green, and blue sub-pixels included in each pixel.

Parallax barrier 1620 is positioned proximate to a surface of pixel array 1608. Barrier element array 1610 is a layer of parallax barrier 1620 that includes a plurality of barrier elements or blocking regions arranged in an array. Each barrier element of the array is configured to be selectively opaque or transparent. Combinations of barrier elements may be configured to be selectively opaque or transparent to enable various effects. For example, in one embodiment, each barrier element may have a round, square, or rectangular shape, and barrier element array 1610 may have any number of rows of barrier elements that extend a vertical length of barrier element array 1610. In another embodiment, each barrier element may have a "band" shape that extends a vertical length of barrier element array 1610, such that barrier element array 1610 includes a single horizontal row of barrier elements. Each barrier element may include one or more of such bands, and different regions of barrier element array may include barrier elements that include different numbers of such bands.

One advantage of such a configuration where barrier elements extend a vertical length of barrier element array 1610 is that such barrier elements do not need to have spacing between them because there is no need for drive signal routing in such space. For instance, in a two-dimensional LCD array configuration, such as TFT (thin film transistor) display, a transistor-plus-capacitor circuit is typically placed onsite at the corner of a single pixel in the array, and drive signals for such transistors are routed between the LCD pixels (row-column control, for example). In a pixel configuration for a parallax barrier, local transistor control may not be necessary because barrier elements may not need to be changing as rapidly as display pixels (e.g., pixels of pixel array 1608). For a single row of vertical bands of barrier elements, drive signals may be routed to the top and/or bottom of barrier elements. Because in such a configuration drive signal routing between rows is not needed, the vertical bands can be arranged side-by-side with little-to-no space in between. Thus, if the vertical bands are thin and oriented edge-to-edge, one band or multiple adjacent bands (e.g., five bands) may comprise a barrier element in a blocking state, followed by one band or multiple adjacent bands (e.g., two bands) that comprise a barrier element in a non-blocking state (a slit), and so on. In the example of five bands in a blocking state and two bands in a non-blocking state, the five bands may combine to offer a single black barrier element of approximately 2.5 times the width of a single transparent slit with no spaces therein.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Display driver circuit 1602 receives control signal 1622 and content signal 1624. As described below, content signal 1624 includes two-dimensional and/or three-dimensional content for display. Control signal 1622 may be control signal 1406 of FIG. 14 (for a non-adaptable parallax barrier 1620) or may be control signal 1506 of FIG. 15 (for an adaptable parallax barrier 1620). Control signal 1622 may be received from a display driver of an operating system (e.g., may be control signal 716 received from display driver 704 in FIG. 7). Display driver circuit 1602 is configured to generate drive signals based on control signal 1622 and content signal 1624 to enable display system 1600 to display two-dimensional and three-dimensional images to users 1618 in viewing space 1670. For example, pixel array driver circuit 1604 is configured to generate a drive signal 1614 that is received by pixel array 1608 (e.g., based on content signal 1624 and/or control signal 1622). Drive signal 1614 may include one or more drive signals used to cause pixels of pixel array 1608 to emit light 1652 of particular desired colors and/or intensity. Barrier array driver circuit 1606 is configured to generate a drive signal 1616 that is received by barrier element array 1610 (e.g., based on control signal 1622). Drive signal 1616 may include one or more drive signals used to cause each of the barrier elements of, barrier element array 1610 to be transparent or opaque. In this manner, barrier element array 1610 filters light 1652 to generate filtered light 1672 that includes one or more two-dimensional and/or three-dimensional images that may be viewed by users 1618 in viewing space 1670. Example further description of implementations of the display driver circuits described herein is provided in pending U.S. patent application Ser. No. 12/982,031, titled "Integrated Backlighting, Sub-Pixel and Display Driver Circuitry Supporting Adaptive 213, Stereoscopic 3D and Multi-View 3D Displays," filed on same date herewith, which is incorporated by reference herein in its entirety, although the described herein are not limited to such implementations.

For example, drive signal 1614 may control sets of pixels of pixel array 1608 to each emit light representative of a respective image, to provide a plurality of images. Drive signal 1616 may control barrier elements of barrier element array 1610 to filter the light received from pixel array 1608 according to the provided images such that one or more of the images are received by users 1618 in two-dimensional form. For instance, drive signal 1616 may select one or more sets of barrier elements of barrier element array 1610 to be transparent, to transmit one or more corresponding two-dimensional images or views to users 1618. Furthermore, drive signal 1616 may control sections of barrier element array 1610 to include opaque and transparent barrier elements to filter the light received from pixel array 1608 so that one or more pairs of images or views provided by pixel array 1608 are each received by users 1618 as a corresponding three-dimensional image or view. For example, drive signal 1616 may select parallel strips of barrier elements of barrier element array 1610 to be transparent to form slits that enable three-dimensional images to be received by users 1618.

In embodiments, drive signal 1616 may be generated by barrier array driver circuit 1606 to configure one or more characteristics of barrier element array 1610. For example, drive signal 1616 may be generated to form any number of parallel strips of barrier elements of barrier element array 1610 to be transparent, to modify the number and/or spacing of parallel strips of barrier elements of barrier element array 1610 that are transparent, to select and/or modify a width and/or a length (in barrier elements) of one or more strips of barrier elements of barrier element array 1610 that are transparent or opaque, to select and/or modify an orientation of one or more strips of barrier elements of barrier element array 1610 that are transparent, to select one or more areas of barrier element array 1610 to include all transparent or all opaque barrier elements, etc.

Figure 17:
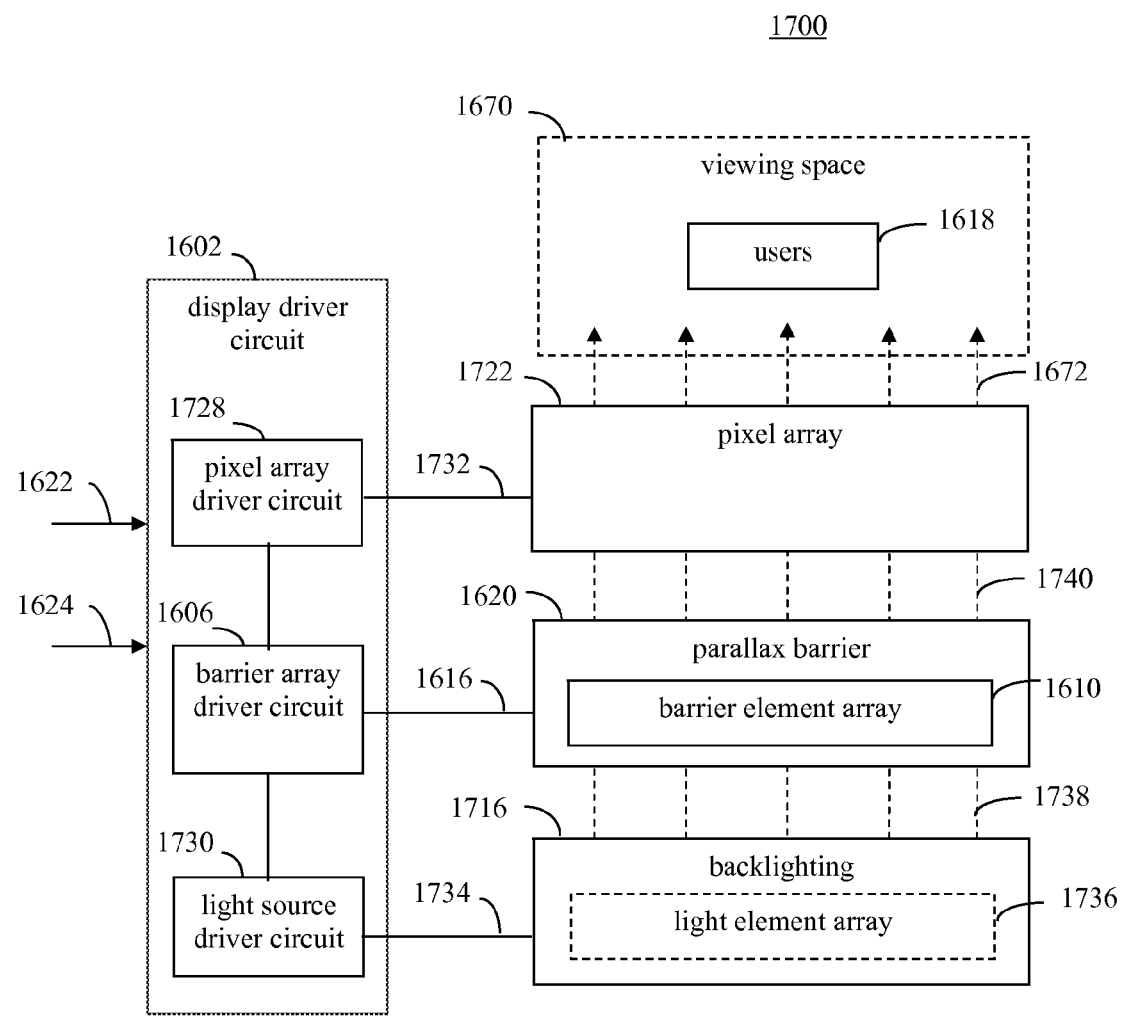

FIG. 17 shows a block diagram of a display system 1700, which is another example of display device 1500 of FIG. 15, according to an embodiment. As shown in FIG. 17, system 1700 includes display device driver circuit 1602, a pixel array 1722, parallax barrier 1620, and a backlighting 1716. Parallax barrier 1620 includes barrier element array 1610 and backlighting 1716 includes a light element array 1736. Furthermore, display driver circuit 1602 includes a pixel array driver circuit 1728, barrier array driver circuit 1606, and a light source driver circuit 1730. These features of system 1700 are described as follows.

Backlighting 1716 is a backlight panel that emits light 1738. Light element array 173 (or "backlight array") of backlighting 1716 includes a two-dimensional array of light sources. Such light sources may be arranged, for example, in a rectangular grid. Each light source in light element array 1736 is individually addressable and controllable to select an amount of light emitted thereby. A single light source may comprise one or more light-emitting elements depending upon the implementation. In one embodiment, each light source in light element array 1736 comprises a single light-emitting diode (LED) although this example is not intended to be limiting. Further description of implementations of backlighting 1716 and other backlighting implementations described herein is provided in pending U.S. patent application Ser. No. 12/982,020, titled "Backlighting Array Supporting Adaptable Parallax Barrier," filed on same date herewith, which is incorporated by reference herein in its entirety.

Parallax barrier 1620 is positioned proximate to a surface of backlighting 1716 (e.g., a surface of the backlight panel). As described above, barrier element array 1610 is a layer of parallax barrier 1620 that includes a plurality of barrier elements or blocking regions arranged in an array. Each barrier element of the array is configured to be selectively opaque or transparent. Barrier element array 1610 filters light 1738 received from backlighting 1716 to generate filtered light 1740. Filtered light 1740 is configured to enable a two-dimensional image or a three-dimensional image (e.g., formed by a pair of two-dimensional images in filtered light 1672) to be formed based on images subsequently imposed on filtered light 1740 by pixel array 1722.

Similarly to pixel array 1608 of FIG. 16, pixel array 1722 of FIG. 17 includes a two-dimensional array of pixels (e.g., arranged in a grid or other distribution). However, pixel array 1722 is not self-illuminating, and instead is a light filter that imposes images (e.g., in the form of color, grayscale, etc.) on filtered light 1740 from parallax barrier 1620 to generate filtered light 1672 to include one or more images. Each pixel of pixel array 1722 may be a separately addressable filter (e.g., a pixel of a plasma display, an LCD display, an LED display, or of other type of display). Each pixel of pixel array 1722 may be individually controllable to vary the color imposed on the corresponding light passing through, and/or to vary the intensity of the passed light in filtered light 1672. In an embodiment, each pixel of pixel array 1722 may include a plurality of sub-pixels that correspond to separate color channels, such as a trio of red, green, and blue sub-pixels included in each pixel.

Display driver circuit 1602 of FIG. 17 is configured to generate drive signals based on control signal 1622 and/or content signal 1624 to enable display system 1700 to display two-dimensional and three-dimensional images to users 1618 in viewing space 1670. For example, light source driver circuit 1730 within display driver circuit 1602 controls the amount of light emitted by each light source in light element array 1736 by generating a drive signal 1734 that is received by light element array 1736 (based on content signal 1624 and/or control signal 1622). Drive signal 1734 may include one or more drive signals used to control the amount of light emitted by each light source in light element array 1736 to generate light 1738. As described above, barrier array driver circuit 1606 is configured to generate drive signal 1616 received by barrier element array 1610 (e.g., based on control signal 1622). Drive signal 1616 may include one or more drive signals used to cause each of the barrier elements of barrier element array to be transparent or opaque, to filter light 1738 to generate filtered light 1740. Pixel array driver circuit 1728 is configured to generate a drive signal 1732 that is received by pixel array 1722 (e.g., based on content signal 1624 and/or control signal 1622). Drive signal 1732 may include one or more drive signals used to cause pixels of pixel array 1722 to impose desired images (e.g., colors, grayscale, etc.) on filtered light 1740 as it passes through pixel array 1722. In this manner, pixel array 1722 generates filtered light 1672 that includes one or more two-dimensional and/or three-dimensional images that may be viewed by users 1618 in viewing space 1670.

For example, drive signal 1734 may control sets of light sources of light element array 1736 to emit light 1738. Drive signal 1616 may control barrier elements of barrier element array 1610 to filter light 1738 received from light element array 1736 to enable filtered light 1740 to enable two- and/or three-dimensionality. Drive signal 1732 may control sets of pixels of pixel array 1722 to filter filtered light 1740 according to respective images, to provide a plurality of images. For instance, drive signal 1616 may select one or more sets of the barrier elements of barrier element array 1610 to be transparent, to enable one or more corresponding two-dimensional images to be delivered to users 1618. Furthermore, drive signal 1616 may control sections of barrier element array 1610 to include opaque and transparent barrier elements to filter the light received from light element array 1736 so that one or more pairs of images provided by pixel array 1722 are each enabled to be received by users 1618 as a corresponding three-dimensional image. For example, drive signal 1616 may select parallel strips of barrier elements of barrier element array 1610 to be transparent to form slits that enable three-dimensional images to be received by users 1618.

Figure 18:
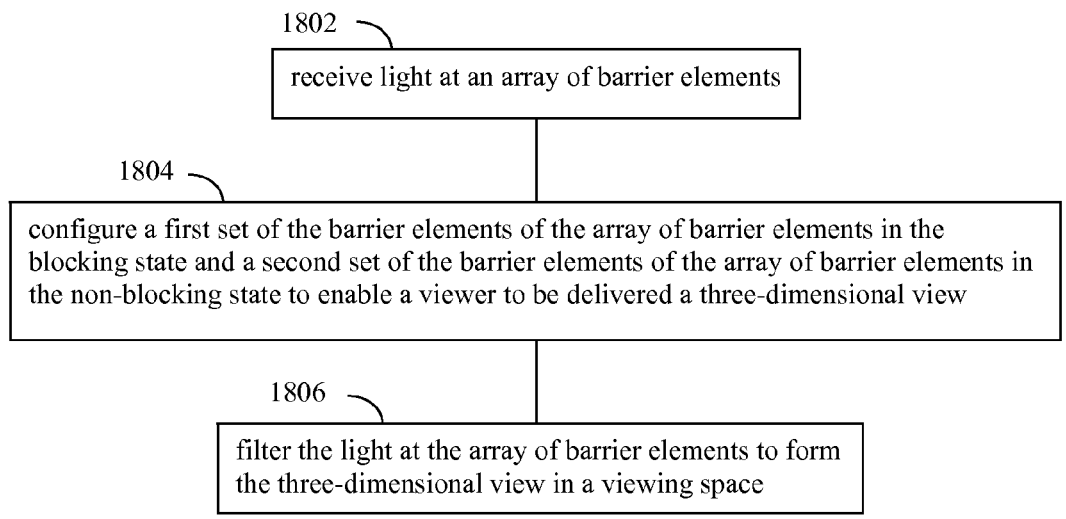
FIG. 18 shows a flowchart for generating three-dimensional images, according to an exemplary embodiment.
Figure 19:
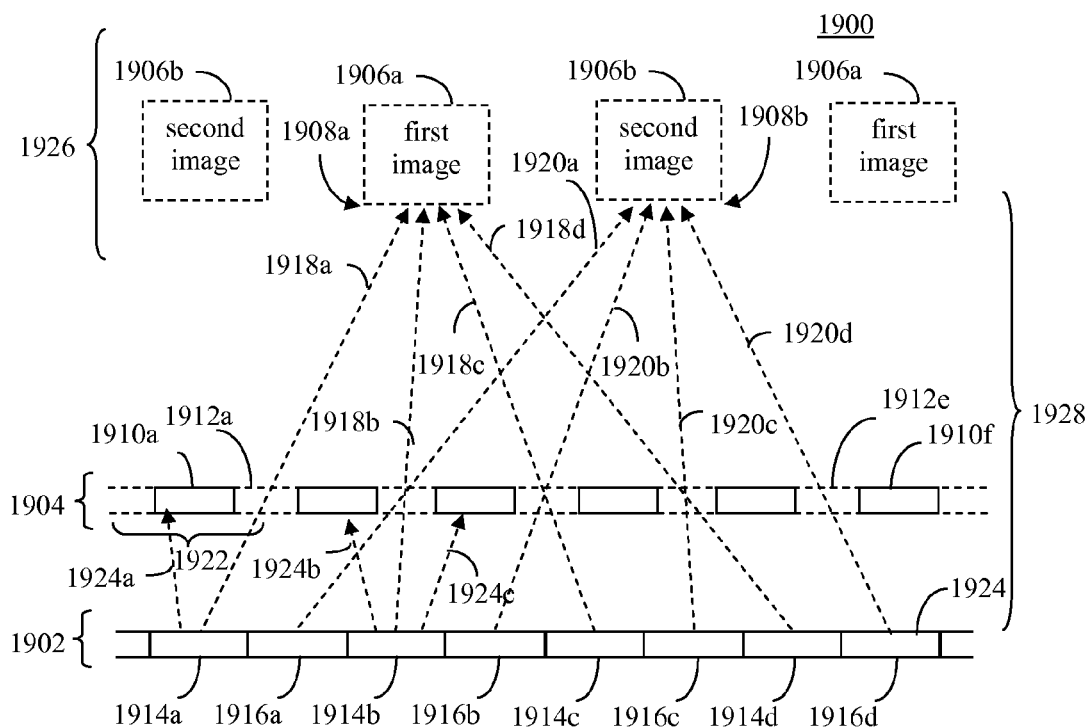
FIG. 19 shows a cross-sectional view of an example of a display system, according to an embodiment.

FIG. 18 shows a flowchart 1800 for generating images that are delivered to users in a viewing space, according to an exemplary embodiment. Flowchart 1800 may be performed by system 1600 in FIG. 16 or system 1700 of FIG. 17, for example. Flowchart 1800 is described with respect to FIG. 19, which shows a cross-sectional view of a display system 1900. Display system 1900 is an exemplary embodiment of system 1600 shown in FIG. 16, and is shown for purposes of illustration. As shown in FIG. 19, system 1900 includes a pixel array 1902 and a barrier element array 1904. In another embodiment, system 1900 may further include backlighting in a configuration similar to display system 1700 of FIG. 17. Further structural and operational embodiments will be apparent to persons skilled in the relevant art(s) based on the discussion regarding flowchart 1800. Flowchart 1800 is described as follows.

Flowchart 1800 begins with step 1802. In step 1802, light is received at an array of barrier elements. For example, as shown in FIG. 16, light 1652 is received at parallax barrier 1620 from pixel array 1608. Each pixel of pixel array 1608 may generate light that is received at parallax barrier 1620. Depending on the particular display mode of parallax barrier 1620, parallax barrier 1620 may filter light 1652 from pixel array 1608 to generate a two-dimensional image or a three-dimensional image viewable in viewing space 1670 by users 1618. As described above with respect to FIG. 17, alternatively, light 1738 may be received by parallax barrier 1620 from light element array 1736.

In step 1804, a first set of the barrier elements of the array of barrier elements is configured in the blocking state and a second set of the barrier elements of the array of barrier elements is configured in the non-blocking state to enable a viewer to be delivered a three-dimensional view. Three-dimensional image content may be provided for viewing in viewing space 1670. In such case, referring to FIG. 16 or 17, barrier array driver circuit 1606 may generate drive signal 1616 to configure barrier element array 1610 to include transparent strips of barrier elements to enable a three-dimensional view to be formed. For example, as shown in FIG. 19, barrier element array 1904 includes a plurality of barrier elements that are each either transparent (in a non-blocking state) or opaque (in a blocking state). Barrier elements that are blocking are indicated as barrier elements 1910a-1910f, and barrier elements that are non-blocking are indicated as barrier elements 1912a-1912e. Further barrier elements may be included in barrier element array 1904 that are not visible in FIG. 19. Each of barrier elements 1910a-1910f and 1912a-1912e may include one or more barrier elements. Barrier elements 1910 alternate with barrier elements 1912 in series in the order of barrier elements 1910a, 1912a, 1910b, 1912b, 1910c, 1912c, 1910d, 1912d, 1910e, 1912e, and 1910f. In this manner, blocking barrier elements 1910 are alternated with non-blocking barrier elements 1912 to form a plurality of parallel non-blocking or transparent slits in barrier element array 1904.

Figure 20:
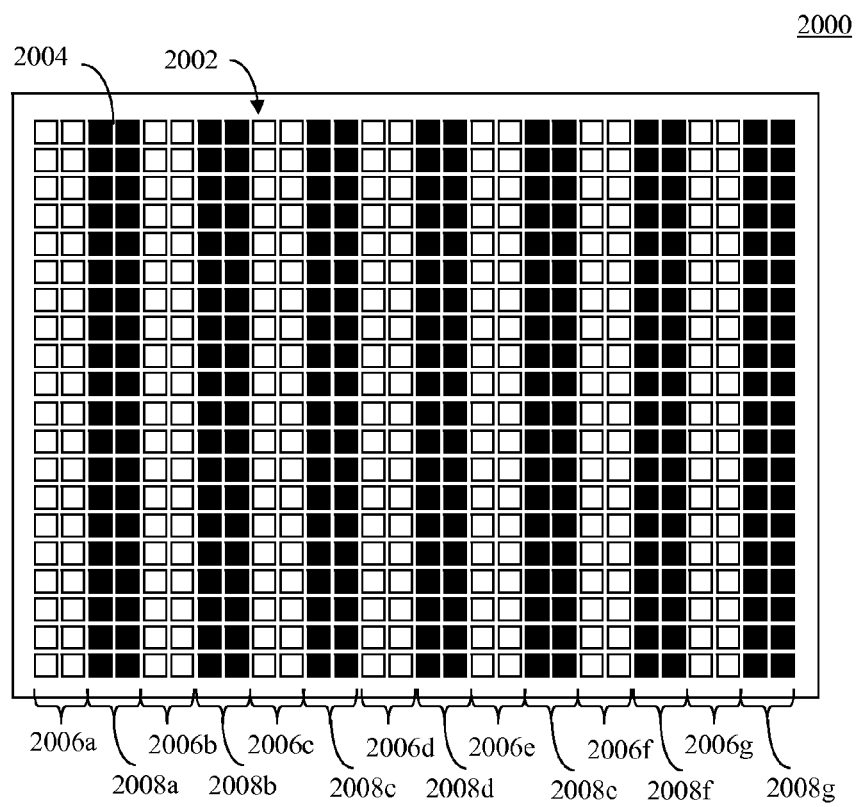
FIGS. 20 and 21 shows view of example parallax barriers with non-blocking slits, according to embodiments.

For instance, FIG. 20 shows a view of a parallax barrier 2000 with transparent slits, according to an exemplary embodiment. Parallax barrier 2000 is an example of parallax barrier 1620 of FIGS. 16 and 17. As shown in FIG. 20, parallax barrier 2000 includes barrier element array 2002, which includes a plurality of barrier elements 2004 arranged in a two-dimensional array. Furthermore, as shown in FIG. 20, barrier element array 2002 includes a plurality of parallel strips of barrier elements 2004 that are selected to be non-blocking to form a plurality of parallel non-blocking strips (or "slits") 2006a-2006g. As shown in FIG. 20, parallel non-blocking strips 2006a-2006g (non-blocking slits) are alternated with parallel blocking or blocking strips 2008a-2008g of barrier elements 2004 that are selected to be blocking. In the example of FIG. 20, non-blocking strips 2006a-2006g and blocking strips 2008a-2008g each have a width (along the x-dimension) of two barrier elements 2004, and have lengths that extend along the entire y-dimension (twenty barrier elements 2004) of barrier element array 2002, although in other embodiments, may have alternative dimensions. Non-blocking strips 2006a-2006g and blocking strips 2008a-2008g form a parallax barrier configuration for parallax barrier 300. The spacing (and number) of parallel non-blocking strips 2006 in barrier element array 2002 may be selectable by choosing any number and combination of particular strips of barrier elements 2004 in barrier element array 2002 to be non-blocking, to be alternated with blocking strips 2008, as desired. For example, hundreds, thousands, or even larger numbers of non-blocking strips 2006 and blocking strips 2008 may be present in parallax barrier 300.

Figure 21:
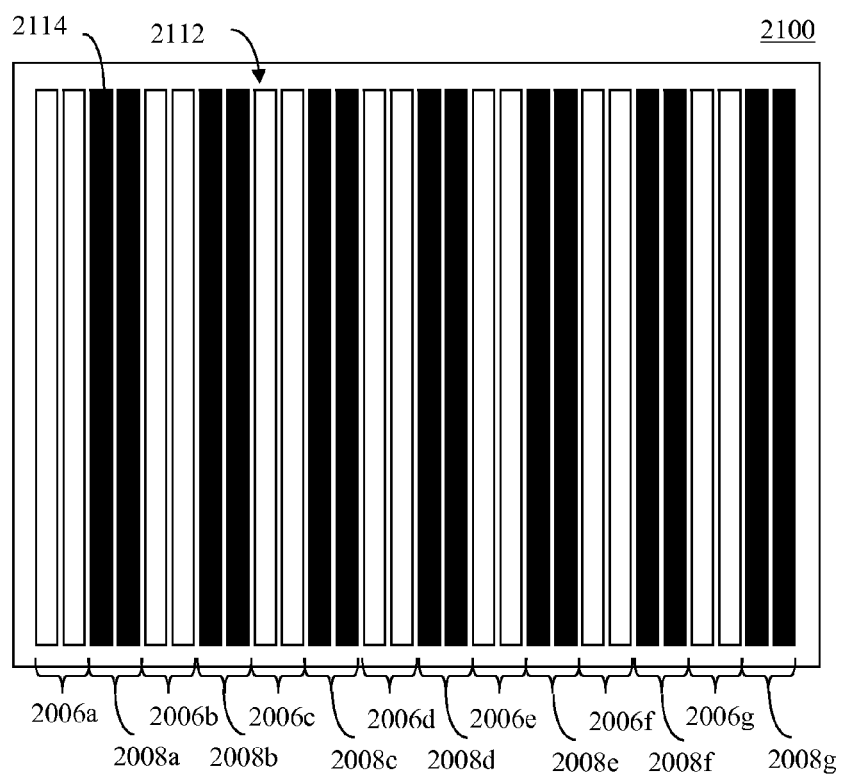

FIG. 21 shows a parallax barrier 2100 that is another example of parallax barrier 1620 with parallel transparent slits, according to an embodiment. Similarly to parallax barrier 2000 of FIG. 20, parallax barrier 2100 has includes a barrier element array 2112, which includes a plurality of barrier elements 2114 arranged in a two-dimensional array (28 by 1 array). Barrier elements 2114 have widths (along the x-dimension) similar to the widths of barrier elements 2004 in FIG. 20, but have lengths that extend along the entire vertical length (y-dimension) of barrier element array 2114. As shown in FIG. 21, barrier element array 2112 includes parallel non-blocking strips 2006a-2006g alternated with parallel blocking strips 2008a-2008g. In the example of FIG. 21, parallel non-blocking strips 2006a-2006g and parallel blocking strips 2008a-2008g each have a width (along the x-dimension) of two barrier elements 2114, and have lengths that extend along the entire y-dimension (one barrier element 314) of barrier element array 2112.

Referring back to FIG. 18, in step 1806, the light is filtered at the array of barrier elements to form the three-dimensional view in a viewing space. Barrier element array 1610 of parallax barrier 1620 is configured to filter light 1652 received from pixel array 1608 (FIG. 16) or light 1738 received from light element array 1736 (FIG. 17) according to whether barrier element array 1610 is transparent or non-blocking (e.g., in a two-dimensional mode) or includes parallel non-blocking strips (e.g., in a three-dimensional mode). If one or more regions of barrier element array 1610 are transparent, those regions of barrier element array 1610 function as "all pass" filters to substantially pass all of light 1652 as filtered light 1672 to deliver one or more corresponding two-dimensional images generated by pixel array 1608 to viewing space 1670, to be viewable as a two-dimensional images in a similar fashion as a conventional display. If barrier element array 1610 includes one or more regions having parallel non-blocking strips (e.g., as shown for barrier element array 2002 in FIGS. 20 and 21), those regions of barrier element array 1610 pass a portion of light 1652 as filtered light 1672 to deliver one or more corresponding three-dimensional images to viewing space 1670.

For example, as shown in FIG. 19, pixel array 1902 includes a plurality of pixels 1914a-1914d and 1916a-1916d. Pixels 1914 alternate with pixels 1916, such that pixels 1914a-1914d and 1916a-1916d are arranged in series in the order of pixels 1914a, 1916a, 1914b, 1916b, 1914c, 1916c, 1914d, and 1916d. Further pixels may be included in pixel array 1902 that are not visible in FIG. 19, including further pixels along the width dimension of pixel array 1902 (e.g., in the left-right directions) as well as pixels along a length dimension of pixel array 1902 (not visible in FIG. 19). Each of pixels 1914a-1914d and 1916a-1916d generates light, which emanates from display surface 1924 of pixel array 1902 (e.g., generally upward in FIG. 19) towards barrier element array 1904. Some example indications of light emanating from pixels 1914a-1914d and 1916a-1916d are shown in FIG. 19 (as dotted lines), including light 1924a and light 1918a emanating from pixel 1914a, light 1924b, light 1918b, and light 1924c emanating from pixel 1914b, etc.

Furthermore, light emanating from pixel array 1902 is filtered by barrier element array 1904 to form a plurality of images in a viewing space 1926, including a first image 1906a at a first location 1908a and a second image 1906b at a second location 1908b. A portion of the light emanating from pixel array 1902 is blocked by blocking barrier elements 1910, while another portion of the light emanating from pixel array 1902 passes through non-blocking barrier elements 1912, according to the filtering by barrier element array 1904. For instance, light 1924a from pixel 1914a is blocked by blocking barrier element 1910a, and light 1924b and light 1924c from pixel 1914b are blocked by blocking barrier elements 1910b and 1910c, respectively. In contrast, light 1918a from pixel 1914a is passed by non-blocking barrier element 1912a and light 1918b from pixel 1914b is passed by non-blocking barrier element 1912b.

By forming parallel non-blocking slits in a barrier element array, light from a pixel array can be filtered to form multiple images or views in a viewing space. For instance, system 1900 shown in FIG. 19 is configured to form first and second images 1906a and 1906b at locations 1908a and 1908b, respectively, which are positioned at a distance 1928 from pixel array 1902 (as shown in FIG. 19, further instances of first and second images 1906a and 1906b may be formed in viewing space 1926 according to system 1900, in a repeating, alternating fashion). As described above, pixel array 1902 includes a first set of pixels 1914a-1914d and a second set of pixels 1916a-1916d. Pixels 1914a-1914d correspond to first image 1906a and pixels 1916a-1916d correspond to second image 1906b. Due to the spacing of pixels 1914a-1914d and 1916a-1916d in pixel array 1902, and the geometry of non-blocking barrier elements 1912 in barrier element array 1904, first and second images 1906a and 1906b are formed at locations 1908a and 1908b, respectively. As shown in FIG. 19, light 1918a-1918d from the first set of pixels 1914a-1914d is focused at location 1908a to form first image 1906a at location 1908a. Light 1920a-1920d from the second set of pixels 1916a-1916d is focused at location 1908b to form second image 1906b at location 1908b.

FIG. 19 shows a slit spacing 1922 (center-to-center) of non-blocking barrier elements 1912 in barrier element array 1904. Spacing 1922 may be determined to select locations for parallel non-blocking slits to be formed in barrier element array 1904 for a particular image distance 1928 at which images are desired to be formed (for viewing by users). For example, in an embodiment, if a spacing of pixels 1914a-1914d corresponding to an image is known, and a distance 1928 at which the image is desired to be displayed is known, the spacing 1922 between adjacent parallel non-blocking slits in barrier element array 1904 may be selected.

First and second images 1906a and 1906b are configured to be perceived by a user as a three-dimensional image or view. For example, a viewer may receive first image 1906a at a first eye location and second image 1906b at a second eye location, according to an exemplary embodiment. First and second images 1906a and 1906b may be generated by first set of pixels 1914a-1914d and second set of pixels 1916a-1916d as images that are slightly different perspective from each other. Images 1906a and 1906b are combined in the visual center of the brain of the viewer to be perceived as a three-dimensional image or view. In such an embodiment, first and second images 1906a and 1906b may be formed by display system 1900 such that their centers are spaced apart a width of a user's pupils (e.g., an "interocular distance").

Note that in the embodiments of FIGS. 20 and 21, the entire regions of parallax barriers 2000 and 2100 are filled with parallel non-blocking strips (e.g., as shown for barrier element array 2002 in FIGS. 20 and 21) to be configured to deliver three-dimensional images to viewing space 1670. In further embodiments, one or more regions of a parallax barrier may be filled with parallel non-blocking strips to deliver three-dimensional images, and one or more other regions of the parallax barrier may be transparent to deliver two-dimensional images. Furthermore, different regions of a parallax barrier that have parallel non-blocking strips may have the parallel non-blocking strips oriented at different angles to deliver three-dimensional images to viewers that are oriented differently.

Figure 22:
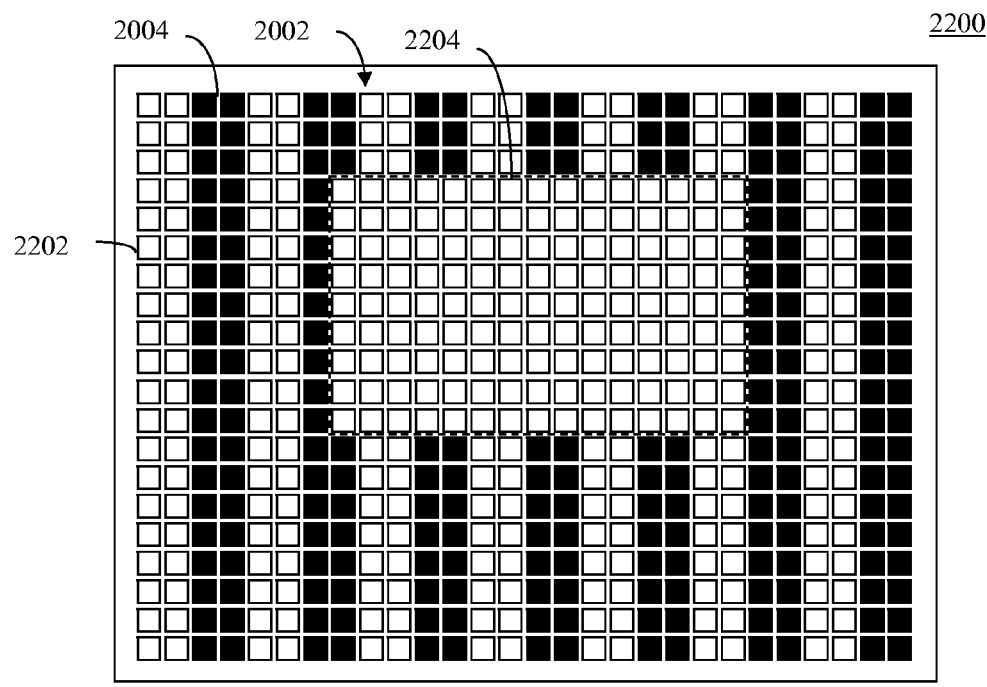
FIG. 22 shows a view of the barrier element array of FIG. 20 configured to enable the simultaneous display of two-dimensional and three-dimensional images of various sizes and shapes, according to an exemplary embodiment.

For instance, FIG. 22 shows a view of a parallax barrier 2200 configured to enable the simultaneous display of two-dimensional and three-dimensional images at different regions, according to exemplary embodiments. Parallax barrier 2200 is similar to parallax barrier 2000 of FIG. 20, having barrier element array 2002 including a plurality of barrier elements 2004 arranged in a two-dimensional array. In FIG. 22, a first region 2202 of barrier element array 2002 includes a plurality of parallel non-blocking strips alternated with parallel blocking strips that together fill first region 2202. A second region 2204 of barrier element array 2002 is surrounded by first region 2202. Second region 2204 is a rectangular shaped region of barrier element array 2002 that includes a two-dimensional array of barrier elements 2004 that are non-blocking. Thus, in FIG. 22, barrier element array 2002 is configured to enable a three-dimensional image to be generated by pixels of a pixel array that are adjacent to barrier elements of first region 2202, and to enable a two-dimensional image to be generated by pixels of the pixel array that are adjacent to barrier elements inside of second region 2204. Note that alternatively, first region 2202 may include all non-blocking barrier elements 2002 to pass a two-dimensional image, and second region 2204 may include parallel non-blocking strips alternated with parallel blocking strips to pass a three-dimensional image. In further embodiments, parallax barrier 2200 may have additional numbers, sizes, and arrangements of regions configured to pass different combinations of two-dimensional images and three-dimensional images.

Figure 23:
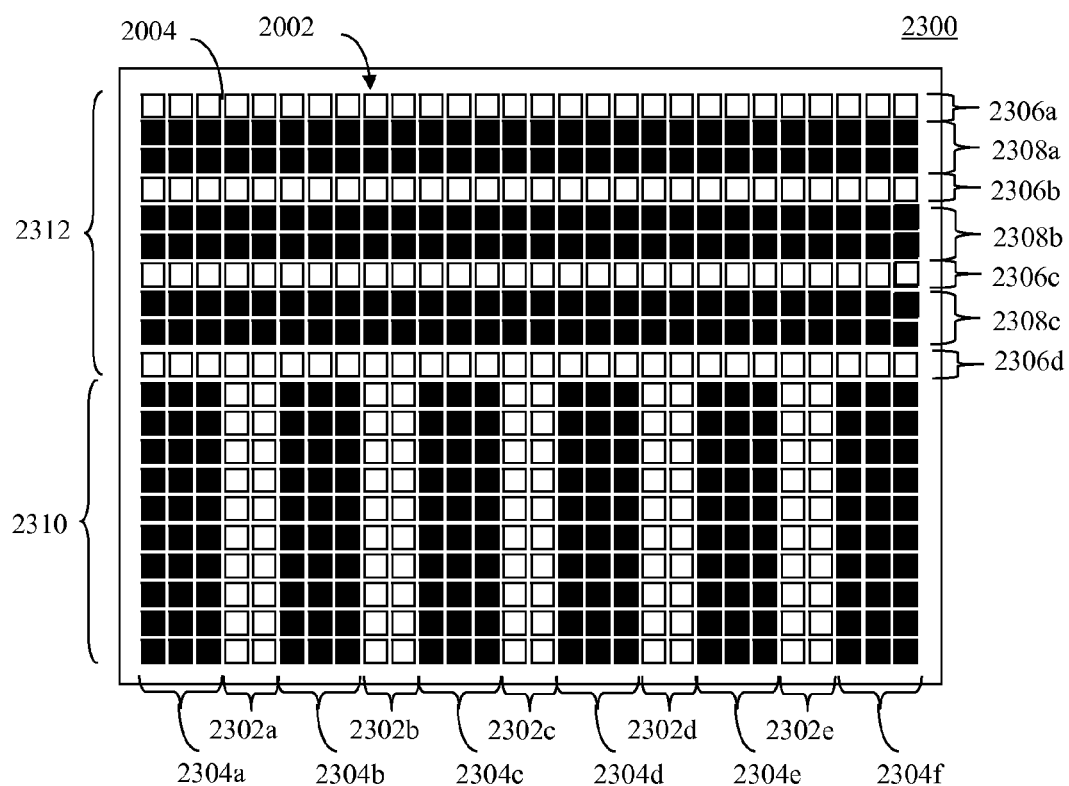
FIG. 23 shows a view of the parallax barrier of FIG. 20 with differently oriented non-blocking slits, according to an exemplary embodiment.

In another example, FIG. 23 shows a view of a parallax barrier 2300 with transparent slits having different orientations, according to an exemplary embodiment. Parallax barrier 2300 is similar to parallax barrier 2000 of FIG. 20, having barrier element array 2002 including a plurality of barrier elements 2004 arranged in a two-dimensional array. A first region 2310 (e.g., a bottom half) of barrier element array 2002 includes a first plurality of parallel strips of barrier elements 2004 that are selected to be non-blocking to form a first plurality of parallel non-blocking strips 2302a-2302e (each having a width of two barrier elements 2004). As shown in FIG. 23, parallel non-blocking strips 2302a-2302e are alternated with parallel blocking strips 2304a-2304f of barrier elements 2004 (each having a width of three barrier elements 2004). Parallel non-blocking strips 2302a-2302e are oriented in a first direction (e.g., along a vertical axis).

Furthermore, as shown in FIG. 23, a second region 2312 (e.g., a top half) of barrier element array 2002 includes a second plurality of parallel strips of barrier elements 2004 that are selected to be non-blocking to form a second plurality of parallel non-blocking strips 2306a-2306d (each having a width of one barrier element 2004). As shown in FIG. 23, parallel non-blocking strips 2306a-2306d are alternated with parallel blocking strips 2308a-2308c of barrier elements 2004 (each having a width of two barrier elements 2004). Parallel non-blocking strips 2306a-2306d are oriented in a second direction (e.g., along a horizontal axis).

As such, in FIG. 23, first and second pluralities of parallel non-blocking strips 2302a-2302e and 2306a-2306d are present in barrier element array 2002 that are oriented perpendicularly to each other. The region of barrier element array 2002 that includes first plurality of parallel non-blocking strips 2302a-2302e may be configured to deliver a three-dimensional image in a viewing space (as described above) to be viewable by a user whose body is oriented vertically (e.g., sitting upright or standing up). The region of barrier element array 2002 that includes second plurality of parallel non-blocking strips 2306a-2306d may be configured to deliver a three-dimensional image in a viewing space (as described above) to be viewable by a user whose body is oriented horizontally (e.g., laying down). In this manner, users who are oriented differently relative to each other can still each be provided with a corresponding three-dimensional image that accommodates their position.

As described above, in an embodiment, display device 1502 of FIG. 15 may be configured to generate a two-dimensional image for viewing by users in a viewing space. For instance, referring to FIGS. 16 and 17, barrier element array 1610 may be configured into a third configuration to deliver a two-dimensional view. In the third configuration, barrier array driver circuit 1606 may generate drive signal 1616 to configure each barrier element of barrier element array 1610 to be in the non-blocking state (transparent). If barrier element array 1610 is non-blocking, barrier element array 1610 functions as an "all pass" filter to substantially pass all of light 1652 (FIG. 16) or light 1738 (FIG. 17) as filtered light 1672 to deliver the two-dimensional image to viewing space 1670, to be viewable as a two-dimensional image in a similar fashion as a conventional display.

Figure 24:
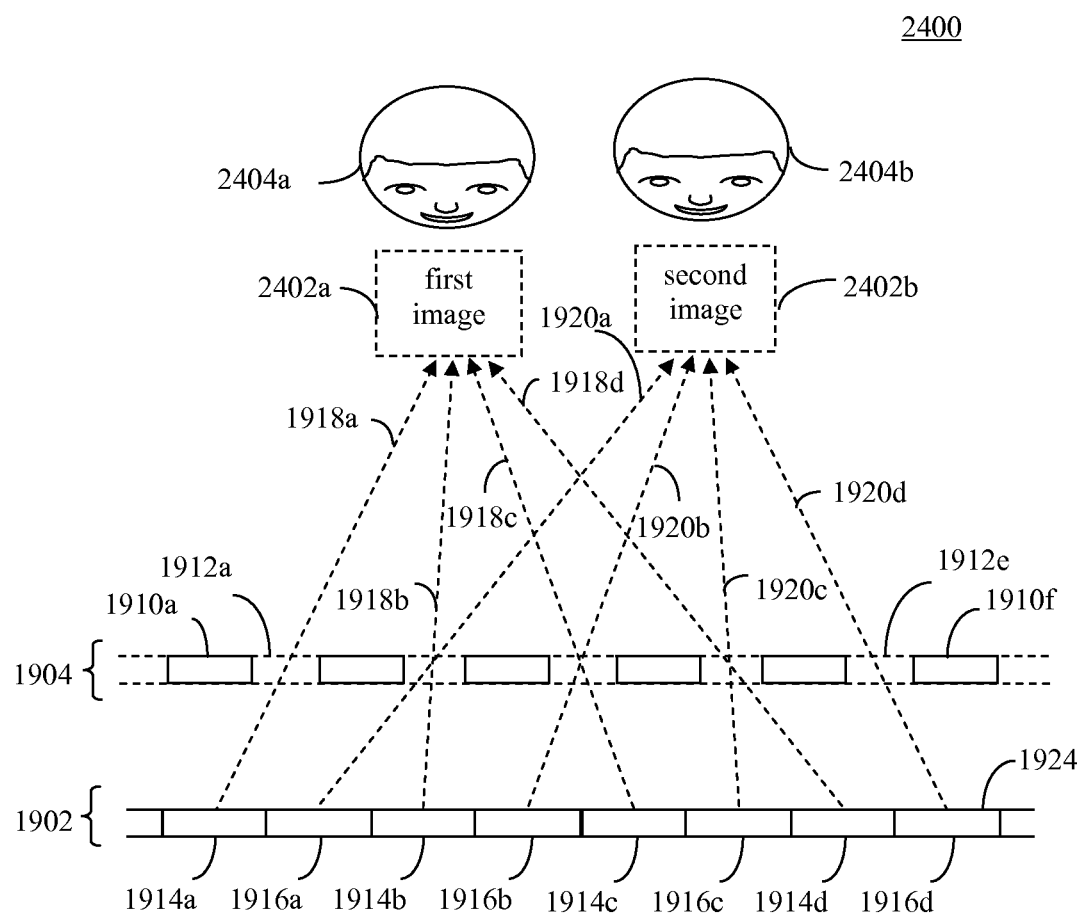
FIG. 24 shows a display system providing two two-dimensional images that are correspondingly viewable by a first viewer and a second viewer, according to an exemplary embodiment.

In embodiments, display systems may be configured to generate multiple two-dimensional images or views for viewing by users in a viewing space. For example, FIG. 24 shows a display system 2400 configured to deliver two two-dimensional images, according to an embodiment. Display system 2400 is configured similarly to display system 1900 of FIG. 19. As shown in FIG. 24, display system 2400 includes pixel array 1902 and barrier element array 1904, which generate first and second images 2402a and 2402b. As shown in FIG. 24, a first viewer 2404a receives first image 2402a at a first location and a second viewer 2404b receives second image 2402b at a second location, according to an exemplary embodiment. Similarly to the description provided above with respect to FIG. 19, first and second images 2402a and 2402b may be generated by first set of pixels 1914a-1914d and second set of pixels 1916a-1916d of pixel array 1902. However, rather than first and second images 2402a and 2402b being images that are of different perspective, first and second images 2402a and 2402b are each a two-dimensional image that may be viewed independently from each other. For instance, image 2402a and image 2402b may generated by display system 1900 from first media content and second media content, respectively, that are independent of each other. Image 2402a may be received by both eyes of first viewer 2404a to be perceived by first viewer 2404a as a first two-dimensional image, and image 2402b may be received by both eyes of second viewer 2404b to be perceived by second viewer 2404b as a second two-dimensional image. Thus, first and second images 2402a and 2402b may be generated to have a spacing that enables them to be separately viewed by first and second users 2404a and 2404b.

As such, display system 2400 of FIG. 24 can be configured to deliver a single three-dimensional view to a viewer (e.g., as shown in FIG. 19 for display system 1900), to deliver a pair of two-dimensional views to a pair of viewers (e.g., as shown in FIG. 24), or to deliver a pair of three-dimensional views to a pair of viewers as described above). Display system 2400 can be configured to switch between delivering views to one and two viewers by turning off or turning on, respectively, the display of media content by pixel array 1902 associated with one of the viewers (e.g., by turning off or on pixels 1916 associated with second image 2402b). Display system 2400 can be configured to switch between delivering two-dimensional and three-dimensional views by providing the corresponding media content type at pixel array 2402. Furthermore, display system 2400 may provide such capabilities when configured similarly to display system 1700 shown in FIG. 17 (e.g., including backlighting 1716).

In an embodiment, display system 1900 may be configured to generate multiple three-dimensional images that include related image content (e.g., each three-dimensional image is a different viewpoint of a common scene), or that each include unrelated image content, for viewing by users in a viewing space. Each of the three-dimensional images may correspond to a pair of images generated by pixels of the pixel array. The barrier element array filters light from the pixel array to form the image pairs in a viewing space to be perceived by users as three-dimensional images.

Figure 25:
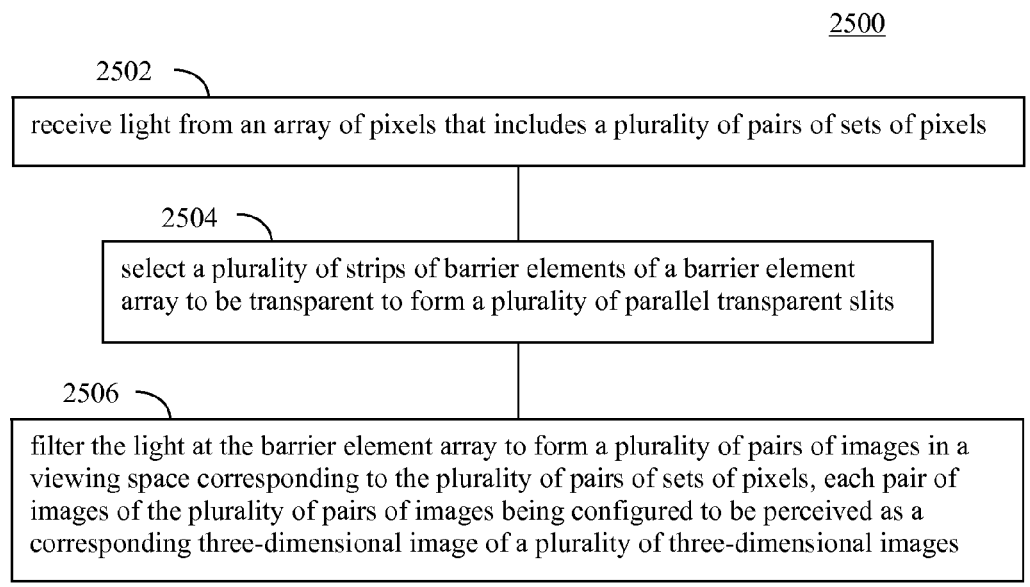
FIG. 25 shows a flowchart for generating multiple three-dimensional images, according to an exemplary embodiment.
Figure 26:
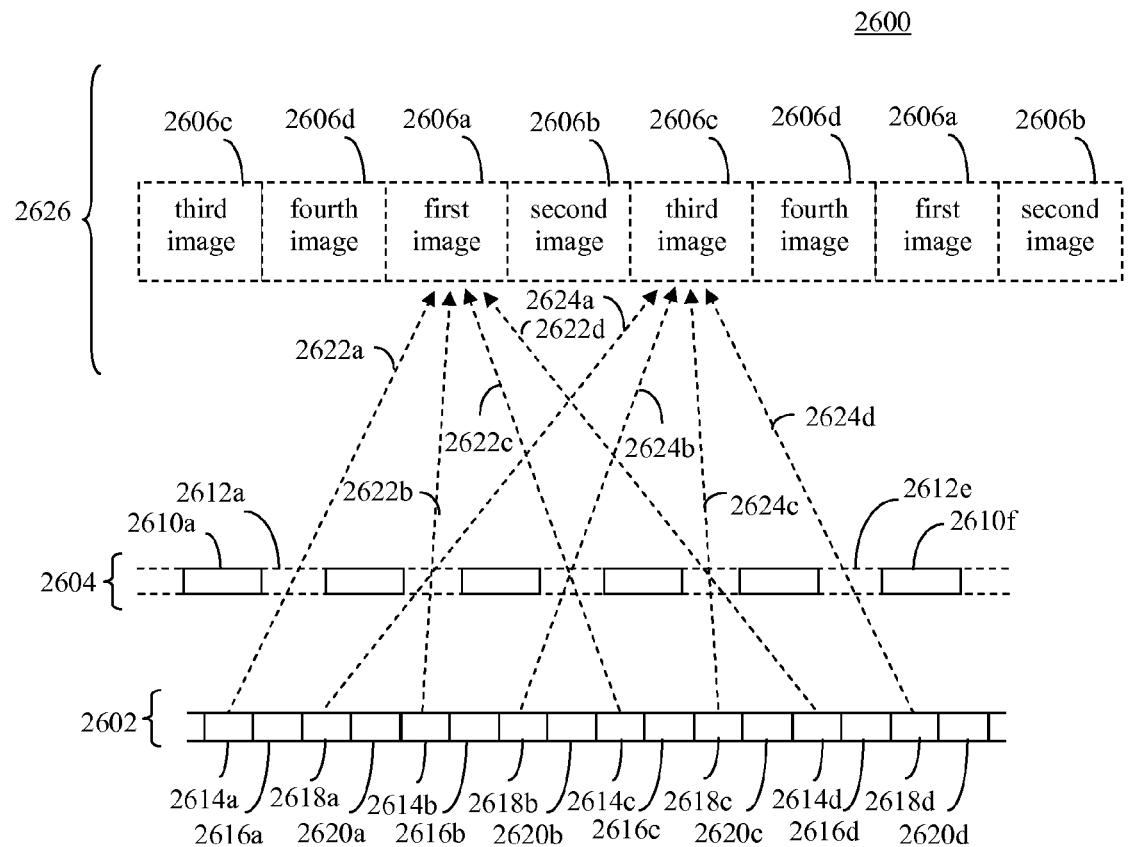
FIG. 26 shows a cross-sectional view of an example of the display system of FIG. 15, according to an embodiment.

For instance, FIG. 25 shows a flowchart 2500 for generating multiple three-dimensional images, according to an exemplary embodiment. Flowchart 2500 is described with respect to FIG. 26, which shows a cross-sectional view of a display system 2600. Display system 2600 is an exemplary embodiment of system 1600 shown in FIG. 16, and is shown for purposes of illustration. As shown in FIG. 26, system 2600 includes a pixel array 2602 and a barrier element array 2604. System 2600 may also include display driver circuit 1602 of FIG. 16, which is not shown in FIG. 26 for ease of illustration. Further structural and operational embodiments will be apparent to persons skilled in the relevant art(s) based on the discussion regarding flowchart 2500. Flowchart 2500 is described as follows.

Flowchart 2500 begins with step 2502. In step 2502, light is received from an array of pixels that includes a plurality of pairs of sets of pixels. For instance, in the example of FIG. 26, pixel array 2602 includes a first set of pixels 2614a-2614d, a second set of pixels 2616a-2616d, a third set of pixels 2618a-2618d, and a fourth set of pixels 2620a-2620d. Each of pixels 2614a-2614d, 2616a-2616d, 2618a-2618d, 2620a-2620d generates light, which emanates from the surface of pixel array 2602 towards barrier element array 2604. Each set of pixels generates a corresponding image. First set of pixels 2614a-2614d and third set of pixels 2618a-2618d are configured to generate images that combine to form a first three-dimensional image. Second set of pixels 2616a-2616d and fourth set of pixels 2620a-2620d are configured to generate images that combine to form a second three-dimensional image. Pixels of the four sets of pixels are alternated in pixel array 2602 in the order of pixel 2614a, pixel 2616a, pixel 2618a, pixel 2620a, pixel 2614b, pixel 2616b, etc. Further pixels may be included in each set of pixels in pixel array 2602 that are not visible in FIG. 26, including hundreds, thousands, or millions of pixels in each set of pixels.

As described above, in the current embodiment, pixel array 2602 is segmented into a plurality of pairs of sets of pixels. For instance, in the example of FIG. 26, pixel array 2602 is segmented into four sets of pixels. The first set of pixels includes pixels 2614a-2614g and the other pixels in the same columns, the second set of pixels includes pixels 2616a-2616g and the other pixels in the same columns, pixels 2618a-2618g and the other pixels in the same columns, and pixels 2620a-2620g and the other pixels in the same columns.

In step 2504, a plurality of strips of barrier elements of a barrier element array is selected to be non-blocking to form a plurality of parallel non-blocking slits. As shown in FIG. 26, barrier element array 2604 includes barrier elements that are each either non-blocking or blocking. Barrier elements that are blocking are indicated as barrier elements 2610a-2610f, and barrier elements that are non-blocking are indicated as barrier elements 2612a-2612e. Further barrier elements may be included in barrier element array 2604 that are not visible in FIG. 26, including hundreds, thousands, or millions of barrier elements, etc. Each of barrier elements 2610a-2610f and 2612a-2612e may include one or more barrier elements. Barrier elements 2610 alternate with barrier elements 2612. In this manner, blocking barrier elements 2610 are alternated with non-blocking barrier elements 2612 to form a plurality of parallel non-blocking slits in barrier element array 2604.

In step 2506, the light is filtered at the barrier element array to form a plurality of pairs of images in a viewing space corresponding to the plurality of pairs of sets of pixels, each pair of images of the plurality of pairs of images being configured to be perceived as a corresponding three-dimensional image of a plurality of three-dimensional images. As shown in FIG. 26, light emanating from pixel array 2602 is filtered by barrier element array 2604 to form a plurality of images in a viewing space 2626. For instance, four images are formed in viewing space 2626, including first-fourth images 2606a-2606d. Pixels 2614a-2614d correspond to first image 2606a, pixels 2616a-2616d correspond to second image 2606b, pixels 2618a-2618d correspond to third image 2606c, and pixels 2620a-2620d correspond to fourth image 2606d. As shown in FIG. 26, light 2622a-2622d from the first set of pixels 2614a-2614d forms first image 2606a, and light 2624a-2624d from the third set of pixels 2618a-2618d forms third image 2606c, due to the filtering of the non-blocking slits (corresponding to non-blocking barrier elements 2612a-2612e) in barrier element array 2604. Although not indicated in FIG. 26 (for ease of illustration), in a similar fashion, light from the second set of pixels 2616a-2616d forms second image 2606b, and light from the fourth set of pixels 2620a-2620d forms fourth image 2606d.

In the embodiment of FIG. 26, any pair of images of images 2606a-2606d may be configured to be perceived as a three-dimensional image by a user in viewing space 2626. For instance, first and third images 2606a and 2606c may be configured to be perceived by a user as a first three-dimensional image, such that first image 2606a is received at a first eye location and third image 2606c is received at a second eye location of a user. Furthermore, second and fourth images 2606b and 2606d may be configured to be perceived by a user as a second three-dimensional image, such that second image 2606b is received at a first eye location and fourth image 2606d is received at a second eye location of a user.

In the example of FIG. 26, two three-dimensional images are provided by system 2600. In further embodiments, further numbers of three-dimensional images may be provided, including a third three-dimensional image, a fourth three-dimensional image, etc. In such case, each three-dimensional image is generated by filtering light (using a barrier element array) corresponding to an image pair generated by a corresponding pair of sets of pixels of the pixel array, in a similar fashion as described with respect to FIG. 26 for two three-dimensional images. For example, to provide three three-dimensional images, pixel array 2602 may include fifth and sixth sets of pixels that generate fifth and sixth images, respectively, to be perceived by a user as a third three-dimensional image. To provide a fourth three-dimensional image, pixel array 2602 may include seventh and eighth sets of pixels that generate seventh and eighth images, respectively, to be perceived by a user as the fourth three-dimensional image.

In FIG. 26, the first and second three-dimensional images generated based on first and third images 2606a and 2606c and second and fourth images 2606b and 2606d, respectively, and any further three-dimensional images that may be generated, may include related image content or may each include unrelated image content. For example, in an embodiment, the first and second three-dimensional images (and any further three-dimensional images) may have been captured as different viewpoints of a common scene. Thus, a user in viewing space 2626 that moves laterally to sequentially view the first and second three-dimensional images (and any further three-dimensional images) may perceive being able to partially or fully "view behind" objects of the common scene.

Further description regarding using a parallax barrier to deliver three-dimensional views, including adaptable versions of parallax barriers, is provided in pending U.S. patent application Ser. No. 12/845,409, titled "Display With Adaptable Parallax Barrier," in pending U.S. patent application Ser. No. 12/845,440, titled "Adaptable Parallax Barrier Supporting Mixed 2D And Stereoscopic 3D Display Regions," and in pending U.S. patent application Ser. No. 12/845,461, titled "Display Supporting Multiple Simultaneous 3D Views," which are each incorporated by reference herein in their entireties.

2. Exemplary Embodiments Using Lenticular Lenses

Figure 27:
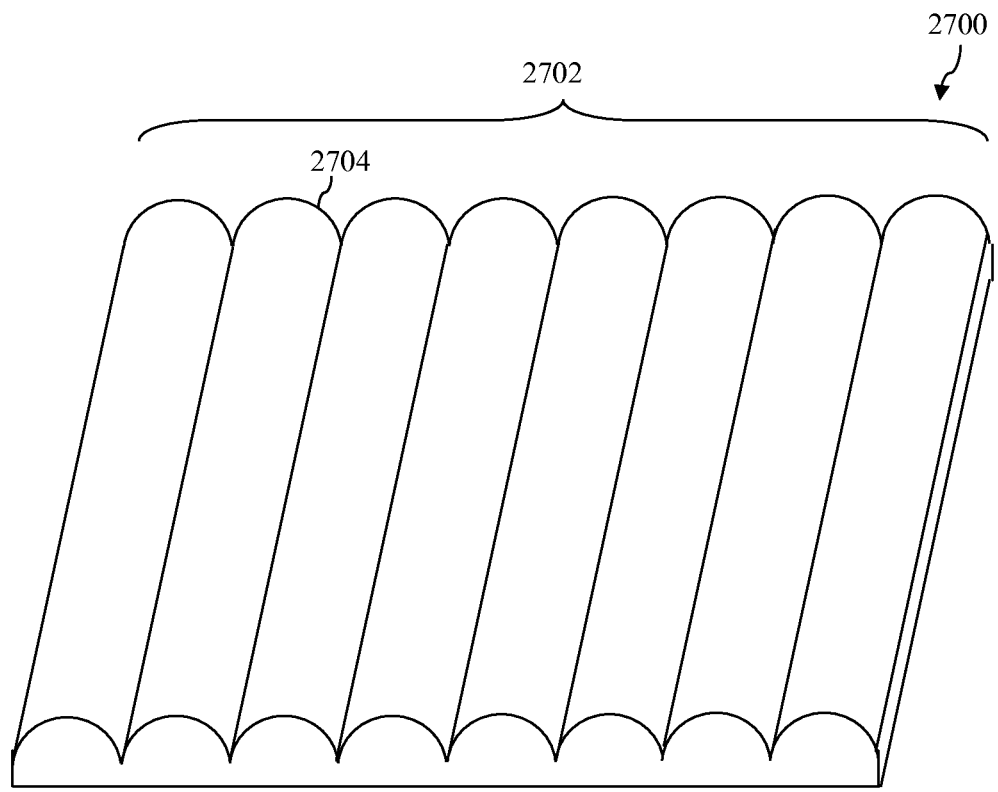
FIGS. 27 and 28 show views of a lenticular lens, according to an exemplary embodiment.
Figure 28:
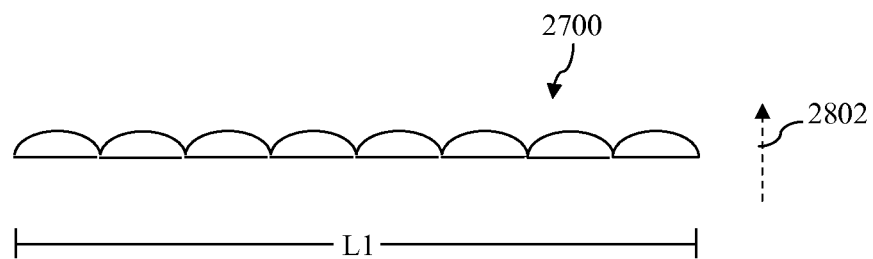

In embodiments, as described herein, display devices 1400 and 1500 of FIGS. 14 and 15 may include one or more lenticular lenses as light manipulators 1404 and 1504 used to deliver three-dimensional images and/or two-dimensional images. For instance, display systems 1600 and 1700 of FIGS. 16 and 17 may each include a sub-lens array of a lenticular lens in place of parallax barrier 1620. For example, FIG. 27 shows a perspective view of a lenticular lens 2700 in accordance with an embodiment. As shown in FIG. 27, lenticular lens 2700 includes a sub-lens array 2702. Sub-lens array 2702 includes a plurality of sub-lenses 2704 arranged in a two-dimensional array (e.g., arranged side-by-side in a row). Each sub-lens 2704 is shown in FIG. 27 as generally cylindrical in shape and having a substantially semi-circular cross-section, but in other embodiments may have other shapes. In FIG. 27, sub-lens array 2702 is shown to include eight sub-lenses for illustrative purposes and is not intended to be limiting. For instance, sub-lens array 2702 may include any number (e.g., hundreds, thousands, etc.) of sub-lenses 2704. FIG. 28 shows a side view of lenticular lens 2700, oriented as lenticular lens 2700 may be positioned in system 1900 of FIG. 19 (in place of parallax barrier 1904) for lenticular lens 1902 to deliver three-dimensional views. In FIG. 28, light may be passed through lenticular lens 2700 in the direction of dotted arrow 2802 to be diverted.

In one embodiment, lenticular lens 2700 may be fixed in size. For example, light manipulator 1404 of FIG. 14 may include lenticular lens 2700 when fixed in size. In another embodiment, lenticular lens 2700 may be adaptable. For instance, light manipulator 1504 of FIG. 15 may include lenticular lens 2700 when adaptable. For instance, in an embodiment lenticular lens 2700 may be made from an elastic material. Such a lenticular lens 2700 may be adapted in size in response to generated drive signals.

Further description regarding using a lenticular lens to deliver three-dimensional views, including adaptable versions of lenticular lenses, is provided in pending U.S. patent application Ser. No. 12/774,307, titled "Display with Elastic Light Manipulator," which is incorporated by reference herein in its entirety.

3. Exemplary Embodiments Using Multiple Light Manipulators

Display devices 1400 and 1500 may include multiple layers of light manipulators in embodiments. Multiple three-dimensional images may be displayed in a viewing space using multiple light manipulator layers, according to embodiments. In embodiments, the multiple light manipulating layers may enable spatial separation of the images. For instance, in such an embodiment, for example, a display device that includes multiple light manipulator layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In embodiments, a display device may be configured to display any number of spatially separated three-dimensional images, as desired for a particular application (e.g., according to a number and spacing of viewers in the viewing space, etc.).

For instance, FIG. 29 shows a flowchart 2900 for generating multiple three-dimensional images using multiple light manipulator layers, according to an exemplary embodiment. Flowchart 2900 is described with respect to FIG. 30, which shows a cross-sectional view of a display system 3000 that includes multiple light manipulator layers, according to an exemplary embodiment. As shown in FIG. 30, system 3000 includes a display driver circuit 3002, an image generator 1612, a first light manipulator 3014a, and a second light manipulator 3014b. As shown in FIG. 30, image generator 1612 includes pixel array 1608, first light manipulator 3014a includes first light manipulator elements 3016a, and second light manipulator 3014b includes second light manipulator elements 3016b. Furthermore, as shown in FIG. 30, display driver circuit 3002 includes a pixel array driver circuit 3004 and a light manipulator driver circuit 3006. Flowchart 2900 and system 3000 are described as follows.

Flowchart 2900 begins with step 2902. In step 2902, light is received from an array of pixels that includes a plurality of pairs of sets of pixels. For example, as shown in FIG. 30, light 1652 is received at first light manipulator 3014a from pixel array 208 of image generator 1612. Pixel array driver circuit 3004 may generate driver signals based on content signal 1624 received by display driver circuit 3002, and the driver signals may be received by pixel array 1614 to generate light 1652. Each pixel of pixel array 1608 may generate light that is received at first light manipulator 3014a. In an embodiment, pixel array driver circuit 3004 may generate drive signal 1614 to cause pixel array 1608 to emit light 1652 containing a plurality of images corresponding to the sets of pixels.

In step 2904, the light from the array of pixels is manipulated with a first light manipulator. For example, first light manipulator 3014a may be configured to manipulate light 1652 received from pixel array 1608. As shown in FIG. 30, first light manipulator 3014a includes light manipulator elements 3016a configured to perform manipulating (e.g., filtering, diverting, etc.) of light 1652 to generate manipulated light 1672. Light manipulator elements 3016a may optionally be configurable to adjust the manipulating performed by first light manipulator 3014a. First light manipulator 3014a may perform filtering in a similar manner as a parallax barrier described above or in other manner. In another embodiment, first light manipulator 3014a may include a lenticular lens that diverts light 1652 to perform light manipulating, generating manipulated light 1672. In an embodiment, light manipulator driver circuit 3006 may generate drive signal 1616a based on control signal 1622 received by display driver 3002 to cause light manipulator elements 3016a to manipulate light 1652 as desired.

In step 2906, the light manipulated by the first light manipulator is manipulated with a second light manipulator to form a plurality of pairs of images corresponding to the plurality of pairs of sets of pixels in a viewing space. For example, as shown in FIG. 30, manipulated light 1672 is received by second light manipulator 3014b to generate manipulated light 3008 that includes a plurality of three-dimensional images 3010a-3010n formed in viewing space 1670. As shown in FIG. 30, second light manipulator 3014b includes light manipulator elements 3016b configured to perform manipulating of manipulated light 1672 to generate manipulated light 3008. Light manipulator elements 3016b may optionally be configurable to adjust the manipulating performed by second light manipulator 3014b. In an embodiment, light manipulator driver circuit 3006 may generate drive signal 1616b based on control signal 1622 to cause light manipulator elements 3016b to manipulate manipulated light 1652 to generate manipulated light 3008 including three-dimensional images 3010a-3010n as desired. In embodiments, second light manipulator 3014a may include a parallax barrier or a lenticular lens configured to manipulate manipulated light 1652 to generate manipulated light 3008.

As such, display system 3000 has a single viewing plane or surface (e.g., a plane or surface of pixel array 1608, first light manipulator 3014a, second light manipulator 3014b) that supports multiple viewers with media content in the form of three-dimensional images or views. The single viewing plane of display system 3000 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second light manipulators 3014a and 3014b each cause three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 30, the areas may be the same area—an area of a display screen or surface of display system 3000. As such, multiple three-dimensional views that are each viewable by a corresponding viewer may be delivered by a single display viewing plane.

Display system 3000 may be configured in various ways to generate multiple three-dimensional images according to flowchart 2900, in embodiments. Furthermore, as described below, embodiments of display system 3000 may be configured to generate two-dimensional views, as well as any combination of one or more two-dimensional views simultaneously with one or more three-dimensional views.

Figure 31:
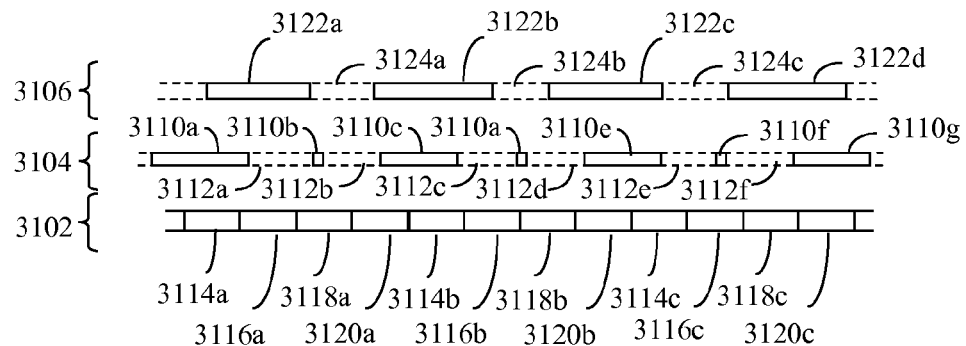
FIGS. 31 and 32 show cross-sectional views of a display system, according to an exemplary embodiment.

For instance, in an embodiment, delivery of three-dimensional images may be performed in system 3000 using multiple parallax barriers. FIG. 31 shows a cross-sectional view of a display system 3100, according to an exemplary embodiment. Display system 3100 is an example of system 3000 shown in FIG. 30. As shown in FIG. 31, system 3100 includes a pixel array 3102, a first barrier element array 3104, and a second barrier element array 3106. System 3100 may also include display driver circuit 3002 of FIG. 30, which is not shown in FIG. 31 for ease of illustration. System 3100 is described as follows.

As shown in the example of FIG. 31, pixel array 3102 includes a first set of pixels 3114a-3114c, a second set of pixels 3116a-3116c, a third set of pixels 3118a-3118c, and a fourth set of pixels 3120a-3120c. Pixels of the four sets of pixels are alternated in pixel array 3102 in the order of pixel 3114a, pixel 3116a, pixel 3118a, pixel 3120a, pixel 3114b, pixel 3116b, etc. Further pixels may be included in each set of pixels in pixel array 3102 that are not visible in FIG. 31, including hundreds, thousands, or millions of pixels in each set of pixels.

Figure 32:
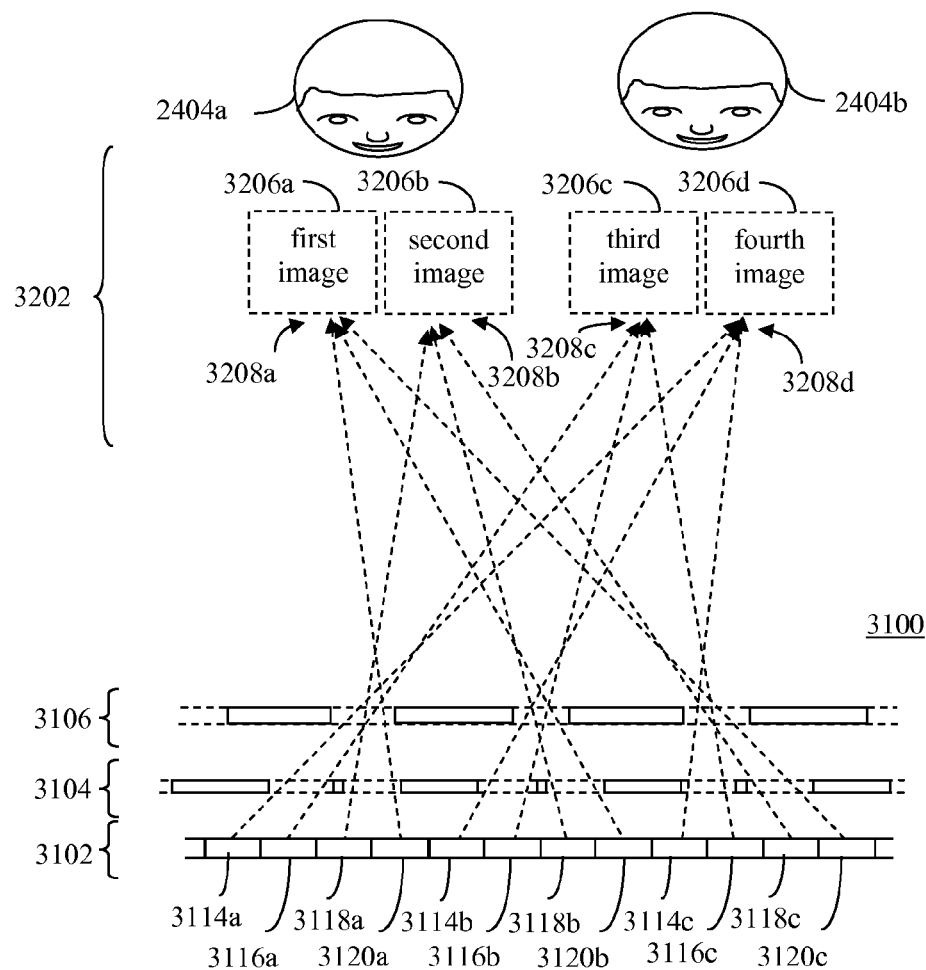

Each of pixels 3114a-3114c, 3116a-3116c, 3118a-3118c, and 3120a-3120c is configured to generate light, which emanates from the surface of pixel array 3102 towards first barrier element array 3104. Each set of pixels is configured to generate a corresponding image. For example, FIG. 32 shows display system 3100, where pixels of pixel array 3102 emit light. Light from second set of pixels 3116a-3116c and first set of pixels 3114a-3114c is configured to generate third and fourth images 3206c and 3206d, respectively, which may be perceived together as a second three-dimensional image by a second viewer 2404b. Light from fourth set of pixels 3120a-3120c and third set of pixels 3118a-3118c is configured to generate first and second images 3206a and 3206b, respectively, which may be perceived together as a first three-dimensional image by a first viewer 2404a. The light emitted by the sets of pixels is filtered by first and second barrier element arrays 3104 and 3106 to generate the first and second three-dimensional images in respective desired regions of a user space 3202 adjacent to display system 3100.

First-fourth images 3206a-3206d may be formed in viewing space 3202 at a distance from pixel array 3102 and at a lateral location of viewing space 3202 as determined by a configuration of display system 3100 of FIG. 31, including a width and spacing of non-blocking slits in first barrier element array 3104, by a width and positioning of non-blocking slits in second barrier element array 3106, by a spacing between pixel array 3102 and first barrier element array 3104, and a spacing between first and second barrier element arrays 3104 and 3106.

Figure 33:
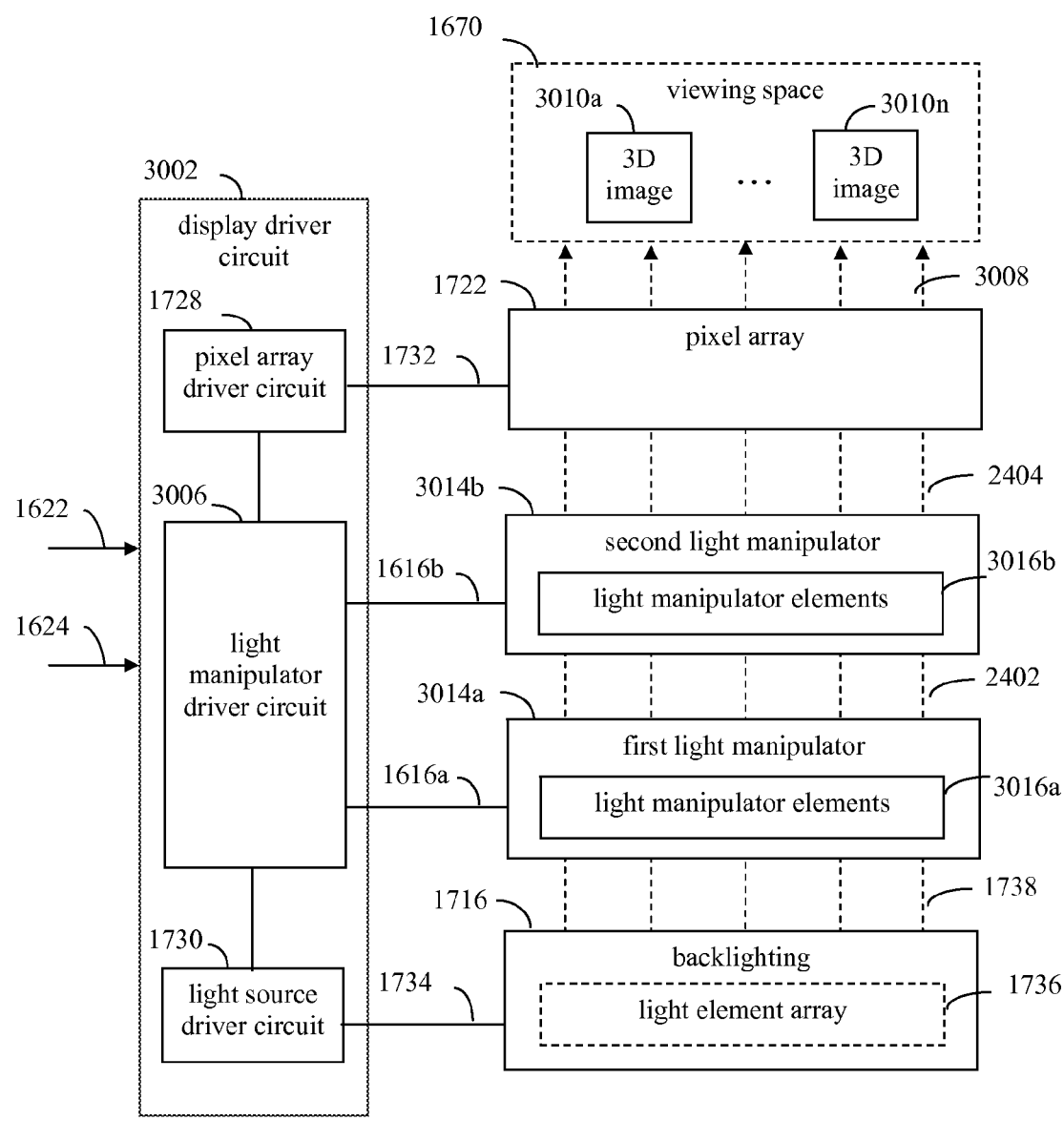
FIG. 33 shows a block diagram of a display system, according to an exemplary embodiment.

In an embodiment, system 3000 of FIG. 30 may be configured similarly to display system 1700 of FIG. 17 to deliver three-dimensional images and/or two-dimensional images. For instance, in embodiments, system 3000 may include backlighting 1716 and pixel array 1722 separated by one or both of first and second light manipulators 3014a and 3014b. For example, FIG. 33 shows a block diagram of a display system 3300, which is an example of display devices 1400 and 1500 shown in FIGS. 14 and 15, according to an embodiment. Display system 3300 is configured to display multiple three-dimensional images in a viewing space in a spatially separated manner. As shown in FIG. 33, system 3300 includes display driver circuit 3002, backlighting 1716, first light manipulator 3014a, second light manipulator 3014b, and pixel array 1722. As shown in FIG. 33, backlighting 1716 optionally includes light element array 1736, first light manipulator 3014a includes first light manipulator elements 3016a, and second light manipulator 3014b includes second light manipulator elements 3016b. Furthermore, as shown in FIG. 33, display driver circuit 3002 receives control signal 1622 and content signal 1624 and includes light source driver circuit 1730, light manipulator driver circuit 3006, and pixel array driver circuit 1728. Light source driver circuit 1730, light manipulator driver circuit 3006, and pixel array driver circuit 1728 may generate drives signals to perform their respective functions based on control signal 1622 and/or content signal 1624. As shown in FIG. 33, first and second light manipulators 3014a and 3014b are positioned between backlighting 1716 and pixel array 1722. In another embodiment, pixel array 1722 may instead be located between first and second light manipulators 3014a and 3014b.

As shown in FIGS. 16 and 17, display driver circuit 1602 receives content signal 1624, and as shown in FIGS. 30 and 33, display driver circuit 3002 receives content signal 1624. Content signal 1624 is an example of content signals 1408 and 1508 of FIGS. 14 and 15. Content signal 1624 includes two-dimensional and/or three-dimensional content for display by the respective display devices/systems. For instance, display driver circuits 1602 and 3002 generate respective drive signals (e.g., pixel array drive signals) based on content signal 1624 to enable the content carried by content signal 1624 to be displayed.

E. Example Display Environments

As described above, light manipulators may be reconfigured to change the locations of delivered views based on changing viewer positions. As such, a position of a viewer may be determined/tracked so that a parallax barrier and/or light manipulator may be reconfigured to deliver views consistent with the changing position of the viewer. For instance, with regard to a parallax barrier, a spacing, number, arrangement, and/or other characteristic of slits may be adapted according to the changing viewer position. With regard to a lenticular lens, a size of the lenticular lens may be adapted (e.g., stretched, compressed) according to the changing viewer position. In embodiments, a position of a viewer may be determined/tracked by determining a position of the viewer directly, or by determining a position of a device associated with the viewer (e.g., a device worn by the viewer, held by the viewer, sitting in the viewer's lap, in the viewer's pocket, sitting next the viewer, etc.).

Examples of display environments for display embodiments described herein include environments having a single viewer, as well as environments having multiple viewers. For example, in one type of environment (e.g., an office, living room, etc.), a single viewer interacts with an electronic device, mobile or stationary, to view and/or interact with mixed 2D and 3D content, such as a mobile or desktop computer, smart phone, television, or other mobile or stationary device. It is noted that this type of environment may include more than one viewer. In another type of environment (e.g., a living room, a home theatre room, etc.), multiple viewers are enabled to interact with an electronic device, such as a television set (e.g., high-def, small screen, large screen, etc.), to view and/or interact with mixed 2D and 3D content in the form of television content, movies, video games, etc.

Figure 34:
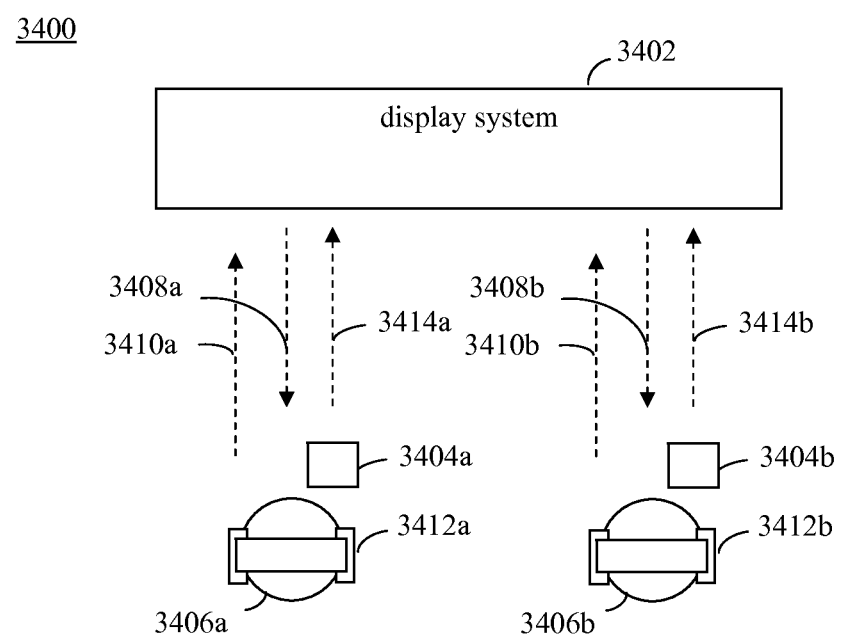
FIG. 34 shows a block diagram of a display environment, according to an exemplary embodiment.

For instance, FIG. 34 shows a block diagram of a display environment 3400, according to an exemplary embodiment. In the example of FIG. 34, first and second viewers 3406a and 3406b are present in display environment 3400, and are enabled to interact with a display device 3402 to be delivered two-dimensional and/or three-dimensional media content. Although two viewers 3406 are shown present in FIG. 34, in other embodiments, other numbers of viewers 3406 may be present in display environment 3400 that may interact with display device 3402 and may be delivered media content by display device 3402. As shown in FIG. 34, display environment 3400 includes display device 3402, a first remote control 3404a, a second remote control 3404b, a first headset 3412a, a second headset 3412b, and viewers 3406a and 3406b. Display device 3402 is an example of the display devices described above, and may be configured similarly to any display device described herein, including display device 408. Viewer 3406a is delivered a view 3408a by display device 3402, and viewer 3406b is delivered a view 3408b by display device 3402. Views 3408a and 3408b may each be a two-dimensional view or a three-dimensional view. Furthermore, in embodiments, view 3408a may be delivered to viewer 3406a, but not be visible by viewer 3406b, and view 3408b may be delivered to viewer 3406b, but not be visible by viewer 3406a.

Remote control 3404a is a device that viewer 3406a may use to interact with display device 3402, and remote control 3404b is a device that viewer 3406b may use to interact with display device 3402. For example, as shown in FIG. 34, viewer 3406a may interact with a user interface of remote control 3404a to generate a display control signal 3414a, and viewer 3406b may interact with a user interface of remote control 3404b to generate a display control signal 3414b. Display control signals 3414a and 3414b may be transmitted to display device 3402 using wireless or wired communication links. Display control signals 3414a and 3414b may be configured to select particular content desired to be viewed by viewers 3406a and 3406b, respectively. For example, display control signals 3414a and 3414b may select particular media content to be viewed (e.g., television channels, video games, DVD (digital video discs) content, video tape content, web content, etc.). Display control signals 3414a and 3414b may select whether such media content is desired to be viewed in two-dimensional or three-dimensional form by viewers 3406a and 3406b, respectively. Remote controls 3404a and 3404b may be television remote control devices, game controllers, smart phones, or other remote control type device.

Headsets 3412a and 3412b are worn by viewers 3406a and 3406b, respectively. Headsets 3412a and 3412b each include one or two speakers (e.g., earphones) that enable viewers 3406a and 3406b to hear audio associated with the media content of views 3408a and 3408b. Headsets 3412a and 3412b enable viewers 3406a and 3406b to hear audio of their respective media content without hearing audio associated the media content of the other of viewers 3406a and 3406b. Headsets 3412a and 3412b may each optionally include a microphone to enable viewers 3406a and 3406b to interact with display device 3402 using voice commands.

Display device 3402a, headset 3412a, and/or remote control 3404a may operate to provide position information 3410a regarding viewers 3406a to display device 3402, and display device 3402b, headset 3412b, and/or remote control 3404b may operate to provide position information 3410b regarding viewers 3406b to display device 3402. Display device 3402 may use position information 3410a and 3410b to reconfigure one or more light manipulators (e.g., parallax barriers and/or lenticular lenses) of display device 3402 to enable views 3408a and 3408b to be delivered to viewers 3406a and 3406b, respectively, at various locations. For example, display device 3402a, headset 3412a, and/or remote control 3404a may use positioning techniques to track the position of viewer 3406a, and display device 3402b, headset 3412b, and/or remote control 3404b may use positioning techniques to track the position of viewer 3406b.

F. Example Electronic Device Implementations

Embodiments may be implemented in hardware, software, firmware, or any combination thereof. For example, application 104, operating system 106, mixed 2D/3D supporting logic 108, API 302, operating system 304, display driver 306, application program 414, 2D region setup and control code module 432a, 3Dx region setup and control code module 432b, multiple 2D/3Dx region setup and control code module 432c, 2D/3Dx content generator 440, 2D/3Dx content processor 442, OS 446, user input interfaces 420, 2D, 3Dx & mixed display driver interface 422, shell operations 424, 2D, 3Dx, mixed 2D and 3Dx, & mixed 3Dx and 3Dy translation services 426, API supporting regional 2D/3Dx 428, 2D only driver variant 434, 3Dx only driver variant 436, mixed 2D and 3Ds driver variant 438, translation services 430a-430c, application program 702, display driver 704, SDK 902, compiled code 906, compiler 910, mixed 2D/3D display supporting library modules 912, compiled mixed 2D/3D display supporting program code 914, 2D display supporting module 1102a, 3Dx display supporting library module 1102b, mixed 2D/3Dx display supporting library module 1102c, display configuration command code 1202, content display command code 1204, content translation code 1206, first translator 1302, and/or second translator 1304 may be implemented as computer program code configured to be executed in one or more processors, and/or as circuit logic.

Figure 35:
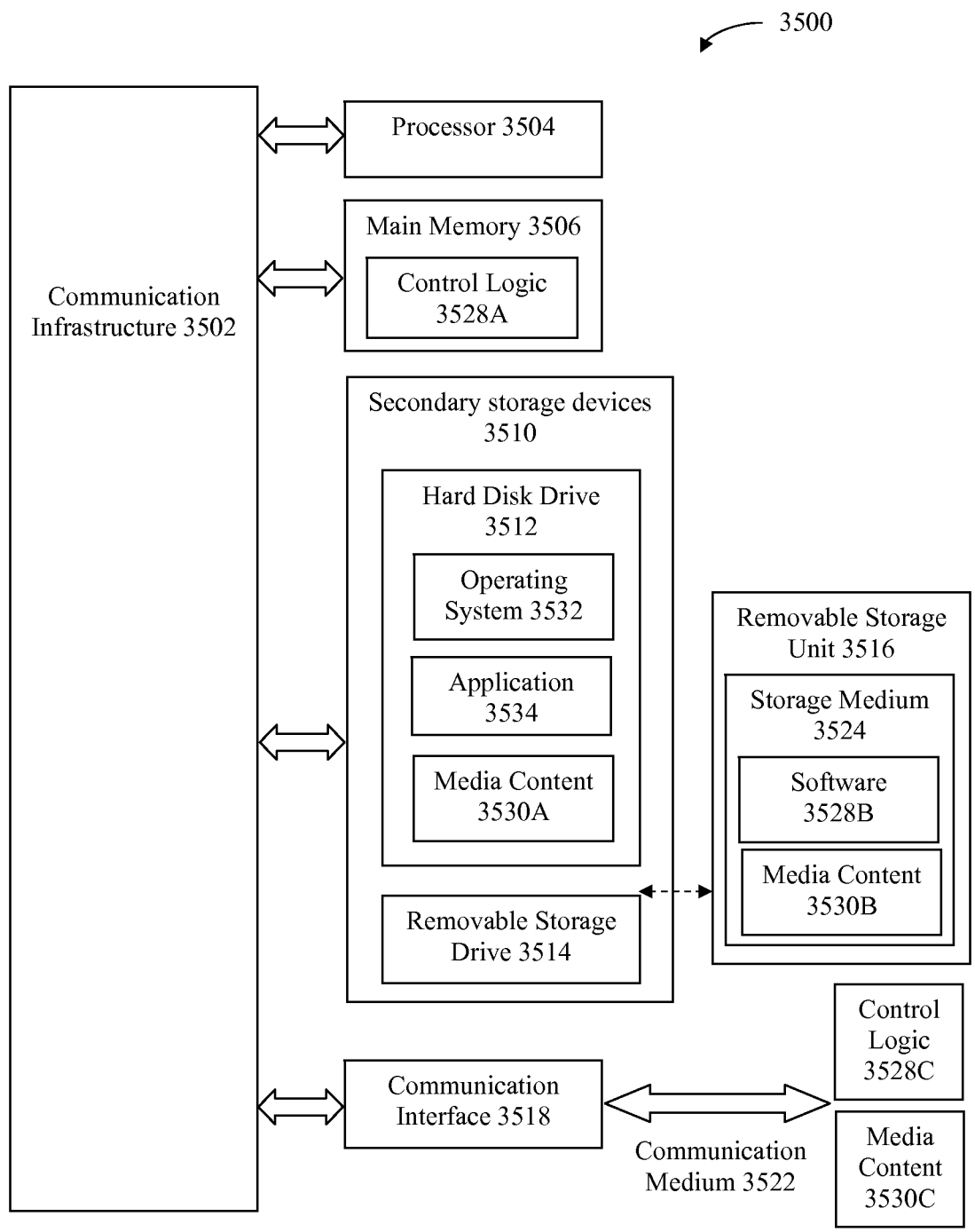
FIG. 35 shows a block diagram of an example electronic device, according to an embodiment.

For instance, FIG. 35 shows a block diagram of an example implementation of an electronic device 3500, according to an embodiment. In embodiments, electronic device 3500 may include one or more of the elements shown in FIG. 35. As shown in the example of FIG. 35, electronic device 3500 may include one or more processors (also called central processing units, or CPUs), such as a processor 3504.

Processor 3504 is connected to a communication infrastructure 3502, such as a communication bus. In some embodiments, processor 3504 can simultaneously operate multiple computing threads.

Electronic device 3500 also includes a primary or main memory 3506, such as random access memory (RAM). Main memory 3506 has stored therein control logic 3528A (computer software), and data.

Electronic device 3500 also includes one or more secondary storage devices 3510. Secondary storage devices 3510 include, for example, a hard disk drive 3512 and/or a removable storage device or drive 3514, as well as other types of storage devices, such as memory cards and memory sticks. For instance, electronic device 3500 may include an industry standard interface, such a universal serial bus (USB) interface for interfacing with devices such as a memory stick. Removable storage drive 3514 represents a floppy disk drive, a magnetic tape drive, a compact disk drive, an optical storage device, tape backup, etc.

As shown in FIG. 35, secondary storage devices 3510 may include an operating system 3532 and an application 3534. Embodiments for operating system 3532 (e.g., OS 304, OS 432, etc.) and for application 3534 (e.g., application 104, application program 414, application 702, compiled code 906, etc.) are described in detail above.

Removable storage drive 3514 interacts with a removable storage unit 3516. Removable storage unit 3516 includes a computer usable or readable storage medium 3524 having stored therein computer software 3528B (control logic) and/or data. Removable storage unit 3516 represents a floppy disk, magnetic tape, compact disk, DVD, optical storage disk, or any other computer data storage device. Removable storage drive 3514 reads from and/or writes to removable storage unit 3516 in a well known manner.

Electronic device 3500 further includes a communication or network interface 3518. Communication interface 3518 enables the electronic device 3500 to communicate with remote devices. For example, communication interface 3518 allows electronic device 3500 to communicate over communication networks or mediums 3542 (representing a form of a computer usable or readable medium), such as LANs, WANs, the Internet, etc. Network interface 3518 may interface with remote sites or networks via wired or wireless connections.

Control logic 3528C may be transmitted to and from electronic device 3500 via the communication medium 3542.

Any apparatus or manufacture comprising a computer usable or readable medium having control logic (software) stored therein is referred to herein as a computer program product or program storage device. This includes, but is not limited to, electronic device 3500, main memory 3506, secondary storage devices 3510, and removable storage unit 3516. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for application 104, operating system 106, mixed 2D/3D supporting logic 108, API 302, operating system 304, display driver 306, application program 414, 2D region setup and control code module 432a, 3Dx region setup and control code module 432b, multiple 2D/3Dx region setup and control code module 432c, 2D/3Dx content generator 440, 2D/3Dx content processor 442, OS 446, user input interfaces 420, 2D, 3Dx & mixed display driver interface 422, shell operations 424, 2D, 3Dx, mixed 2D and 3Dx, & mixed 3Dx and 3Dy translation services 426, API supporting regional 2D/3Dx 428, 2D only driver variant 434, 3Dx only driver variant 436, mixed 2D and 3Ds driver variant 438, translation services 430a-430c, application program 702, display driver 704, SDK 902, compiled code 906, compiler 910, mixed 2D/3D display supporting library modules 912, compiled mixed 2D/3D display supporting program code 914, 2D display supporting module 1102a, 3Dx display supporting library module 1102b, mixed 2D/3Dx display supporting library module 1102c, display configuration command code 1202, content display command code 1204, content translation code 1206, first translator 1302, second translator 1304, flowchart 500, flowchart 600, flowchart 1000 (including any one or more steps of flowcharts 500, 600, and 1000), and/or further embodiments of the present invention described herein. Embodiments of the invention are directed to computer program products comprising such logic (e.g., in the form of program code or software) stored on any computer usable medium (e.g., a computer readable storage medium). Such program code, when executed in one or more processors, causes a device to operate as described herein.

As described herein, electronic device 3500 may be implemented in association with a variety of types of display devices. For instance, electronic device 3500 may be one of a variety of types of media devices, such as a stand-alone display (e.g., a television display such as flat panel display, etc.), a computer, a game console, a set top box, a digital video recorder (DVR), other electronic device mentioned elsewhere herein, etc. Media content that is delivered in two-dimensional or three-dimensional form according to embodiments described herein may be stored locally or received from remote locations. For instance, such media content may be locally stored for playback (replay TV, DVR), may be stored in removable memory (e.g. DVDs, memory sticks, etc.), may be received on wireless and/or wired pathways through a network such as a home network, through Internet download streaming, through a cable network, a satellite network, and/or a fiber network, etc. For instance, FIG. 35 shows a first media content 3530A that is stored in hard disk drive 3512, a second media content 3530B that is stored in storage medium 3524 of removable storage unit 3516, and a third media content 3530C that may be remotely stored and received over communication medium 3522 by communication interface 3518. Media content 3530 may be stored and/or received in these manners and/or in other ways.

Figure 36:
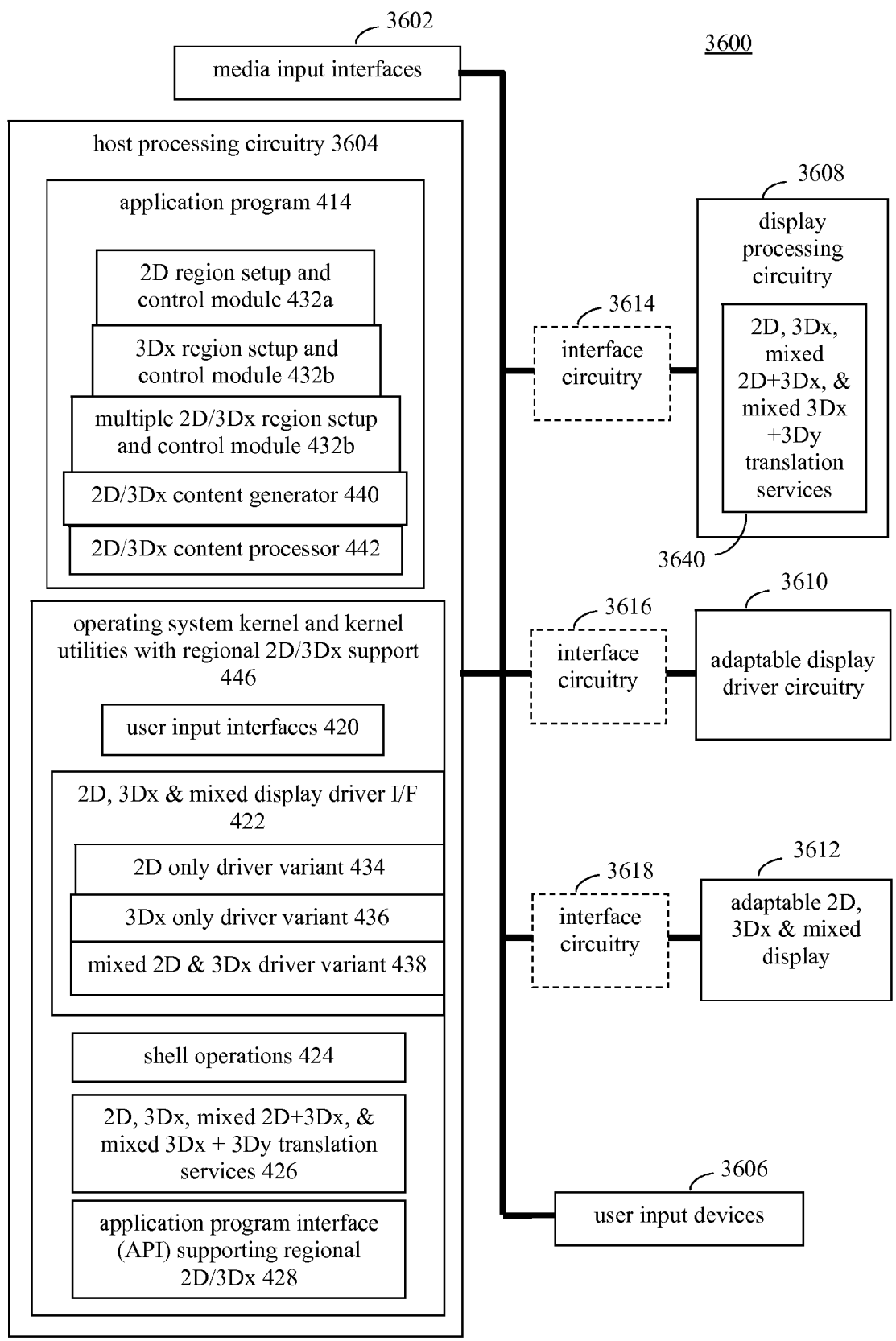
FIG. 36 shows a block diagram of a display system that supports mixed 2D, stereoscopic 3D and multi-view 3D displays, according to an exemplary embodiment.

FIG. 36 shows a block diagram of a display system 3600 that supports mixed 2D, stereoscopic 3D and multi-view 3D displays according to an exemplary embodiment. Display system 3600 is another electronic device embodiment. As shown in FIG. 36, display system 3600 includes media input interfaces 3602, host processing circuitry 3604, user input devices 3606, display processing circuitry 3608, adaptable display driver circuitry 3610, adaptable 2D, 3Dx and mixed display 3612, and first-third interface circuitry 3614-3618. Host processing circuitry 3604 includes application program 414 (of FIG. 4B) and operating system 432 (of FIG. 4B). Display processing circuitry 3608 includes 2D, 3Dx, mixed 2D and 3Dx, and mixed 3Dx and 3Dy translation services 3640.

Media input interfaces 3602 includes one or more media input interfaces, wired or wireless, for received media, such as those described elsewhere herein. For instance, media input interface 3602 may include an interface for receiving media content from a local media player device, such as a DVD player, a memory stick, a computer media player, etc., and may include commercially available (e.g., USB, HDMI, etc.) or proprietary interfaces for receiving local media content. Media input interface 3602 may include an interface for receiving media content from a remote source, such as the Internet, satellite, cable, etc.), and may include commercially available (e.g., WLAN, Data Over Cable Service Interface Specification (DOCSIS), etc.) or proprietary interfaces for receiving remote media content.

Host processing circuitry 3604 may include one or more integrated circuit chips and/or additional circuitry, which may be configured to execute software/firmware, including operating system 432 and application program 414.

User input devices 3606 includes one or more user input devices that a user may use to interact with display system 3600. Examples of user input devices are described elsewhere herein, such as a keyboard, a mouse/pointer, etc.

Display processing circuitry 3608 may be included in host processing circuitry 3604, or may be separate from host processing circuitry 3604 as shown in FIG. 36. For instance, display processing circuitry 3608 may include one or more processors (e.g., graphics processors), further circuitry and/or other hardware, software, firmware, or any combination thereof. Display processing circuitry 3608 may be present to perform graphics processing tasks. For instance, as shown in FIG. 36, display processing circuitry 3608 may optionally include 2D, 3Dx, mixed 2D and 3Dx, and mixed 3Dx and 3Dy translation services 3640 to perform 2D/3D related translation services in addition or alternatively to translation services of OS 432 and/or application 414.

Adaptable display driver circuitry 3610 includes one or more display driver circuits for an adaptable display. Examples of adaptable display driver circuitry 3610 are described above, such as with regard to FIGS. 4B, 16, 17, 30, and 33.

Adaptable 2D, 3Dx and mixed display 3612 includes a display that is adaptable, and is capable of displaying 2D content, 3D content, and a mixture of 2D and/or 3D content. Examples of adaptable 2D, 3Dx and mixed display 3612 are described elsewhere herein.

First-third interface circuitry 3614-3618 is optional. For instance, as shown in FIG. 36, a communication infrastructure (e.g., a signal bus) 3634 may be present to couple signals of media input interfaces 3602, host processing circuitry 3604, user input devices 3606, display processing circuitry 3608, adaptable display driver circuitry 3610, and display 3612. In an embodiment, if display processing circuitry 3608, adaptable display driver circuitry 3610, and/or display 3612 are contained in a common housing/structure with host processing circuitry 3604 (e.g., in a handheld device, etc.) interface circuitry 3614-3618 may not be needed to be present. If display processing circuitry 3608, adaptable display driver circuitry 3610, and/or display 3612 are in a separate housing/structure from host processing circuitry 3604, corresponding interface circuitry 3614-3618 may be present to provide an interface. For instance, host processing circuitry 3604 may be in a game console, a desktop computer tower, a home audio receiver, a set top box, etc., and display processing circuitry 3608, adaptable display driver circuitry 3610, and/or display 3612 may be included in a display device structure. In such case, interface circuitry 3614-3618 may not be present. When present, first-third circuitry 3614-3618 may each include circuitry, such as receivers and/or transmitters (wired or wireless), for enabling communications between the respective one of display processing circuitry 3608, adaptable display driver circuitry 3610, and display 3612, and the other components of system 3600 (e.g., host processing circuitry 3604, etc.).

Note that the embodiment of display system 3600 shown in FIG. 36 is provided for purposes of illustration, and is not intended to be limiting. In further embodiments, display system 3600 may include fewer, additional, and/or alternative features than shown in FIG. 36.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A software development kit, stored within a computer-readable memory, for a programming language that enables simultaneous display on a screen of both two-dimensional content and three-dimensional content, the software development kit comprising:
    a source code editor configured to enable applications to be generated based on code of the programming language;
    a compiler that compiles code written in the programming language into compiled code; and
    a first library module that responds to first program calls by assisting in establishing a first region of a screen, the establishing of the first region involving placing the first region in a first configuration to support display of first content, the first configuration being a first three-dimensional configuration, and the first content being three-dimensional content;
    a second library module that responds to second program calls by assisting in establishing a second region of the screen, the establishing of the second region involving placing the second region in a second configuration to support display of second content, the first configuration being different than the second configuration; and
    wherein the compiler is configured to link the compiled code with at least one of the first library module or the second library module.

2. The software development kit of claim 1, wherein the programming language provides functions for specifying at least one of a three-dimensional type of the three-dimensional content, a displayed orientation of the three-dimensional content, a displayed contrast of the three-dimensional content, a displayed brightness of the three-dimensional content, or a displayed resolution of the three-dimensional content.

3. The software development kit of claim 1, wherein the compiled code comprises a display configuration command code that, when executed, causes a window that displays the three-dimensional content to be opened in the second region of the screen.

4. The software development kit of claim 3, wherein the compiled code comprises a content display command code that, when executed, delivers content to a screen region opened on the screen according to the display configuration command code.

5. The software development kit of claim 3, wherein the compiled code comprises a content translation code that, when executed, converts a first type of content to a second type of content to be provided for display by the screen in a screen region opened on the screen according to the display configuration command code.

6. The software development kit of claim 5, wherein the content translation code is configured to translate types of content that are unsupported by a display device associated with the content translation code to types of content that are supported by the display device.

7. The software development kit of claim 5, wherein the content translation code comprises at least one translator for:
   a display device that does not support display of three-dimensional content; and
   a display device that does not support display of one or more types of three-dimensional content.

8. The software development kit of claim 1, further comprising:
   a third library module that responds to third program calls by assisting in establishing multiple regions of the screen, placing the multiple regions in one or more corresponding configurations to support display of two-dimensional and three-dimensional content.

9. The software development kit of claim 1, wherein the compiled code comprises code that generates a request for an indication of at least one characteristic of a display screen.

10. The software development kit of claim 1, wherein the compiled code comprises code that receives an input signal from a user input interface.

11. The software development kit of claim 10, wherein the compiled code generates a command that is configured to cause an adjustment of at least one of the first content or the second content.

12. The software development kit of claim 11, wherein the adjustment comprises at least one of resizing, rotating, moving, or changing a degree of three-dimensionality of a region or an object that is displayed as three-dimensional.

13. A computer program product stored within a computer-readable memory for enabling a processor to display content on a screen that supports two-dimensional display and three-dimensional display, the computer program product comprising:
   one or more library modules that receive one or more commands, the one or more library modules comprising a two-dimensional display supporting library module, a three-dimensional display supporting library module, and a mixed two-dimensional or three-dimensional display supporting library module, the mixed two-dimensional and three-dimensional display supporting library module being configured to assist in establishing multiple regions of the screen and placing the multiple regions in one or more corresponding configurations to support display of two-dimensional and three-dimensional content;
   first code that delivers the one or more commands to the one or more library modules, the one or more commands being indicative of a viewing dimension, the one or more library modules responding to the one or more commands by at least in part placing a first screen region in a selected one of a two-dimensional configuration or a three-dimensional configuration, the selection in conformance with the viewing dimension; and
   second code that at least assists in establishing display of content in the first screen region of the screen.

14. The computer program product of claim 13, further comprising:
   third code that generates a request for an indication of at least one characteristic of a display screen.

15. The computer program product of claim 14, further comprising:
   fourth code that converts two-dimensional content to three dimensional content to be provided for display by the display screen in the first screen region if a response to the generated request indicates that the display screen does not support three-dimensional display.

16. The computer program product of claim 13, wherein the first code configures a parameter of the command to indicate at least one of a displayed orientation of three-dimensional content associated with the command, a displayed contrast, displayed brightness, or a displayed resolution of three-dimensional content associated with the command.

17. The computer program product of claim 13, further comprising:
   third code that receives an input signal from a user input interface; and
   fourth code that generates a third command in response to the input signal that is configured to cause an adjustment of a three-dimensional characteristic of three-dimensional content displayed in the first screen region.

18. A program library supporting a programming language and stored within a computer-readable memory, the program library comprising:
   a first predefined module that responds to first program calls by assisting in establishing a first region of a screen, the establishing of the first region involving placing the first region in a first configuration to support display of first content, the first configuration being a first three-dimensional configuration, and the first content being three-dimensional content;
   a second predefined module that responds to second program calls by assisting in establishing a second region of the screen, the establishing of the second region involving placing the second region in a second configuration to support display of second content, the first configuration being different than the second configuration; and
   a third predefined module that responds to third program calls by assisting in establishing multiple regions of the screen, the establishing of the multiple regions involving placing the multiple regions in one or more corresponding configurations to support display of two-dimensional and three-dimensional content.

19. The program library of claim 18, wherein the second configuration is a first two-dimensional configuration.

20. The program library of claim 18, wherein the second configuration is a second three-dimensional configuration, and the first configuration and the second configuration differ by at least one three-dimensional characteristic.

* * * * *